US012794540B2

(12) United States Patent
Pepin et al.

(10) Patent No.: US 12,794,540 B2
(45) Date of Patent: Nov. 10, 2026

(54) BEAM TO BEAM COUPLING CANCELLATION

(71) Applicant: Space Exploration Technologies Corp., Hawthorne, CA (US)

(72) Inventors: Eric Pepin, Seattle, WA (US); Kim W. Schulze, Seattle, WA (US); Amir Agah, Kirkland, WA (US)

(73) Assignee: Space Exploration Technologies Corp., Starbase, TX (US)

( * ) Notice: Subject to any disclaimer, the term of this patent is extended or adjusted under 35 U.S.C. 154(b) by 83 days.

(21) Appl. No.: 18/942,685

(22) Filed: Nov. 9, 2024

(65) Prior Publication Data

US 2025/0167869 A1 May 22, 2025

Related U.S. Application Data

(60) Provisional application No. 63/600,530, filed on Nov. 17, 2023.

(51) Int. Cl.
*H04B 7/08* (2006.01)
*H04B 7/06* (2006.01)

(52) U.S. Cl.
CPC ......... *H04B 7/0857* (2013.01); *H04B 7/0639* (2013.01)

(58) Field of Classification Search
CPC .. H04B 7/0857; H04B 7/0639; H04B 1/0475; H04B 15/00; H04B 2215/00; H04B 17/12; H01Q 1/521; H01Q 1/523; H01Q 3/36; H01Q 3/40; H01Q 3/2694; H01Q 3/26; H01Q 3/03; H01Q 3/267; H01Q 3/38
See application file for complete search history.

(56) References Cited

U.S. PATENT DOCUMENTS

| | | | | |
|---|---|---|---|---|
| 9,210,535 | B2 * | 12/2015 | Kheirkhahi | H04W 4/80 |
| 10,727,923 | B2 * | 7/2020 | Thyagarajan | H04B 17/12 |
| 11,791,876 | B2 * | 10/2023 | Rainish | H04B 7/0617 375/267 |
| 11,916,577 | B2 * | 2/2024 | Pehlke | H04B 1/1081 |
| 2015/0222015 | A1 * | 8/2015 | Thalakotuna | H01Q 1/523 342/373 |
| 2017/0194992 | A1 * | 7/2017 | Kim | H04B 1/18 |
| 2018/0131453 | A1 * | 5/2018 | Sharma | H04B 17/14 |

* cited by examiner

*Primary Examiner* — Sophia Vlahos
(74) *Attorney, Agent, or Firm* — Polsinelli PC

(57) ABSTRACT

Systems and techniques for beam-to-beam (B2B) coupling cancellation are disclosed. In one example, a process includes obtaining, at a first FE of a serially fed FE network, a first RF signal and a second RF signal; outputting, from the first FE, a first through path RF signal based on the first RF signal and a second through path RF signal based on the second RF signal; obtaining, at a second FE of the serially fed FE network, the first through path RF signal and the second through path RF signal; and applying one or more phase shifts to the first RF signal, the second RF signal, the first through path RF signal, or the second through path RF signal to at least partially cancel the coupling component associated with the cross-coupling between the first signal path of the first FE and the second signal path of the first FE.

20 Claims, 31 Drawing Sheets

Non-Alternating

Alternating

Alternating-By-2

1370

BEAM TO BEAM COUPLING CANCELLATION

CROSS-REFERENCE TO RELATED APPLICATION

This application claims priority and the benefit of U.S. Provisional Application No. 63/600,530, filed Nov. 17, 2023, entitled BEAM TO BEAM COUPLING CANCELLATION, the disclosure of which is expressly incorporated by reference herein in its entirety.

TECHNICAL FIELD

The present disclosure generally relates to wireless communications and, more specifically, systems and techniques for signal coupling cancellation in phased array antenna systems.

BACKGROUND

Phased array antennas are used in a variety of wireless communication systems such as satellite and cellular communication systems. The phased array antennas can include a number of antenna elements arranged to behave as a larger directional antenna. Moreover, a phased array antenna can be used to increase an overall directivity and gain, steer the angle of array for greater gain and directivity, perform interference cancellation from one or more directions, determine the direction of arrival of received signals, and improve a signal to interference ratio, among other things. Advantageously, a phased array antenna can be configured to implement beamforming techniques to transmit and/or receive signals in a preferred direction without physically repositioning or reorientation.

It would be advantageous to configure phased array antennas to support an increased number of simultaneous data beams for transmitting and/or receiving signals. Likewise, it would be advantageous to configure phased array antennas and associated circuitry having reduced weight, reduced size, lower manufacturing cost, and/or lower power requirements. Accordingly, embodiments of the present disclosure are directed to these and other improvements in phase array antenna systems or portions thereof.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Systems and techniques for beam-to-beam (B2B) coupling cancellation are disclosed. In one example, a method includes obtaining, at a first FE of a serially fed FE network, a first RF signal and a second RF signal. The first RF signal is coupled to a first signal path of the first FE. The first RF signal comprises a first data beam. The first RF signal is coupled to a second signal path of the first FE for the second RF signal by a cross-coupling between the first signal path of the first FE and the second signal path of the first FE. The cross-coupling between the first signal path of the first FE and the second signal path of the first FE generates a coupling component. The second RF signal is coupled to the second signal path of the first FE. The second RF signal comprises a second data beam and. The method includes outputting, from the first FE, a first through path RF signal based on the first RF signal and a second through path RF signal based on the second RF signal. The method includes obtaining, at a second FE of the serially fed FE network, the first through path RF signal and the second through path RF signal. The method includes applying one or more phase shifts to the first RF signal, the second RF signal, the first through path RF signal, or the second through path RF signal to at least partially cancel the coupling component associated with the cross-coupling between the first signal path of the first FE and the second signal path of the first FE.

BRIEF DESCRIPTION OF THE DRAWINGS

In order to describe the manner in which the various advantages and features of the disclosure can be obtained, a more particular description of the principles described above will be rendered by reference to specific embodiments thereof, which are illustrated in the appended drawings. Understanding that these drawings depict only example embodiments of the disclosure and are not to be considered to limit its scope, the principles herein are described and explained with additional specificity and detail through the use of the drawings in which.

DETAILED DESCRIPTION

Figure 1A:
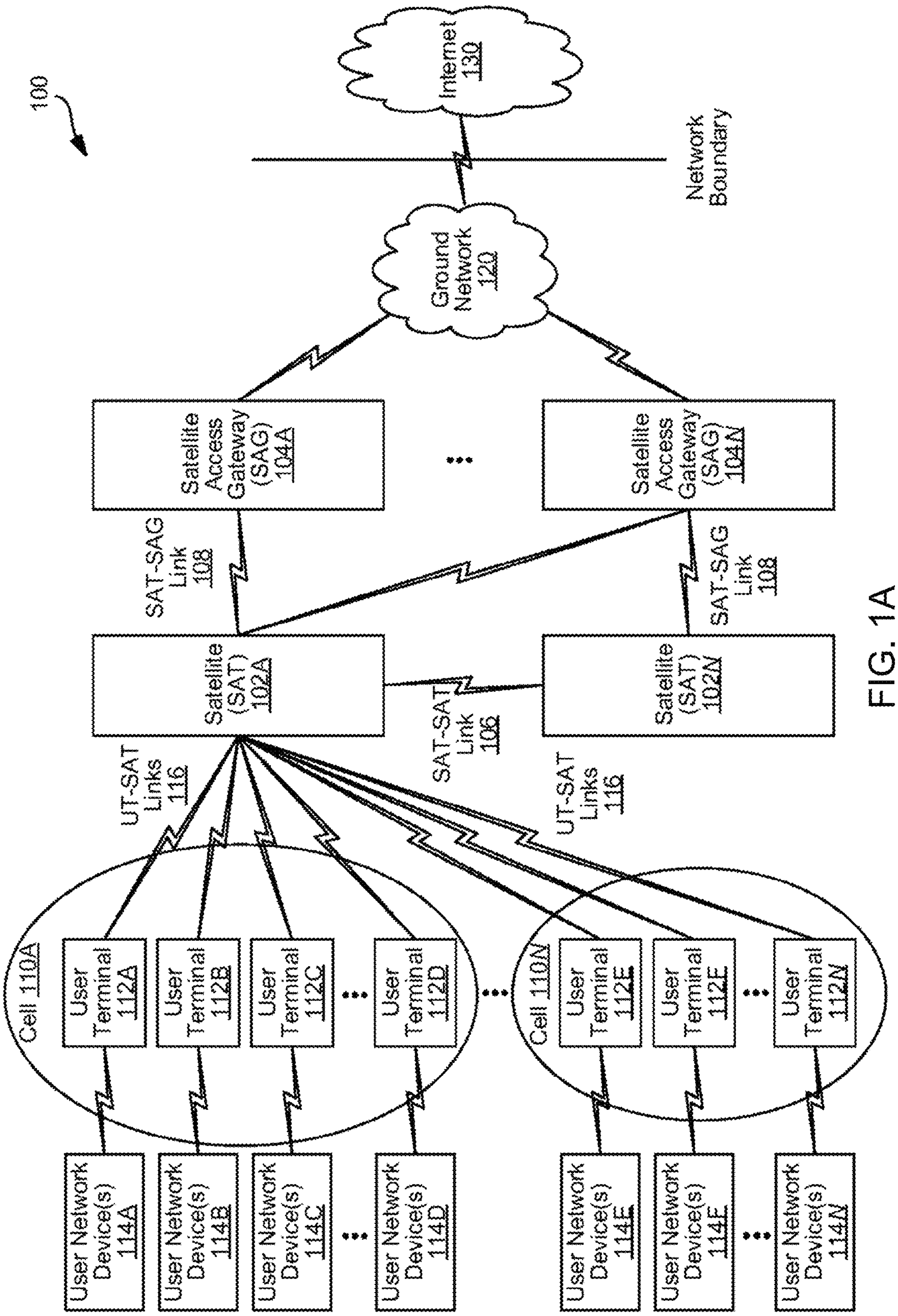
FIG. 1A is a simplified diagram illustrating an example wireless communication system, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Language such as “top”, “bottom”, “upper”, “lower”, “vertical”, “horizontal”, “lateral”, in the present disclosure is meant to provide orientation for the reader with reference to the drawings and is not intended to be the required orientation of the components or to impart orientation limitations into the claims.

The phrase “coupled to” refers to any component that is physically connected to another component either directly or indirectly, and/or any component that is in communication with another component (e.g., connected to the other component over a wired or wireless connection, and/or other suitable communication interface) either directly or indirectly.

In some aspects, systems, apparatuses, processes (also referred to as methods), and computer-readable media (collectively referred to herein as “systems and techniques”) are described herein for beamforming in a phased array antenna.

Figure 5:
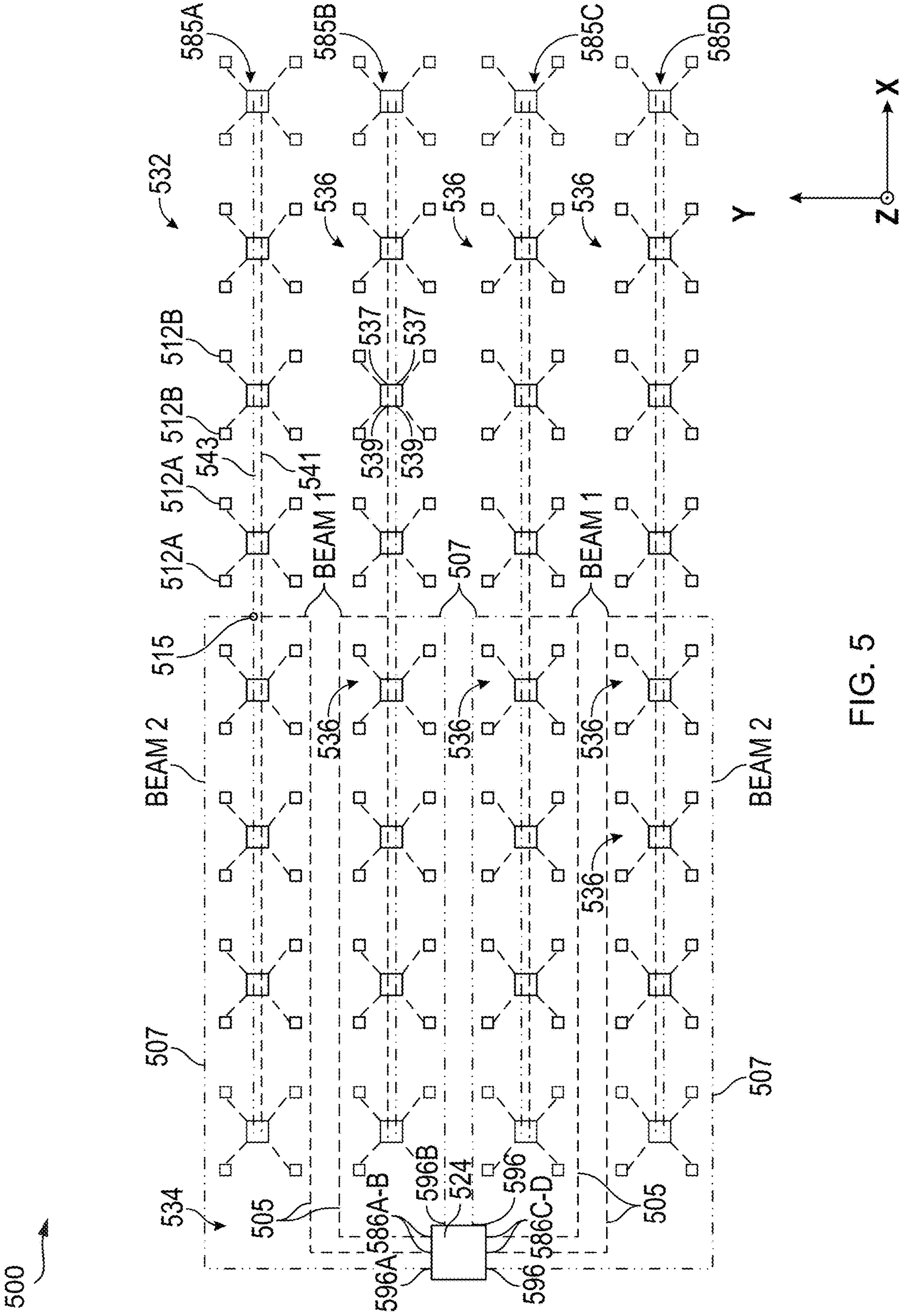
FIG. 5 illustrates a block diagram for a signal distribution configuration for a multiple beam phased array antenna system, in accordance with some examples of the present disclosure.
Figure 6:
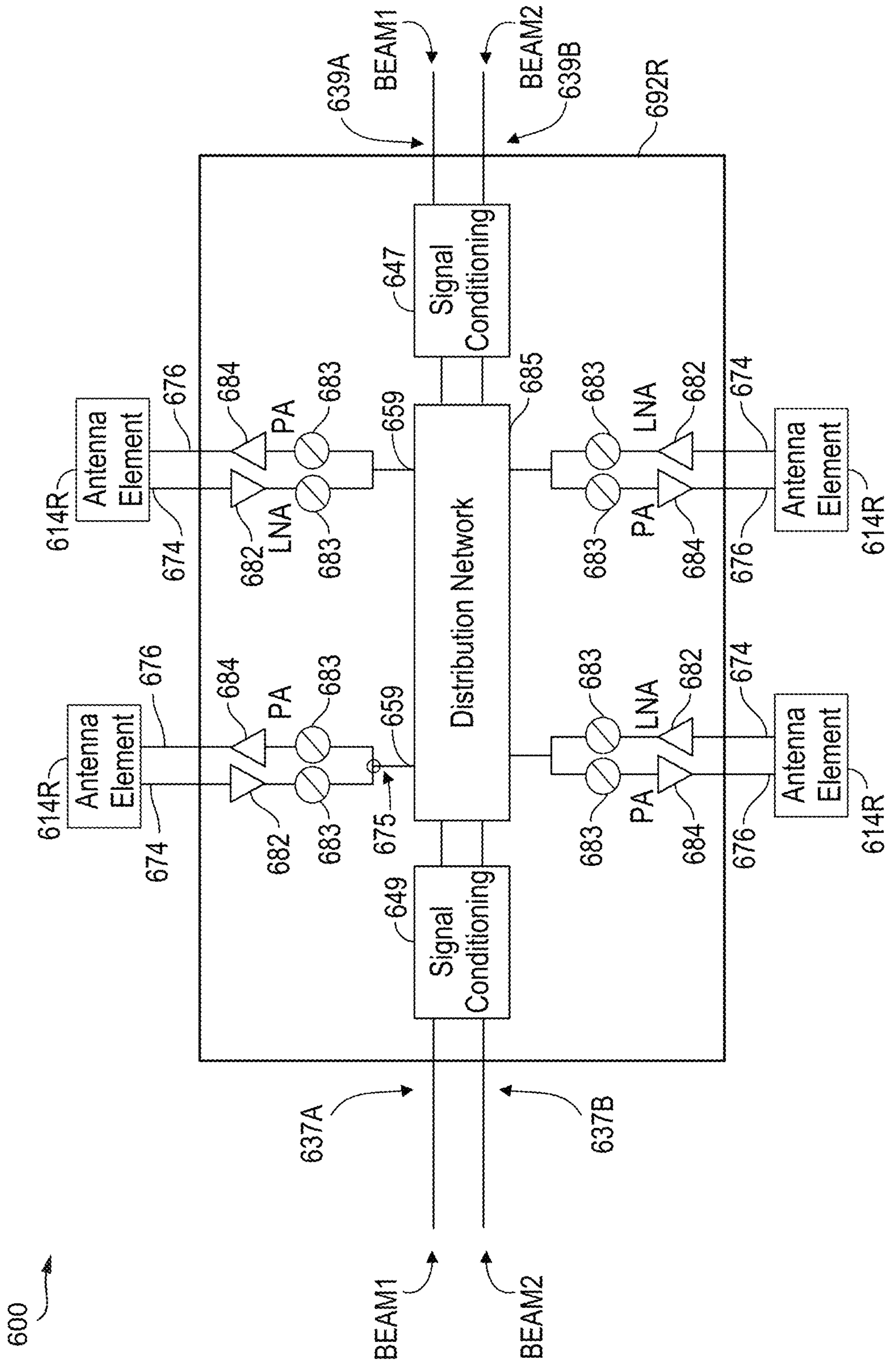
FIG. 6 is a diagram illustrating example components that can be included in an individual FE of a serially fed FE network, in accordance with some examples of the present disclosure.
Figure 7A:
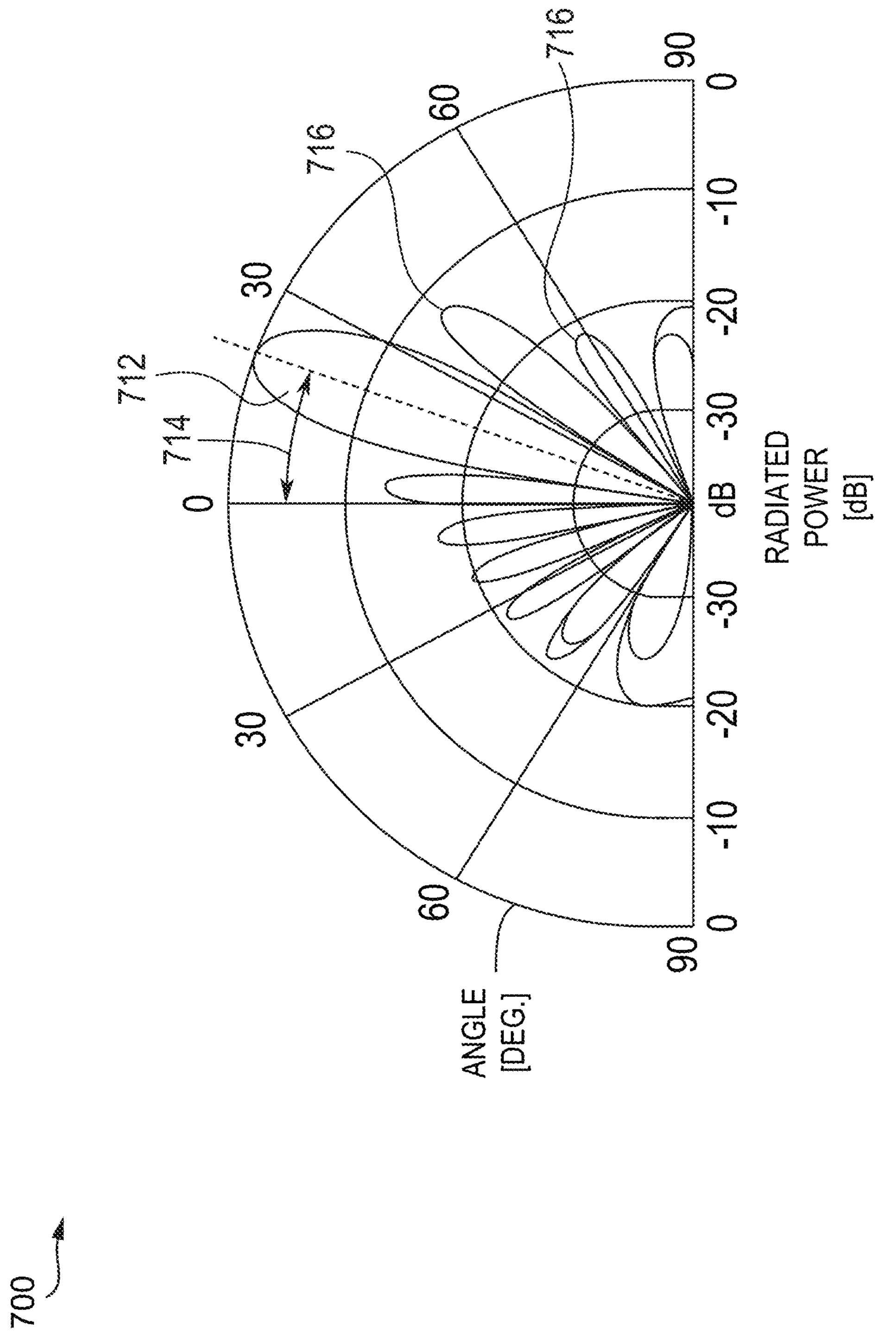
FIG. 7A is an example schematic illustrating an example main lobe and side lobes emanating from an antenna array of an example phased array antenna system, in accordance with some examples of the present disclosure.
Figure 7B:
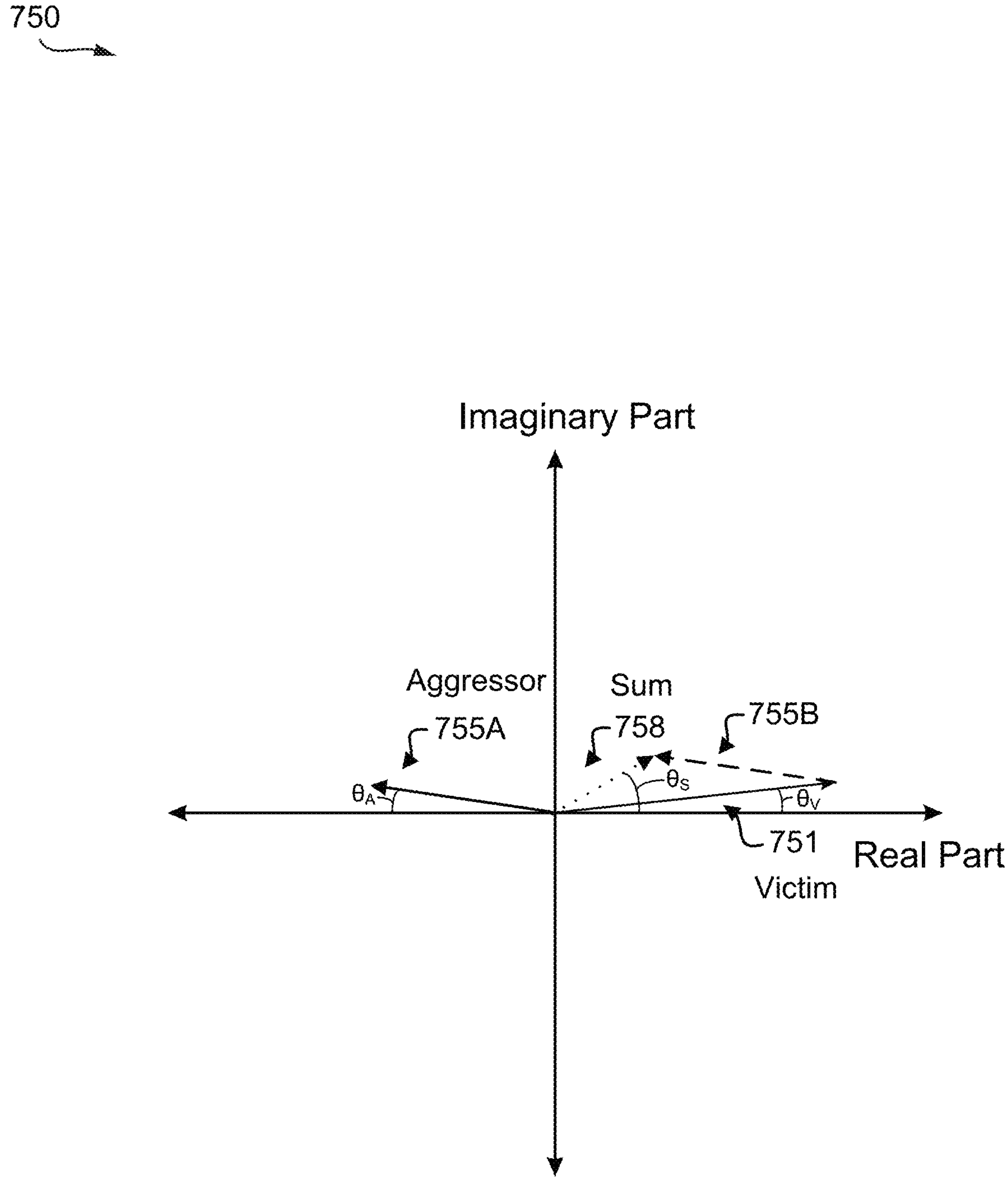
FIG. 7B is a diagram illustrating an example vector summation model defining a voltage magnitude and phase of a coupling result for a coupling victim and aggressor, in accordance with some examples of the present disclosure.
Figure 8A:
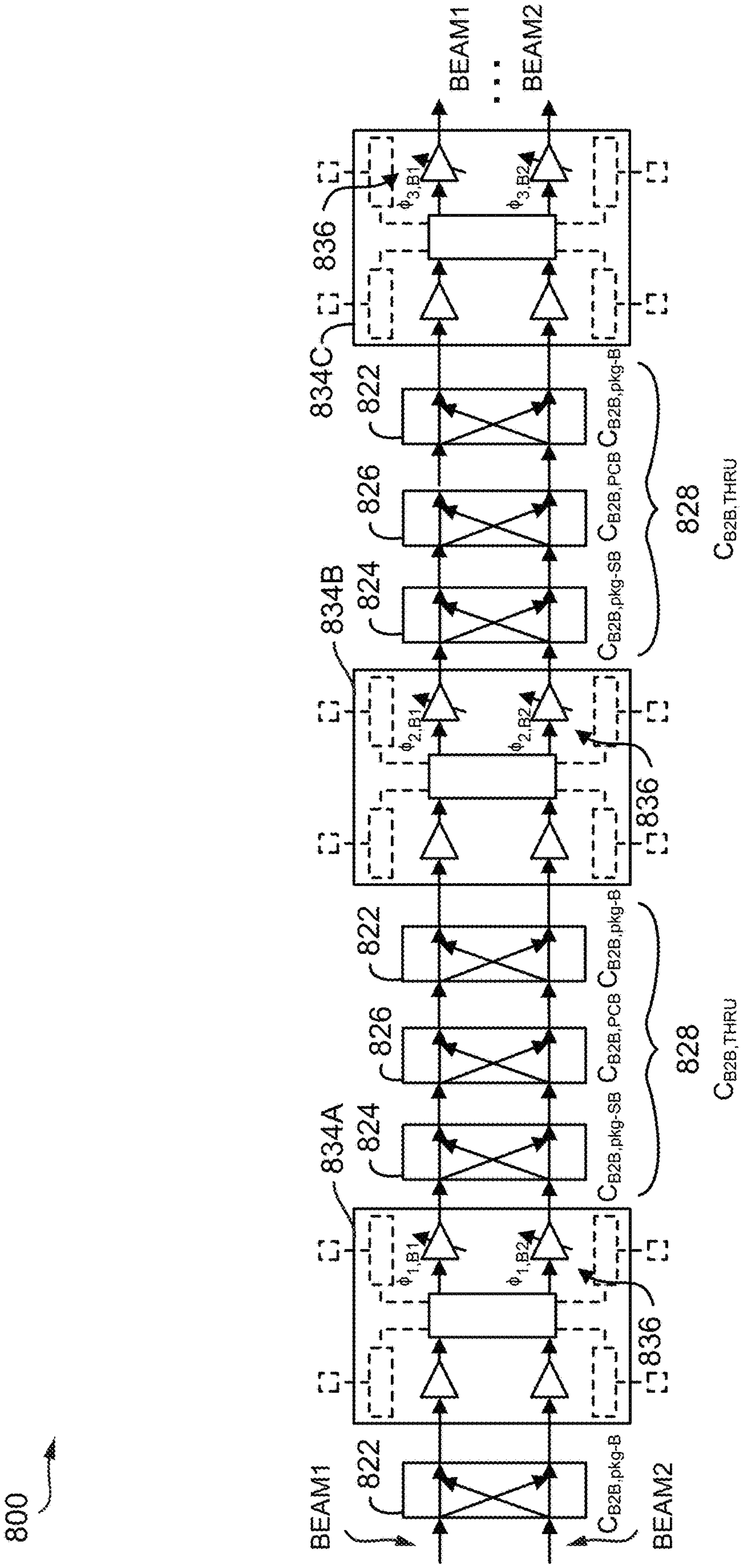
FIG. 8A is a diagram illustrating an example through path beam-to-beam (B2B) coupling configuration, in accordance with some examples of the present disclosure.
Figure 8B:
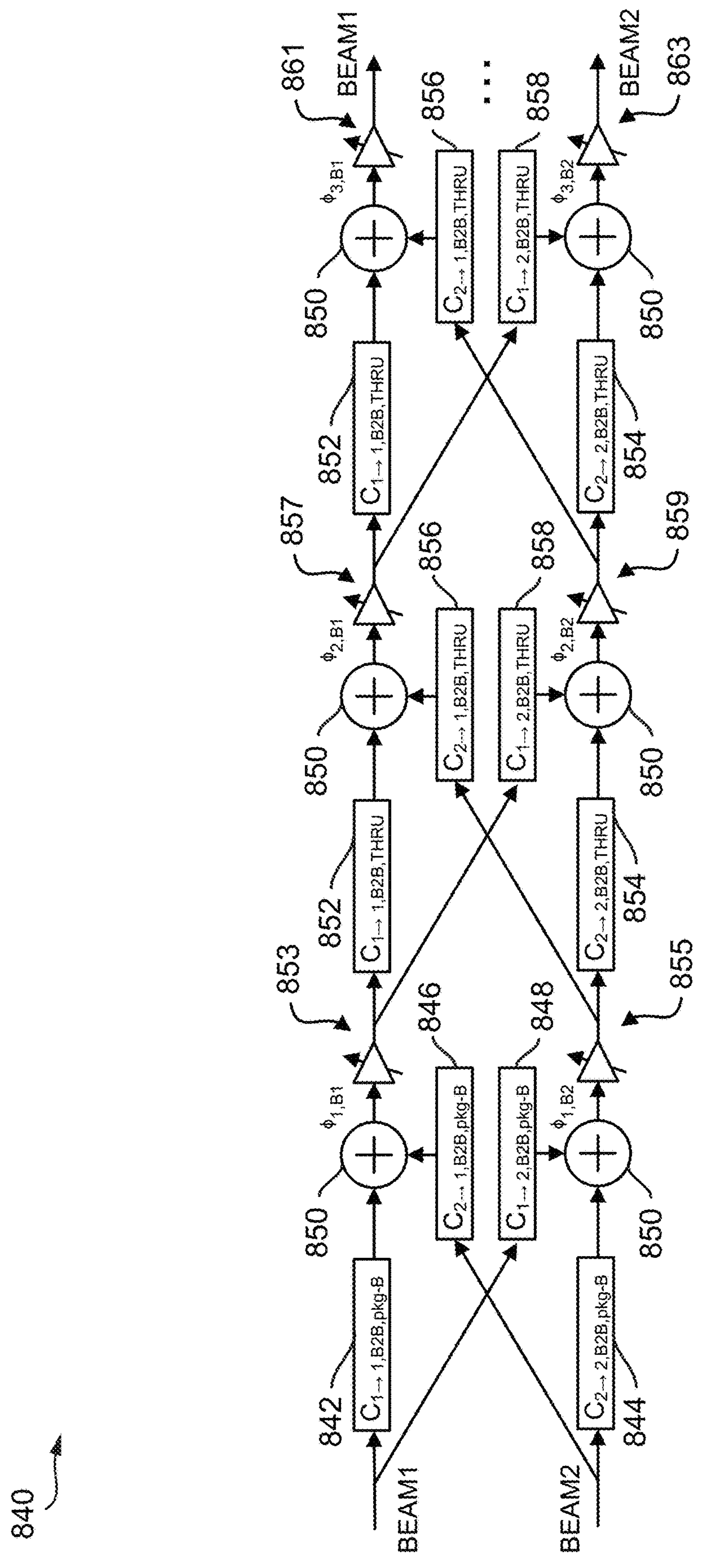
FIG. 8B is an additional block diagram illustrating B2B coupling coefficients of an example through path B2B coupling configuration, in accordance with some examples of the present disclosure.
Figure 9A:
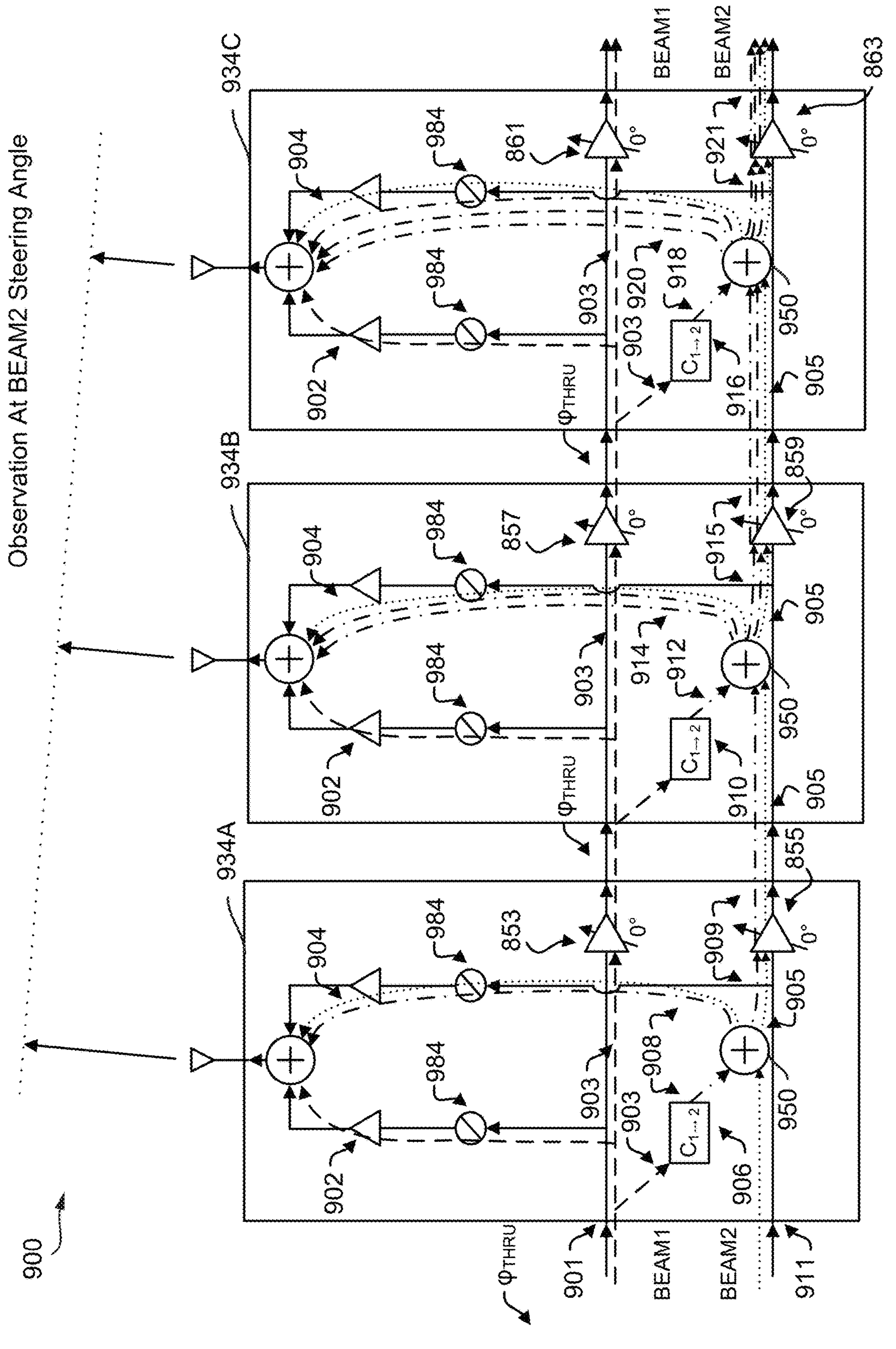
FIG. 9A illustrates a through path B2B coupling configuration without through path phase shifting, in accordance with some examples of the present disclosure.
Figure 9B:
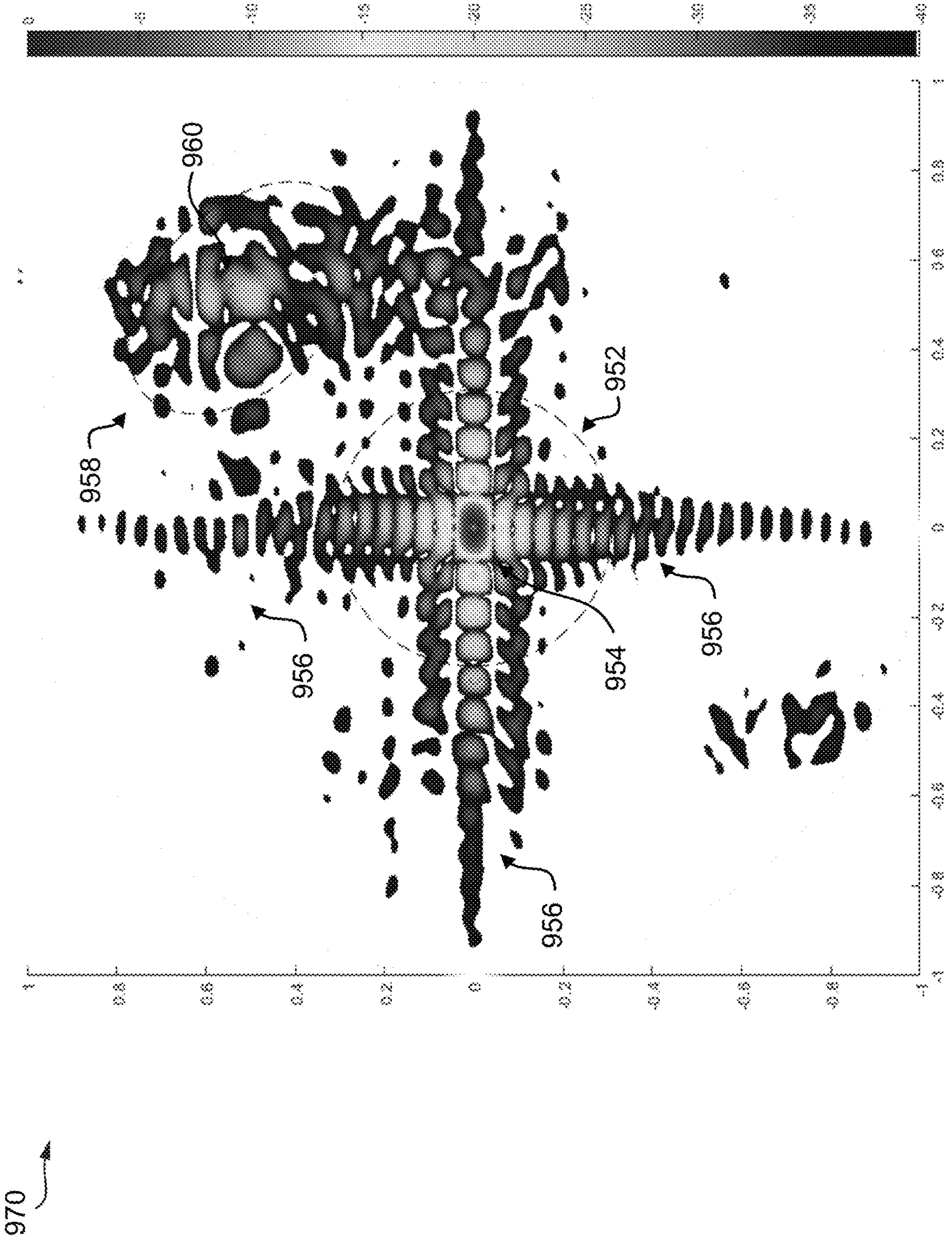
FIG. 9B illustrates a plot of first data beam BEAM1 radiation patterns (e.g., gain) in the steering direction of the first data beam BEAM1 and in the steering direction of second data beam BEAM2 for the example configuration 900 of FIG. 9A, in accordance with some examples of the present disclosure.
Figure 10A:
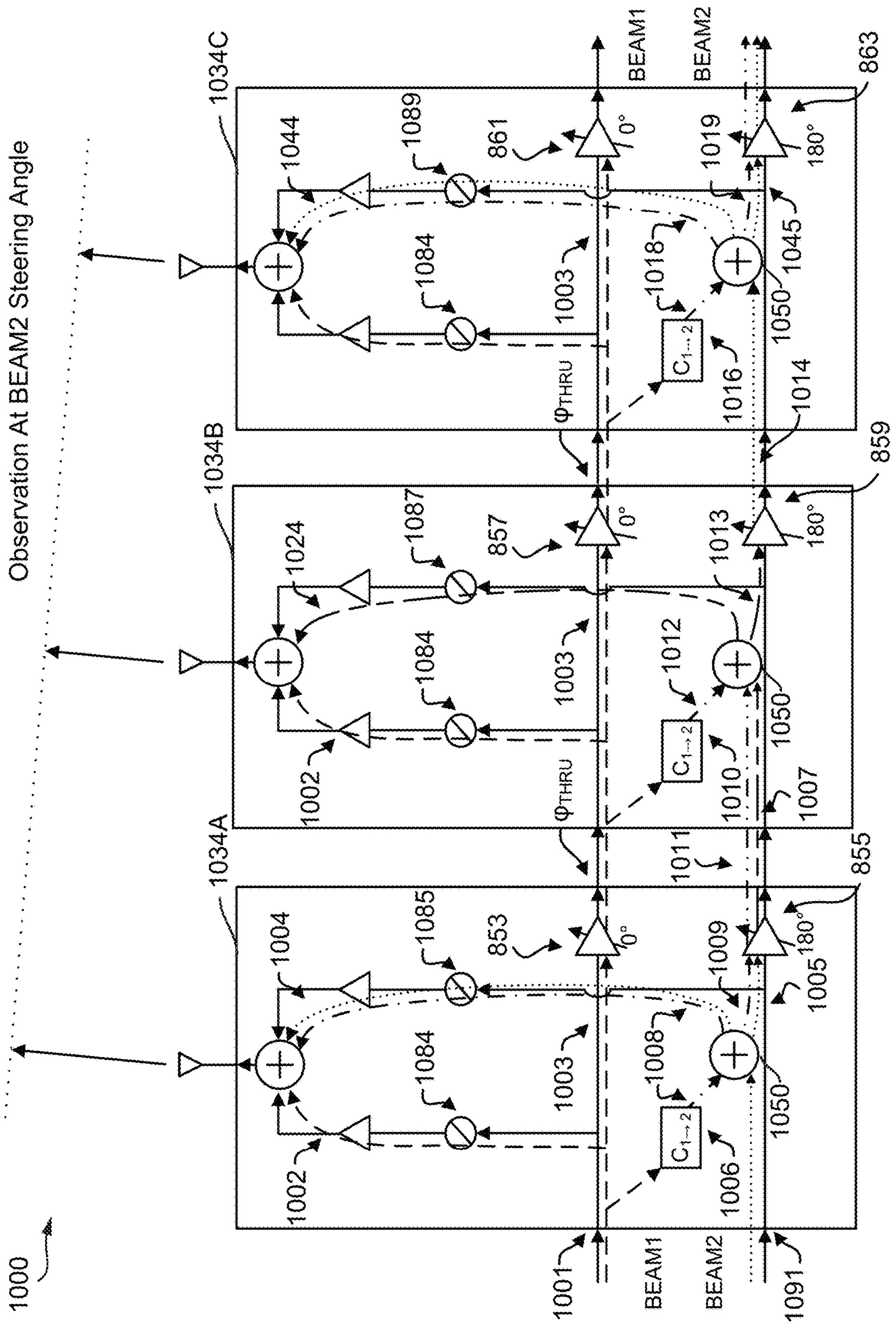
FIG. 10A illustrates an example configuration 1000 illustrating B2B coupling with non-alternating application of phase shifts for providing through path B2B coupling cancellation, in accordance with some examples of the present disclosure.
Figure 10B:
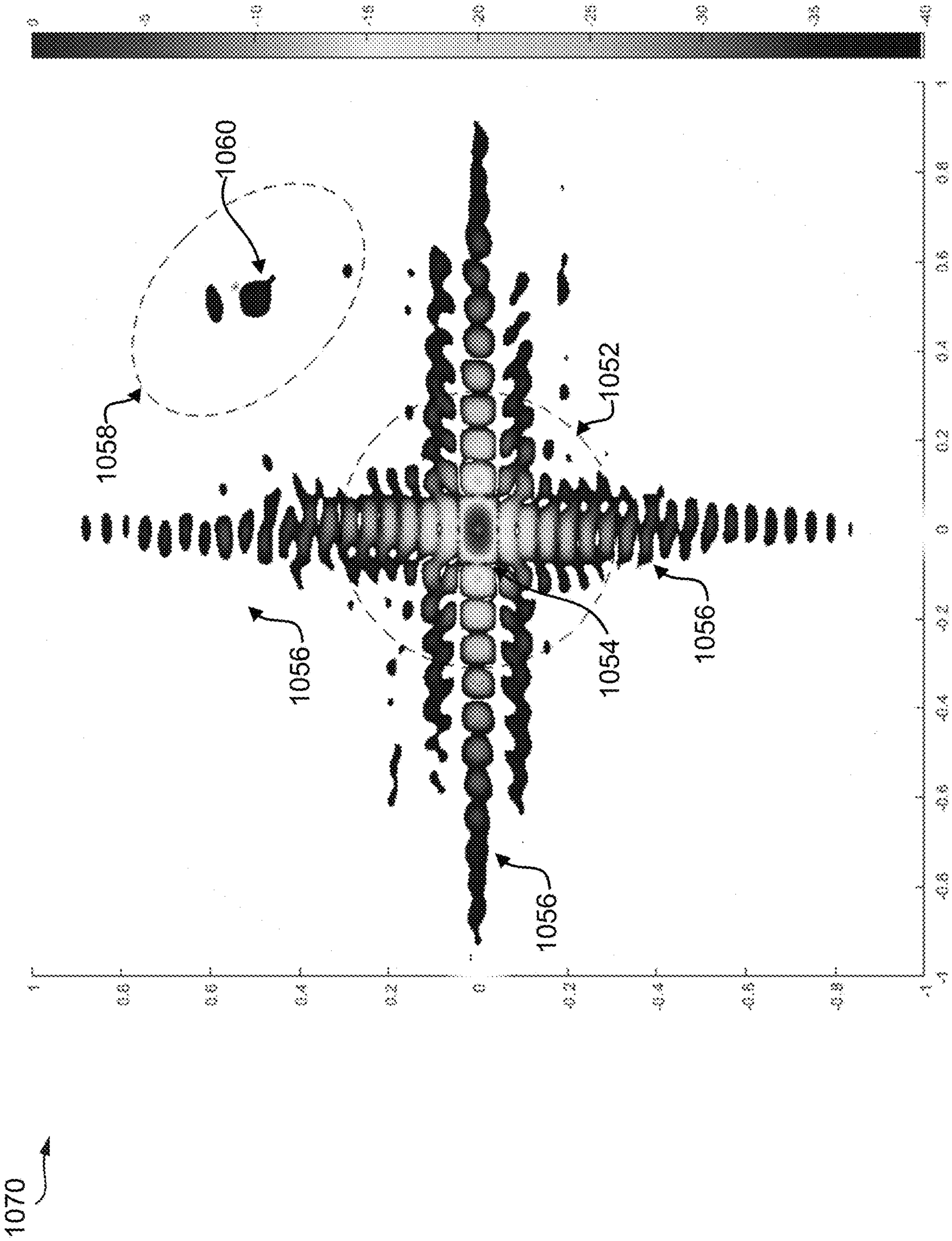
FIG. 10B illustrates a plot of first data beam BEAM1 radiation patterns in the steering direction of the first data beam BEAM1 and in the steering direction of second data beam BEAM2 for the example configuration 1000 of FIG. 10A, in accordance with some examples of the present disclosure.
Figure 11A:
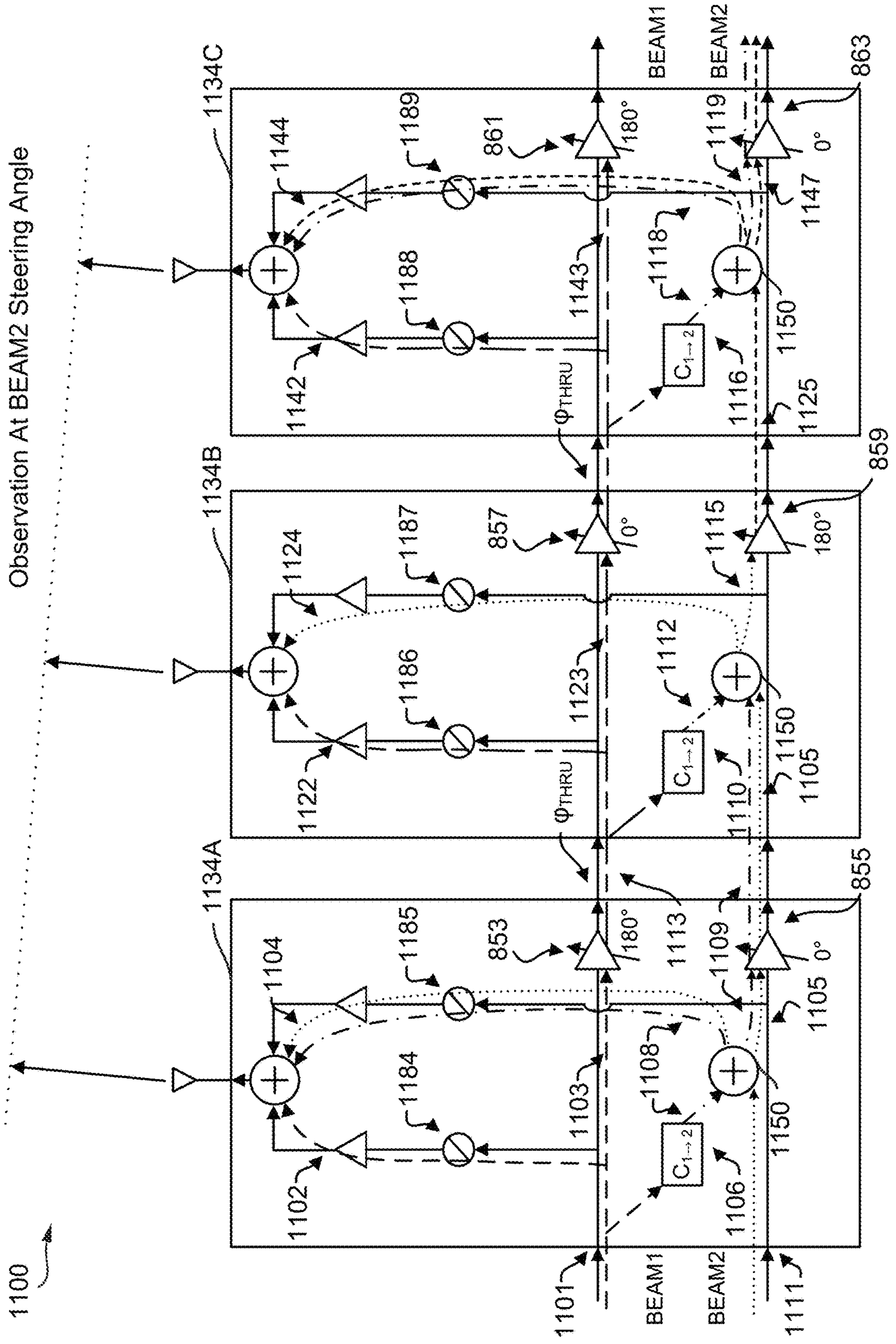
FIG. 11A illustrates an example configuration illustrating B2B coupling with alternating application of phase shifts for providing through path B2B coupling cancellation, in accordance with some examples of the present disclosure.
Figure 11B:
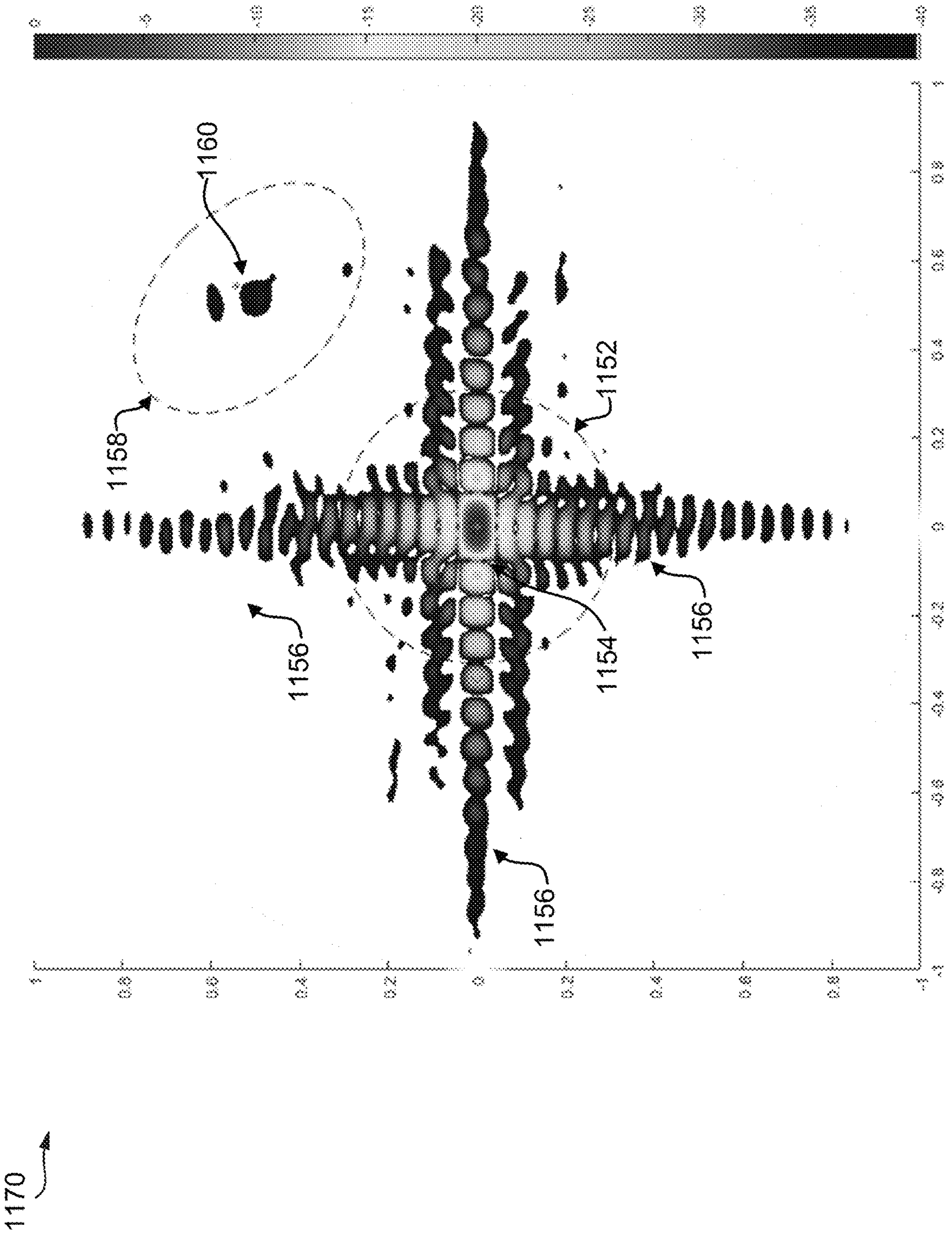
FIG. 11B illustrates a plot of first data beam BEAM1 radiation patterns (e.g., gain) in the steering direction of the first data beam BEAM1 and in the steering direction of second data beam BEAM2 for the example configuration 1100 of FIG. 11A, in accordance with some examples of the present disclosure.
Figure 12B:
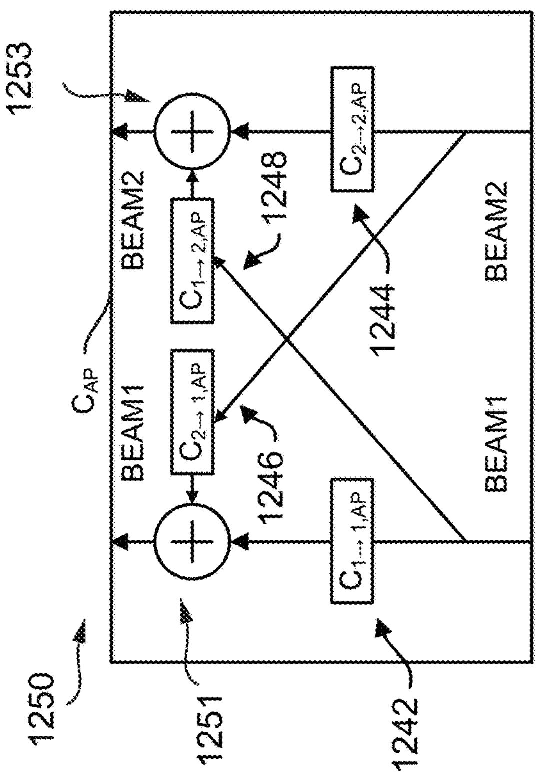
FIG. 12B illustrates an example coupling model for the AP B2B coupling block of FIG. 12A, in accordance with some examples of the present disclosure.
Figure 12A:
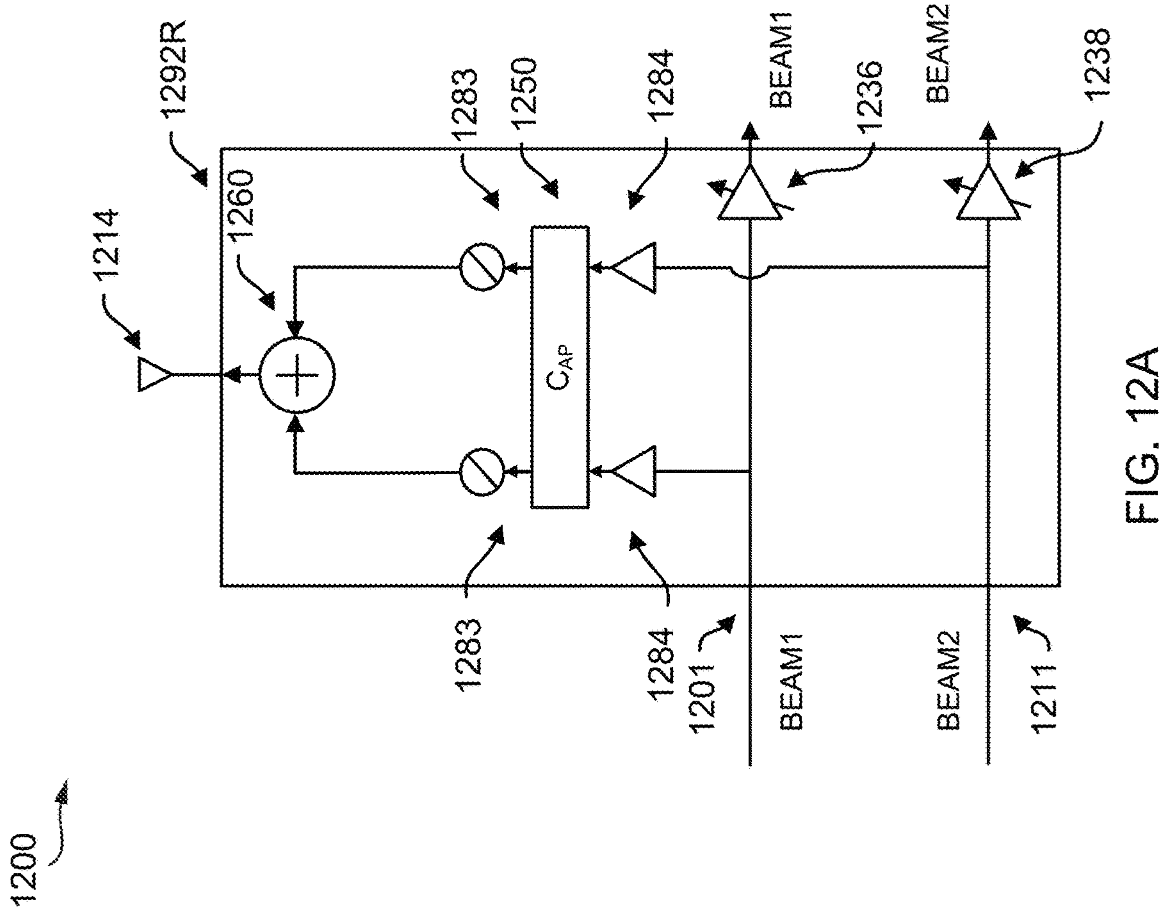
FIG. 12A illustrates a simplified diagram of an example individual FE in a transmit (Tx) configuration that can be utilized to perform antenna path (AP) B2B coupling cancellation in a serially fed FE network, in accordance with some examples of the present disclosure.
Figure 12D:
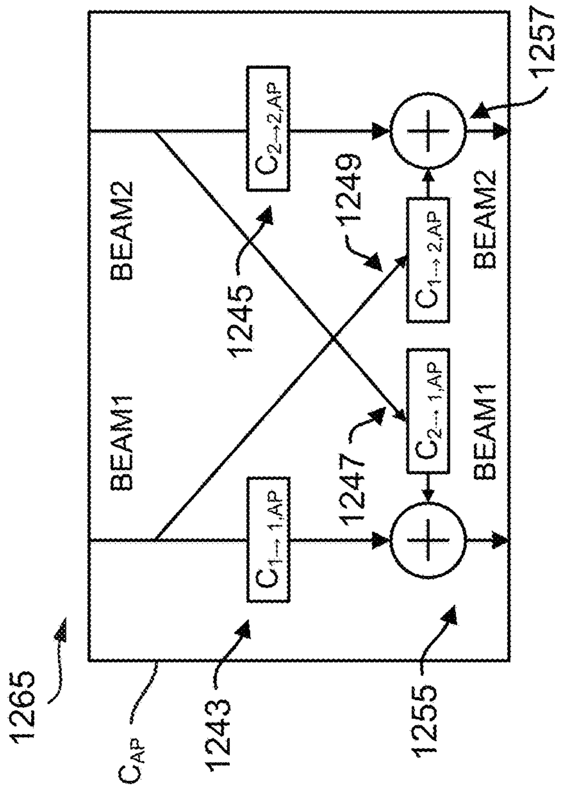
FIG. 12D illustrates an example coupling model for the AP B2B coupling block of FIG. 12C, in accordance with some examples of the present disclosure.
Figure 12C:
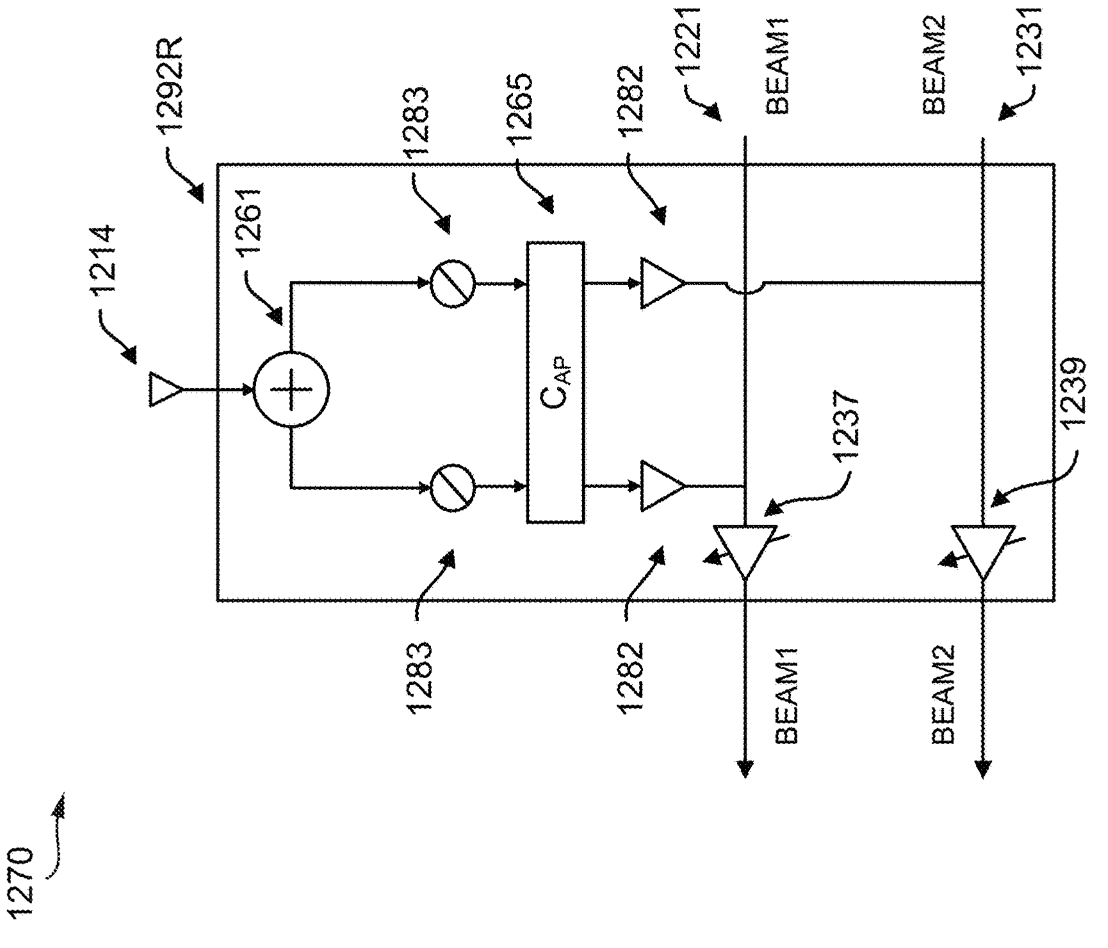
FIG. 12C illustrates a simplified diagram of an example individual FE in a receive (Rx) configuration that can be utilized to perform AP B2B coupling cancellation in a serially fed FE network, in accordance with some examples of the present disclosure.
Figure 13A:
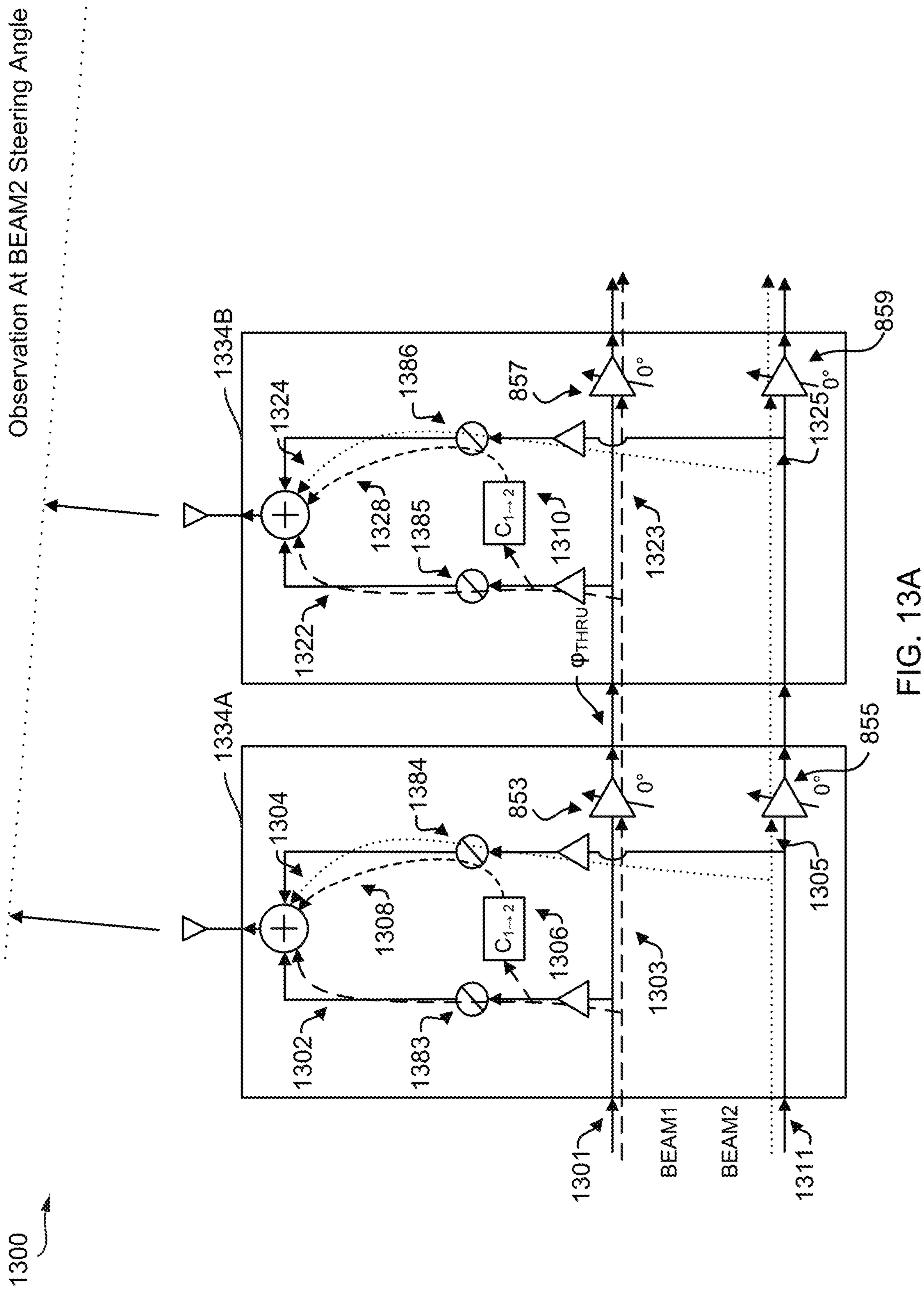
FIG. 13A illustrates an example configuration illustrating AP B2B coupling without application of phase shifts for providing AP B2B coupling cancellation, in accordance with some examples of the present disclosure.
Figure 13B:
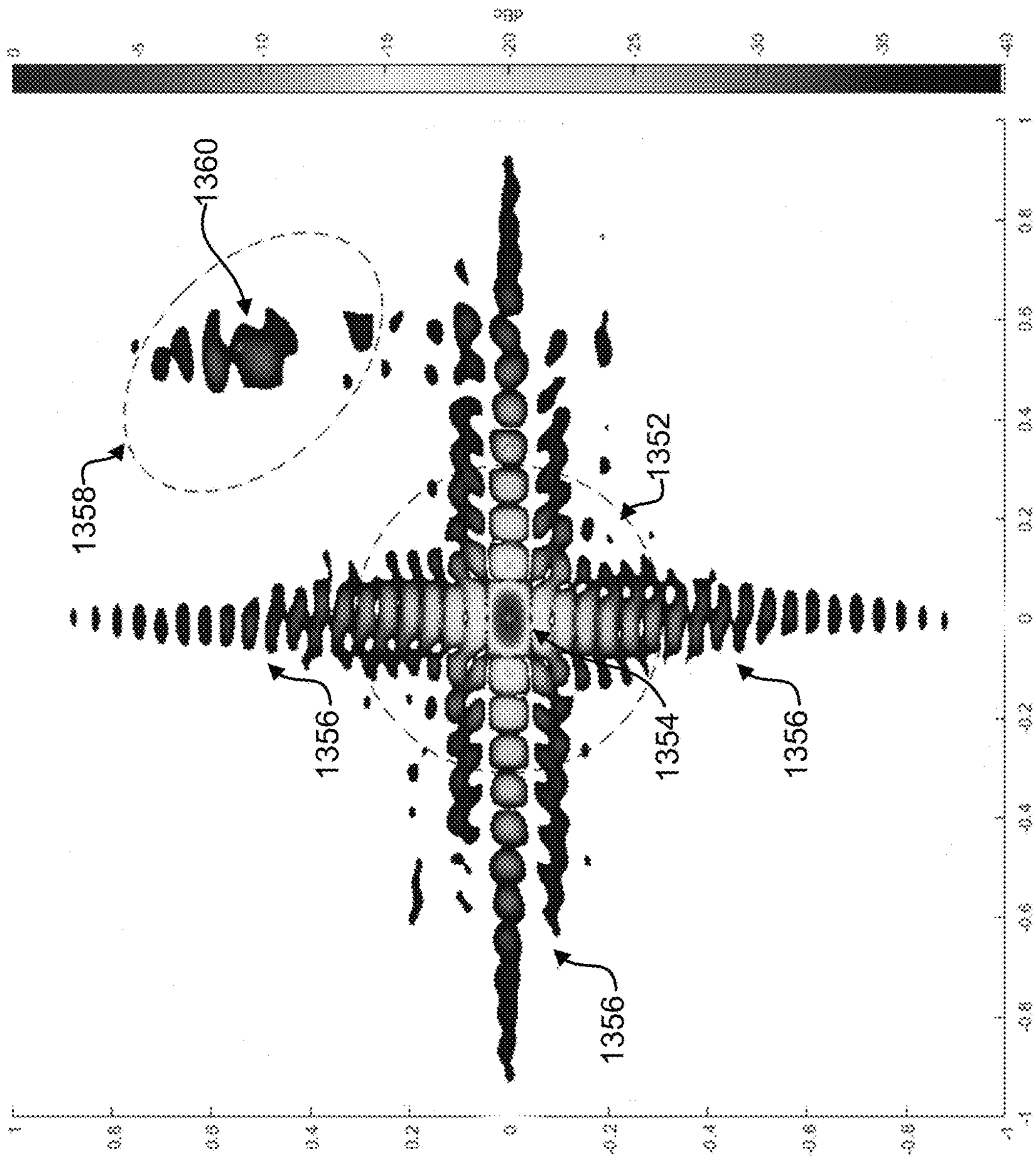
FIG. 13B illustrates a plot of first data beam BEAM1 radiation patterns in the steering direction of the first data beam BEAM1 and in the steering direction of second data beam BEAM2 for the example configuration of FIG. 13A, in accordance with some examples of the present disclosure.
Figure 14A:
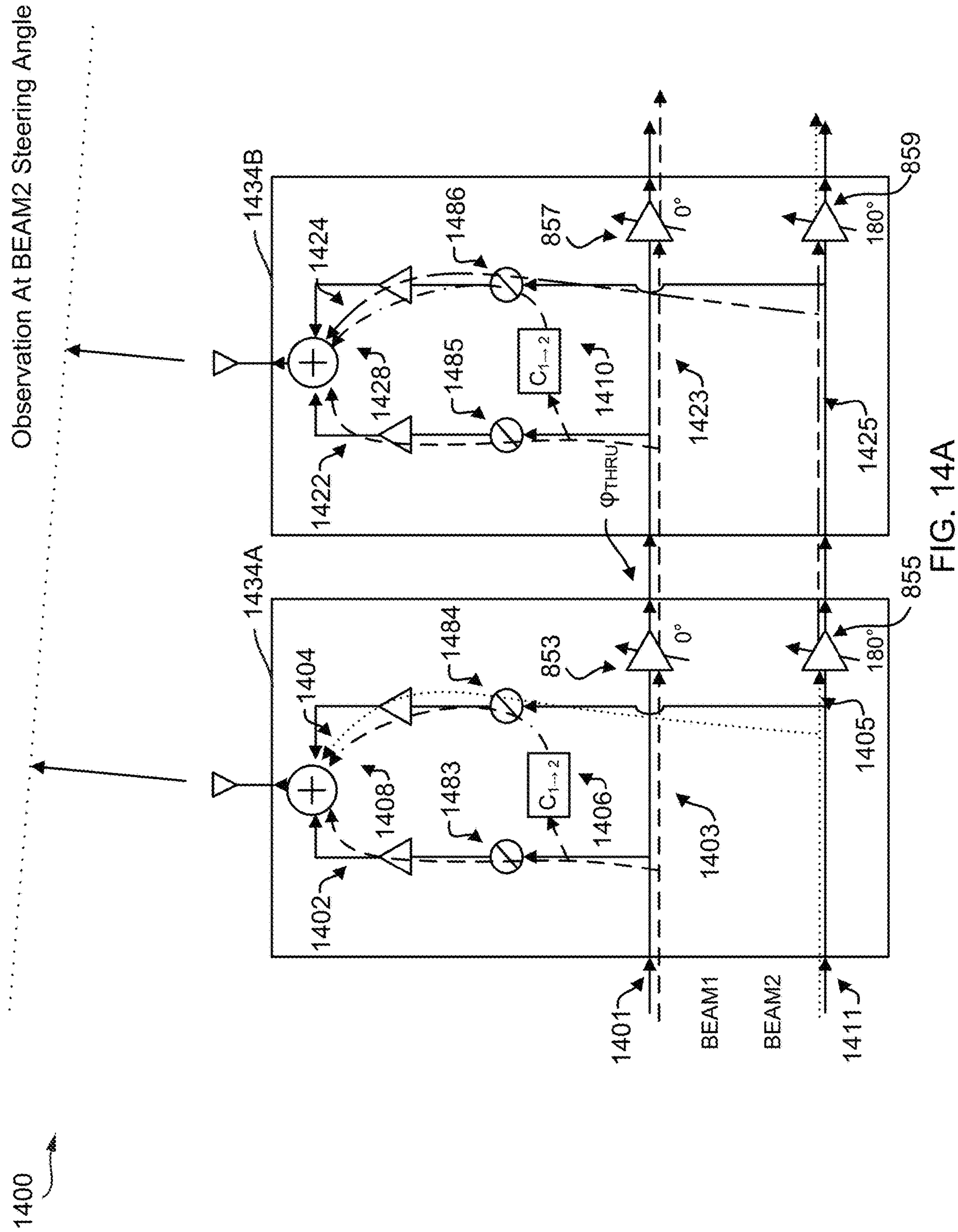
FIG. 14A illustrates an example configuration illustrating AP coupling with non-alternating application of phase shifts for providing AP B2B coupling cancellation, in accordance with some examples of the present disclosure.
Figure 14B:
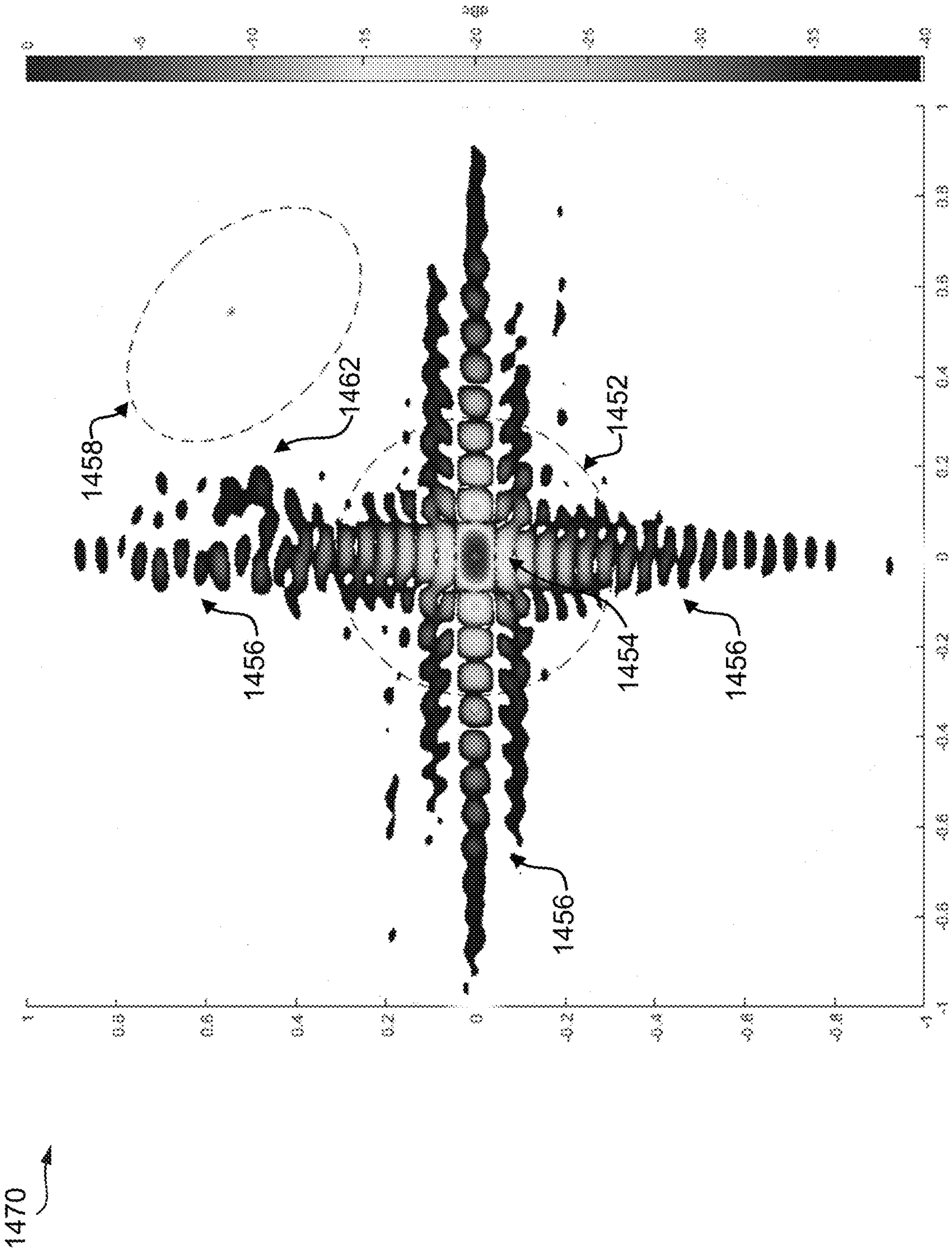
FIG. 14B illustrates a plot of first data beam BEAM1 radiation patterns in the steering direction of the first data beam BEAM1 and in the steering direction of second data beam BEAM2 for the example configuration of FIG. 14A, in accordance with some examples of the present disclosure.
Figure 15A:
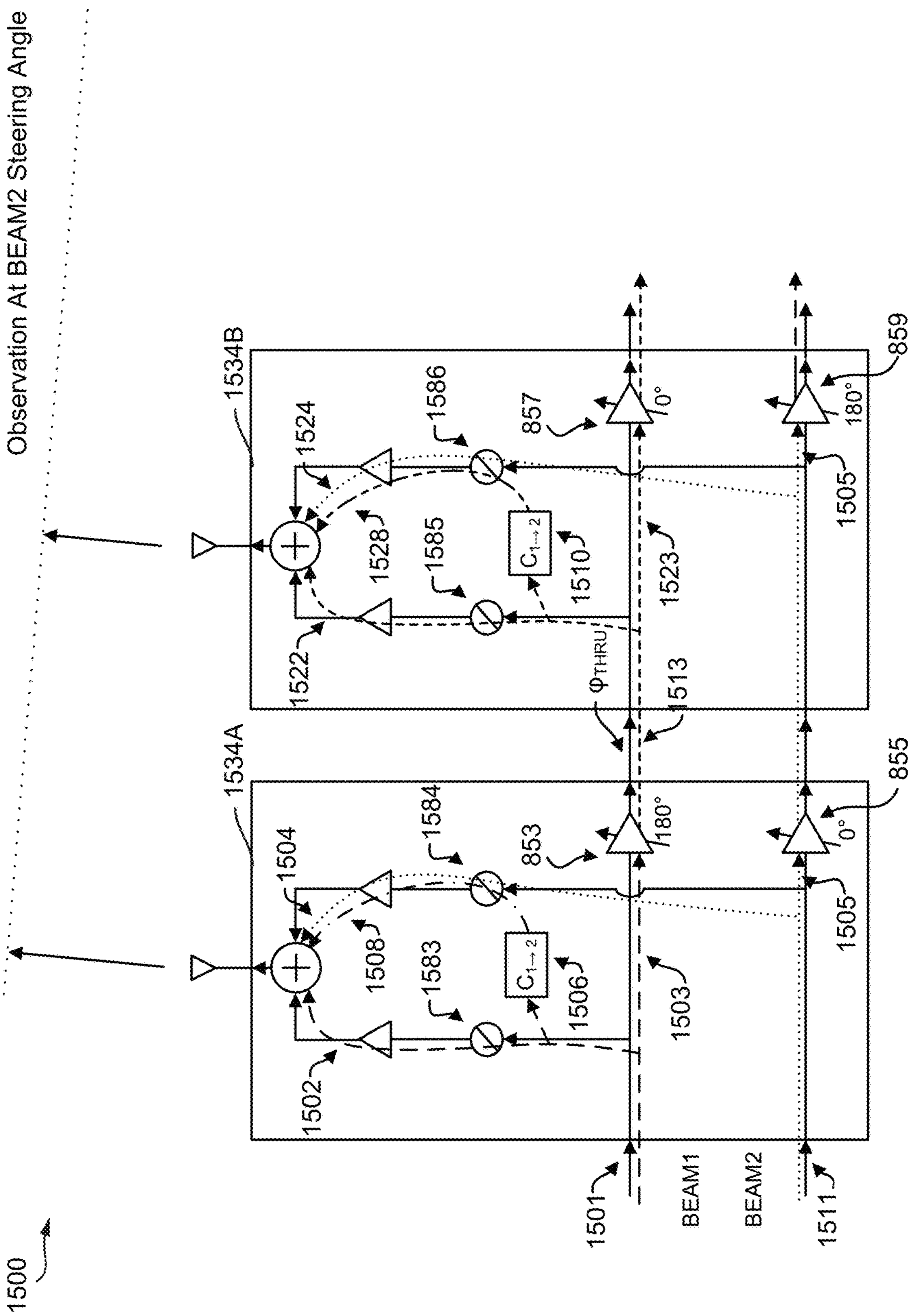
FIG. 15A illustrates an example configuration illustrating AP coupling with alternating application of phase shifts for providing AP B2B coupling cancellation, in accordance with some examples of the present disclosure.
Figure 15B:
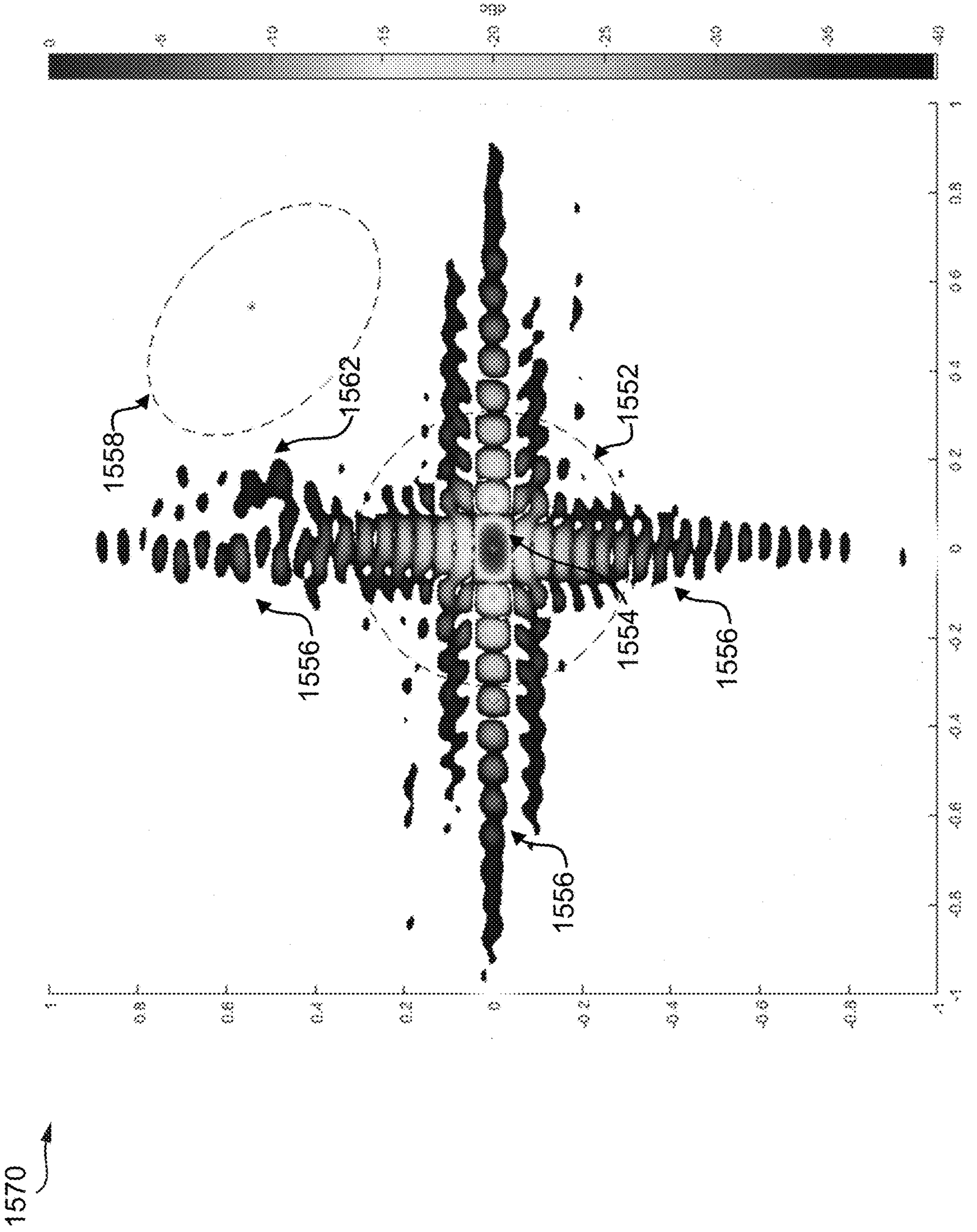
FIG. 15B illustrates a plot of first data beam BEAM1 radiation patterns in the steering direction of the first data beam BEAM1 and in the steering direction of second data beam BEAM2 for the example configuration of FIG. 15A, in accordance with some examples of the present disclosure.
Figure 16:
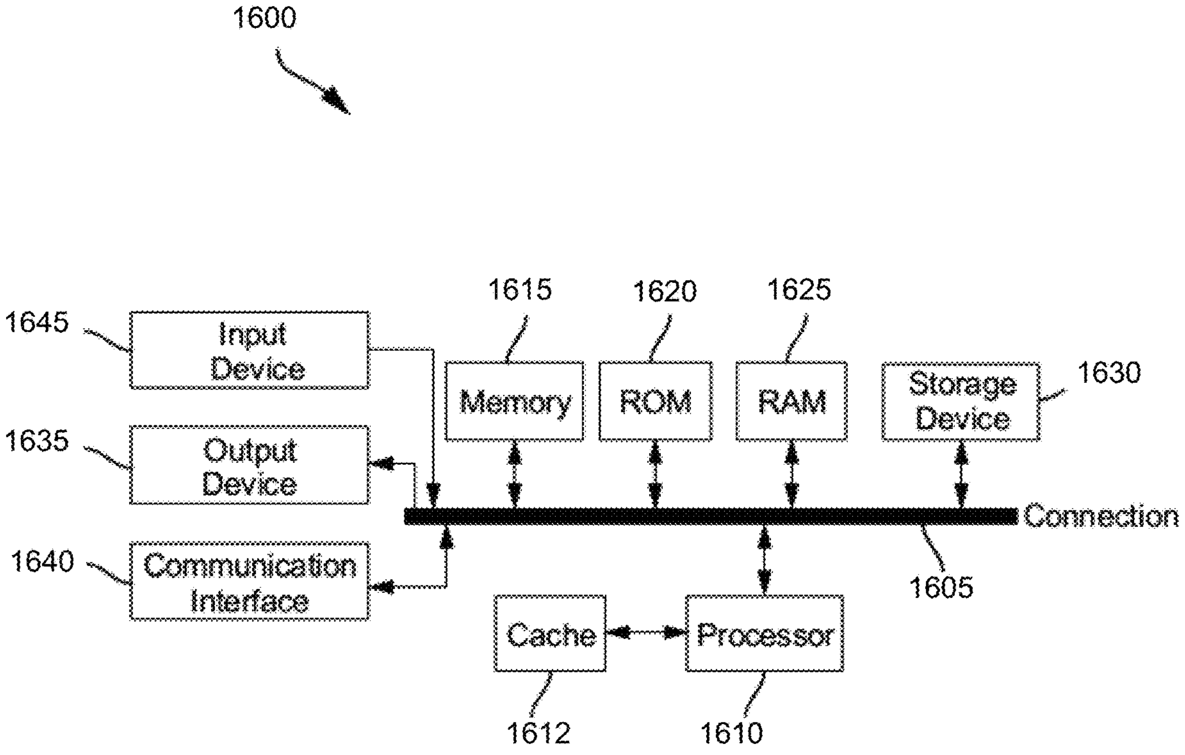
FIG. 16 is a diagram illustrating an example computing device architecture, in accordance with some examples of the present disclosure.

The disclosed systems and techniques will be described in the following disclosure as follows. The discussion begins with a description of example systems and technologies for wireless communications and example phased array antennas and circuits, as illustrated in FIG. 1A through FIG. 4C. A description of a block diagram for a signal distribution configuration for a multiple beam phased array antenna system, as illustrated in FIG. 5, will then follow. A description of a diagram illustrating example components that can be included in an individual FE of a serially fed FE network, as illustrated in FIG. 6, will then follow. A description of an example schematic illustrating an example main lobe and side lobes-emanating from an antenna array of an example phased array antenna system, as illustrated in FIG. 7A, will then follow. A description of a diagram illustrating an example vector summation model defining a voltage magnitude and phase of a coupling result for a coupling victim and aggressor, as illustrated in FIG. 7B, will then follow. A description of a diagram illustrating an example through path beam-to-beam (B2B) coupling configuration, as illustrated in FIG. 8A, will then follow. A description of an additional block diagram illustrating B2B coupling coefficients of an example through path B2B coupling configuration, as illustrated in FIG. 8B, will then follow. A description of diagrams illustrating example phase shifts for providing B2B coupling cancellation as illustrated in FIG. 8A and FIG. 8B, as illustrated in FIG. 8C through FIG. 8H, will then follow. A description of a through path B2B coupling configuration without through path phase shifting, as illustrated in FIG. 9A, will then follow. A description of a plot of first data beam BEAM1 radiation patterns (e.g., gain) in the steering direction of the first data beam BEAM1 and in the steering direction of second data beam BEAM2 for the example configuration 900 of FIG. 9A, as illustrated in FIG. 9B, will then follow. A description of illustrates an example configuration 1000 illustrating B2B coupling with non-alternating application of phase shifts for providing through path B2B coupling cancellation, as illustrated in FIG. 10A, will then follow. A description of a plot of first data beam BEAM1 radiation patterns in the steering direction of the first data beam BEAM1 and in the steering direction of second data beam BEAM2 for the example configuration 1000 of FIG. 10A, as illustrated in FIG. 10B, will then follow. A description of an example configuration illustrating B2B coupling with alternating application of phase shifts for providing through path B2B coupling cancellation, as illustrated in FIG. 11A, will then follow. A description of a plot of first data beam BEAM1 radiation patterns (e.g., gain) in the steering direction of the first data beam BEAM1 and in the steering direction of second data beam BEAM2 for the example configuration 1100 of FIG. 11A, as illustrated in FIG. 11B, will then follow. A description of a simplified diagram of an example individual FE in a transmit (Tx) configuration that can be utilized to perform antenna path (AP) B2B coupling cancellation in a serially fed FE network, as illustrated in FIG. 12A, will then follow. A description of an example coupling model for the AP B2B coupling block of FIG. 12A, as illustrated in FIG. 12B, will then follow. A description of a simplified diagram of an example individual FE in a receive (Rx) configuration that can be utilized to perform AP B2B coupling cancellation in a serially fed FE network, as illustrated in FIG. 12C, will then follow. A description of an example coupling model for the AP B2B coupling block of FIG. 12C, as illustrated in FIG. 12D, will then follow. A description of an example configuration illustrating AP B2B coupling without application of phase shifts for providing AP B2B coupling cancellation, as illustrated in FIG. 13A, will then follow. A description of illustrates a plot of first data beam BEAM1 radiation patterns in the steering direction of the first data beam BEAM1 and in the steering direction of second data beam BEAM2 for the example configuration of FIG. 13A, as illustrated in FIG. 13B, will then follow. A description of an example configuration illustrating AP coupling with non-alternating application of phase shifts for providing AP B2B coupling cancellation, as illustrated in FIG. 14A, will then follow. A description of a plot of first data beam BEAM1 radiation patterns in the steering direction of the first data beam BEAM1 and in the steering direction of second data beam BEAM2 for the example configuration of FIG. 14A, as illustrated in FIG. 14B, will then follow. A description of an example configuration illustrating AP coupling with alternating application of phase shifts for providing AP B2B coupling cancellation, as illustrated in FIG. 15A, will then follow. A description of a plot of first data beam BEAM1 radiation patterns in the steering direction of the first data beam BEAM1 and in the steering direction of second data beam BEAM2 for the example configuration of FIG. 15A, as illustrated in FIG. 15B, will then follow. The discussion concludes with a description of an example computing and architecture including example hardware components that can be implemented with phased array antennas and other electronic systems, as illustrated in FIG. 16. The disclosure now turns to FIG. 1A.

FIG. 1A is a block diagram illustrating an example wireless communication system 100, in accordance with some examples of the present disclosure. In this example, the wireless communication system 100 is a satellite-based communication system and includes one or more satellites (SATs) 102A-102N (collectively “102”), one or more satellite access gateways (SAGs) 104A-104N (collectively “104”), user terminals (UTs) 112A-112N (collectively “112”), user network devices 114A-114N (collectively “114”), and a ground network 120 in communication with a network 130, such as the Internet.

The SATs 102 can include orbital communications satellites capable of communicating with other wireless devices or networks (e.g., 104, 112, 114, 120, 130) via radio telecommunications signals. The SATs 102 can provide communication channels, such as radio frequency (RF) links (e.g., 106, 108, 116), between the SATs 102 and other wireless devices located at different locations on Earth and/or in orbit. In some examples, the SATs 102 can establish communication channels for Internet, radio, television, telephone, radio, military; and/or other applications.

The UTs 112 can include any electronic devices and/or physical equipment that support RF communications to and from the SATs 102. The SAGs 104 can include gateways or earth stations that support RF communications to and from the SATs 102. The UTs 112 and the SAGs 104 can include antennas for wirelessly communicating with the SATs 102. The UTs 112 and the SAGs 104 can also include satellite modems for modulating and demodulating radio waves used to communicate with the SATs 102. In some examples, the UTs 112 and/or the SAGs 104 can include one or more server computers, routers, ground receivers, earth stations, user equipment, antenna systems, communication nodes, base stations, access points, and/or any other suitable device or equipment. In some cases, the UTs 112 and/or the SAGs 104 can perform phased-array beamforming and digital processing to support highly directive, steered antenna beams that track the SATs 102. Moreover, the UTs 112 and/or the SAGs 104 can use one or more frequency bands to communicate with the SATs 102, such as the Ku and/or Ka frequency bands.

The UTs 112 can be used to connect the user network devices 114 to the SATs 102 and ultimately the network 130. The SAGs 104 can be used to connect the ground network 120 and the network 130 to the SATs 102. For example, the SAGs 104 can relay communications from the ground network 120 and/or the network 130 to the SATs 102, and communications from the SATs 102 (e.g., communications originating from the user network devices 114, the UTs 112, or the SATs 102) to the ground network 120 and/or the network 130.

The user network devices 114 can include any electronic devices with networking capabilities and/or any combination of electronic devices such as a computer network. For example, the user network devices 114 can include routers, network modems, switches, access points, smart phones, laptop computers, servers, tablet computers, set-top boxes, Internet-of-Things (IoT) devices, smart wearable devices (e.g., head-mounted displays (HMDs), smart watches, etc.), gaming consoles, smart televisions, media streaming devices, autonomous vehicles or devices, user networks, etc. The ground network 120 can include one or more networks and/or data centers. For example, the ground network 120 can include a public cloud, a private cloud, a hybrid cloud, an enterprise network, a service provider network, an on-premises network, and/or any other network.

In some cases, the SATs 102 can establish communication links between the SATs 102 and the UTs 112. For example, SAT 102A can establish communication links 116 between the SAT 102A and the UTs 112A-112D and/or 112E-112N. The communication links 116 can provide communication channels between the SAT 102A and the UTs 112A-112D and/or 112E-112N. In some examples, the UTs 112 can be interconnected (e.g., via wired and/or wireless connections) with the user network devices 114. Thus, the communication links between the SATs 102 and the UTs 112 can enable communications between the user network devices 114 and the SATs 102. In some examples, each of the SATs 102A-N can serve UTs 112 distributed across and/or located within one or more cells 110A-110N (collectively "110"). The cells 110 can represent geographic areas served and/or covered by the SATs 102. For example, each cell can represent an area corresponding to the satellite footprint of radio beams propagated by a SAT. In some cases, a SAT can cover a single cell. In other cases, a SAT can cover multiple cells. In some examples, a plurality of SATs 102 can be in operation simultaneously at any point in time (also referred to as a satellite constellation). Moreover, different SATs can serve different cells and sets of user terminals.

The SATs 102 can also establish communication links 106 with each other to support inter-satellite communications. Moreover, the SATs 102 can establish communication links 108 with the SAGs 104. In some cases, the communication links between the SATs 102 and the UTs 112 and the communication links between the SATs 102 and the SAGs 104 can allow the SAGs 104 and the UTs 112 to establish a communication channel between the user network devices 114, the ground network 120 and ultimately the network 130. For example, the UTs 112A-D and/or 112E-N can connect the user network devices 114A-114D and/or 114E-114N to the SAT 102A through the communication links 116 between the SAT 102A and the UTs 112A-D and/or 112E-N. The SAG 104A can connect the SAT 102A to the ground network 120, which can connect the SAGs 104A-N to the network 130. Thus, the communication links 108 and 116, the SAT 102A, the SAG 104A, the UTs 112A-D and/or 112E-N and the ground network 120 can allow the user network devices 114A-114D and/or 114E-114N to connect to the network 130.

In some examples, a user can initiate an Internet connection and/or communication through a user network device from the user network devices 114. The user network device can have a network connection to a user terminal from the UTs 112, which it can use to establish an uplink (UL) pathway to the network 130. The user terminal can wirelessly communicate with a particular SAT from the SATs 102, and the particular SAT can wirelessly communicate with a particular SAG from the SAGs 104. The particular SAG can be in communication (e.g., wired and/or wireless) with the ground network 120 and, by extension, the network 130. Thus, the particular SAG can enable the Internet connection and/or communication from the user network device to the ground network 120 and, by extension, the network 130.

In some cases, the particular SAT and SAG can be selected based on signal strength, line-of-sight, and the like. If a SAG is not immediately available to receive communications from the particular SAT, the particular SAG can be configured to communicate with another SAT. The second SAT can in turn continue the communication pathway to a particular SAG. Once data from the network 130 is obtained for the user network device, the communication pathway can be reversed using the same or different SAT and/or SAG as used in the UL pathway.

In some examples, the communication links (e.g., 106, 108, and 116) in the wireless communication system 100 can operate using orthogonal frequency division multiple access (OFDMA) via time domain and frequency domain multiplexing. OFDMA, also known as multicarrier modulation, transmits data over a bank of orthogonal subcarriers harmonically related by the fundamental carrier frequency. Moreover, in some cases, for computational efficiency, fast Fourier transforms (FFT) and inverse FFT can be used for modulation and demodulation.

While the wireless communication system 100 is shown to include certain elements and components, one of ordinary skill will appreciate that the wireless communication system 100 can include more or fewer elements and components than those shown in FIG. 1A. For example, the wireless communication system 100 can include, in some instances, networks, cellular towers, communication hops or pathways, network equipment, and/or other electronic devices that are not shown in FIG. 1A.

Figure 1B:
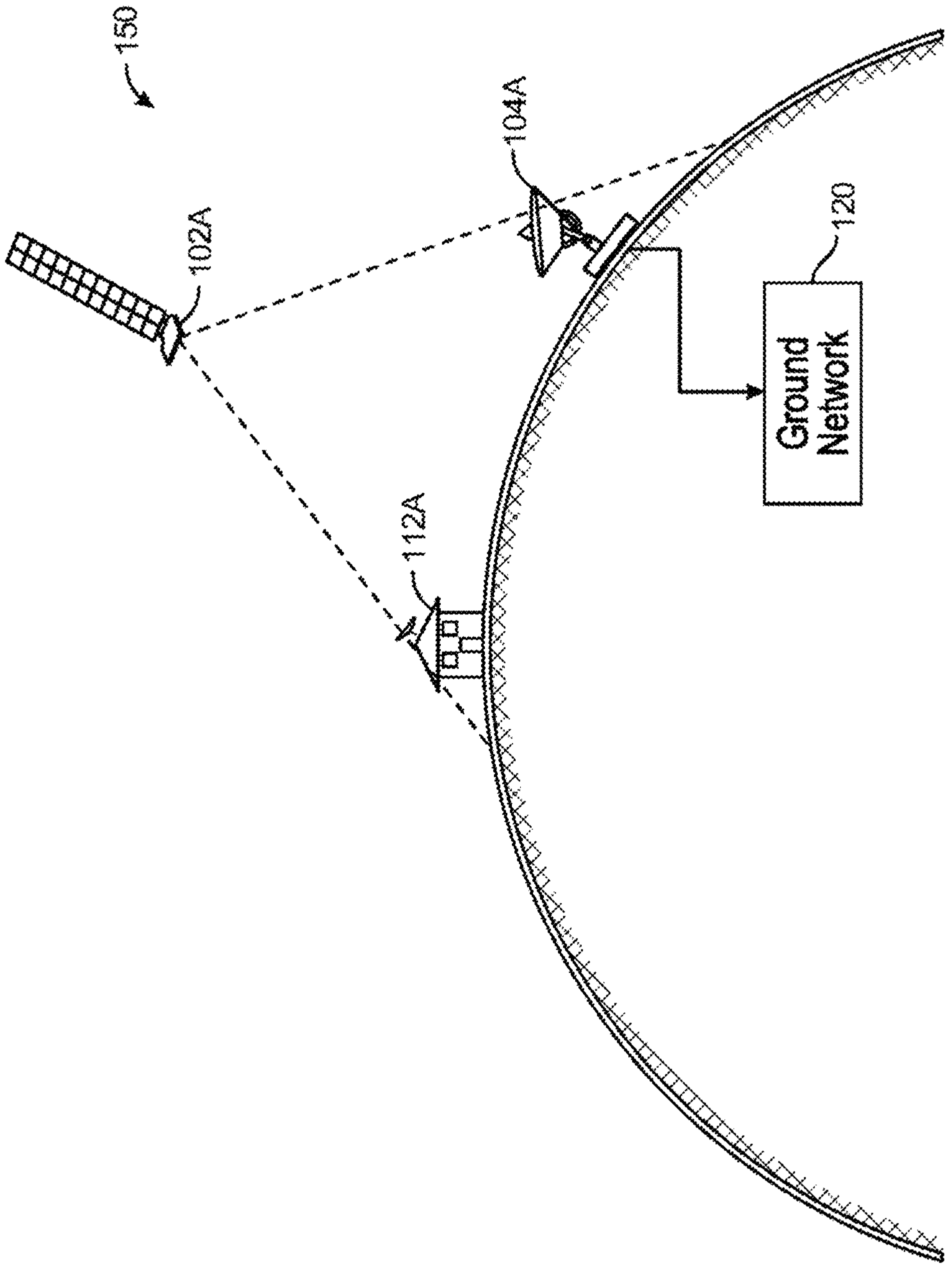
FIG. 1B is a simplified diagram illustrating an example of communication in a satellite communication system, in accordance with some examples of the present disclosure.

FIG. 1B is a diagram illustrating an example of an antenna and satellite communication system 150 in accordance with some examples of the present disclosure. As shown in FIG.

1B, an Earth-based UT 112A is installed at a location directly or indirectly on the Earth's surface such as a house, building, tower, vehicle, or another location where it is desired to obtain communication access via a network of satellites.

A communication path may be established between the UT 112A and SAT 102A. In the illustrated example, the SAT 102A, in turn, establishes a communication path with a SAG 104A. In another example, the SAT 102A may establish a communication path with another satellite prior to communication with SAG 104A. The SAG 104A may be physically connected via fiber optic, Ethernet, or another physical connection to a ground network 120. The ground network 120 may be and/or in communication with, any type of network, including the Internet. While one satellite is illustrated, communication may be with and between a constellation of satellites.

Figure 2A:
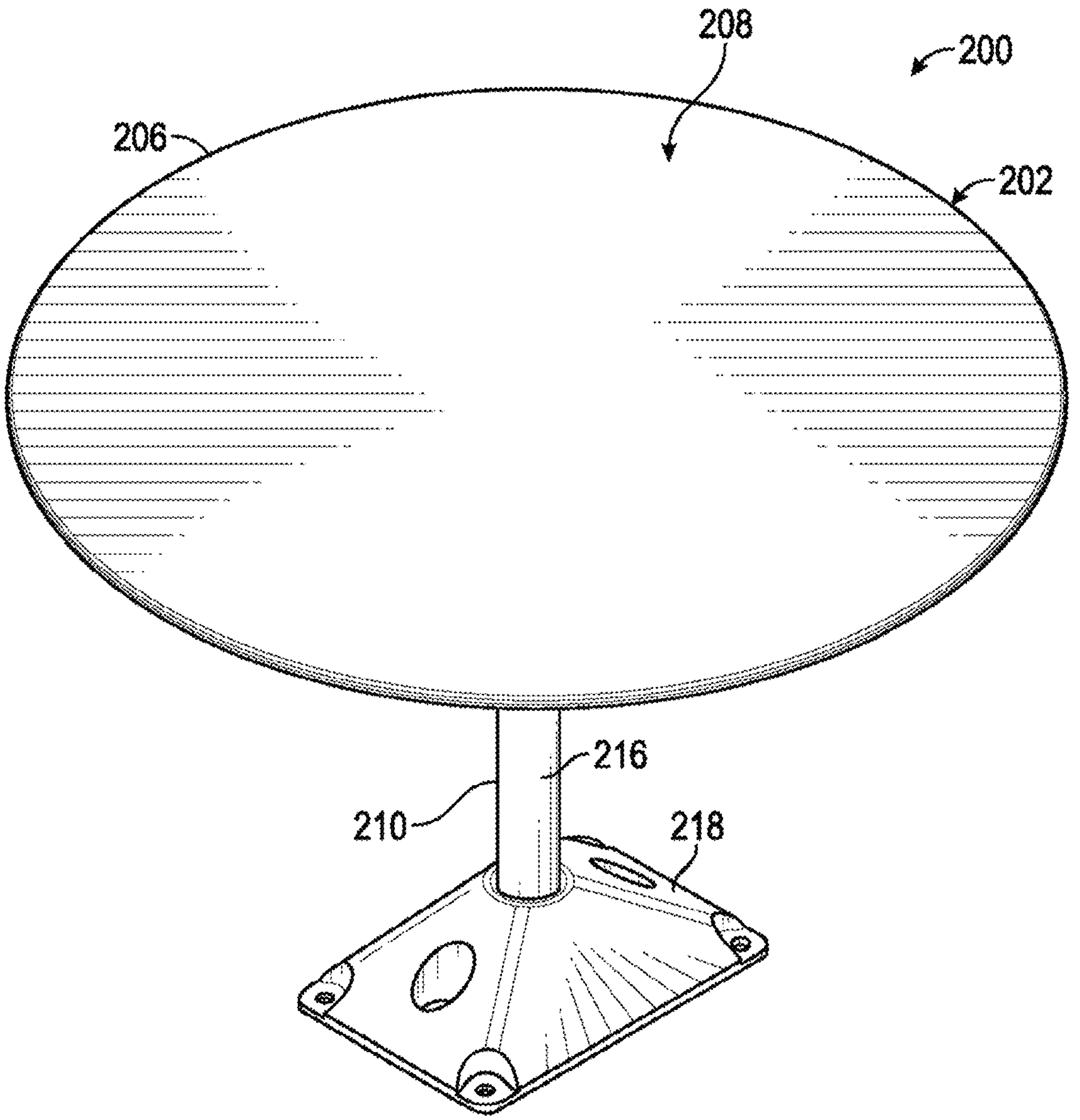
FIGS. 2A and 2B are isometric top and bottom views depicting an exemplary antenna apparatus, in accordance with some examples of the present disclosure.
Figure 2B:
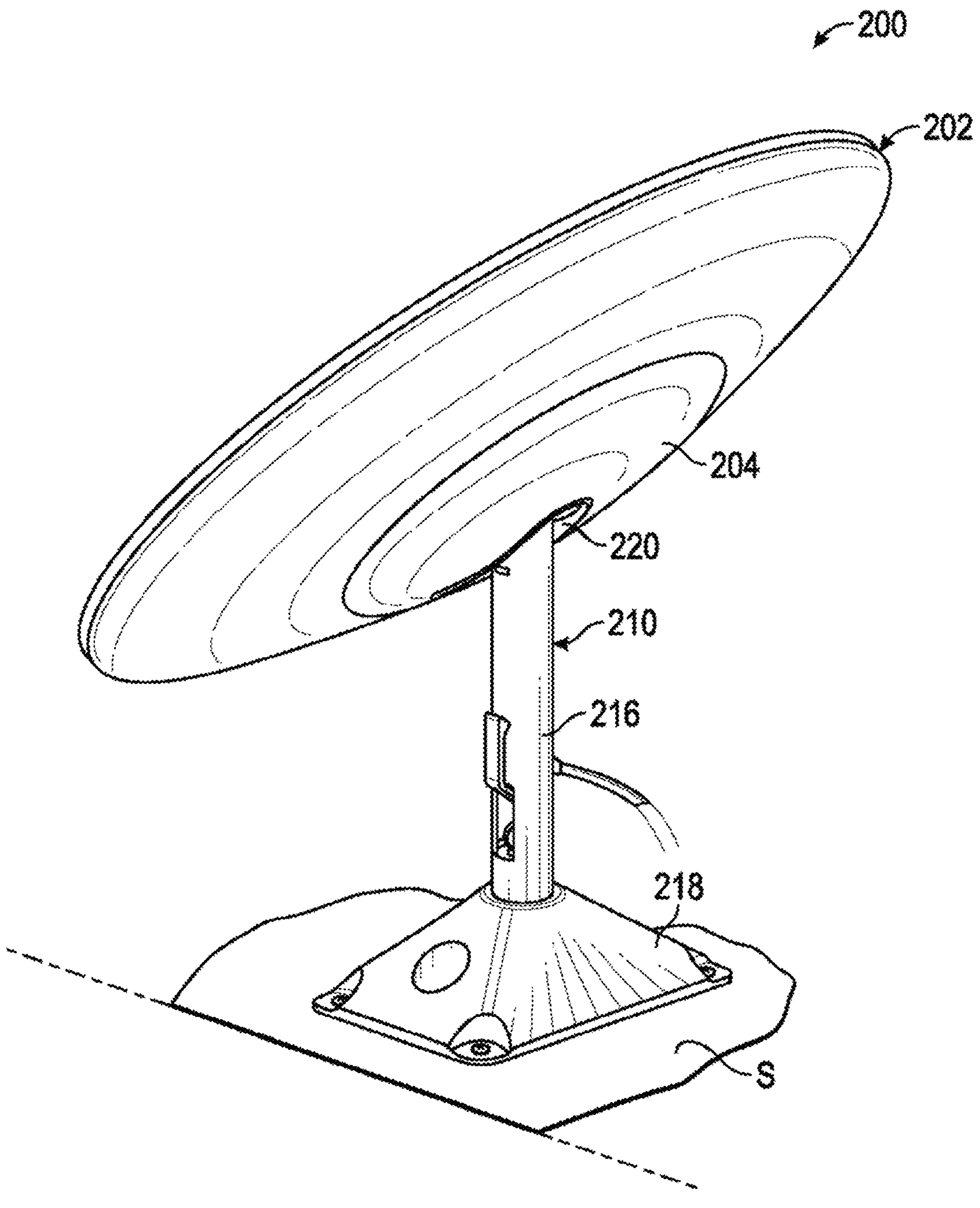

In some examples, the UT 112A may include an antenna system disposed in an antenna apparatus 200, for example, as illustrated in FIG. 2A and FIG. 2B, designed for sending and/or receiving radio frequency signals to and/or from a satellite or a constellation of satellites. The antenna apparatus 200 may include an antenna aperture (e.g., antenna aperture 402 of FIG. 4A) defining an area for transmitting and receiving signals, such as a phased array antenna system or another antenna system. The antenna apparatus 200 may include a top enclosure 208 that couples to a radome portion 206 to define a housing 202. The antenna apparatus 200 can also include a mounting system 210 having a leg 216 and a base 218.

FIG. 2B illustrates a perspective view of an underside of the antenna apparatus 200. As shown, the antenna apparatus 200 may include a lower enclosure 204 that couples to the radome portion 206 to define the housing 202. In the illustrated example, the mounting system 210 includes a leg 216 and a base 218. The base 218 may be securable to a surface S and configured to receive a bottom portion of the leg 216. In some implementations, a tilting mechanism 220 (details not shown) disposed within the lower enclosure 204 permits a degree of tilting to point the face of the radome portion 206 at a variety of angles for optimized communication and for rain and snow run-off.

Figure 3A:
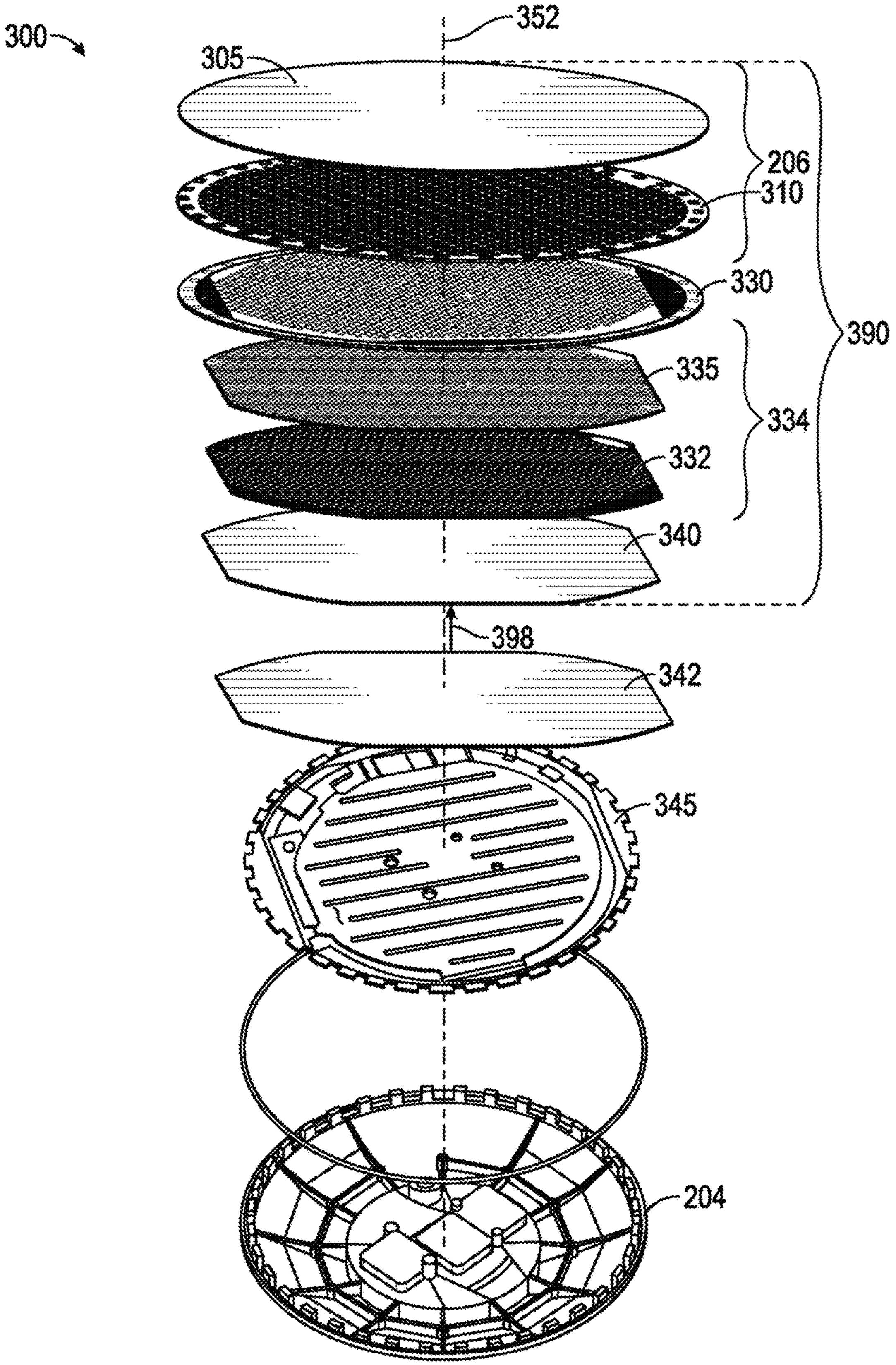
FIG. 3A is an isometric exploded view depicting an exemplary antenna apparatus including the housing and the antenna stack assembly, in accordance with some examples of the present disclosure.

Referring to FIG. 3A, an antenna stack assembly 300 can include a plurality of antenna components, which can include a printed circuit board (PCB) assembly 342 configured to couple to other electrical components disposed within the housing assembly 202 (including lower enclosure 204 and radome portion 206 of FIG. 2B). In the illustrated example, the antenna stack assembly 300 includes a layer stack 390. The components of the layer stack 390 may be mechanically and electrically supported by the PCB assembly 342.

Figure 3B:
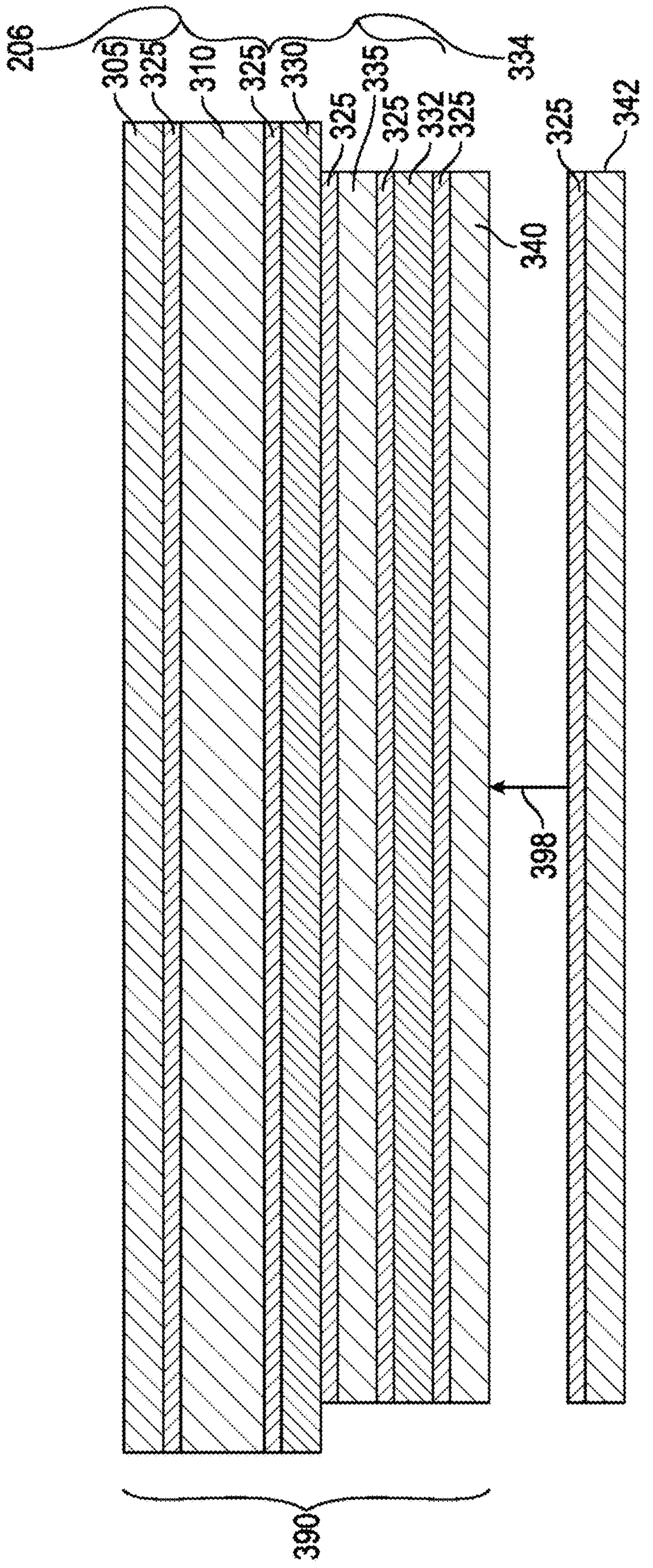
FIG. 3B is a cross-sectional view of an antenna stack assembly of an antenna apparatus, in accordance with some examples of the present disclosure.

In the illustrated example of FIG. 3A and FIG. 3B, the layers in the antenna stack assembly 300 layup include a radome portion 206 (including radome 305 and radome spacer 310), a phased array patch antenna assembly 334 (including upper patch layer 330, lower patch layer 332, and antenna spacer 335 in between), a dielectric layer 340, and PCB assembly 342, as will be described in greater detail below. As seen in FIG. 3B, the layers of the layer stack 390 may include adhesive coupling 325 between adjacent layers.

Figure 4A:
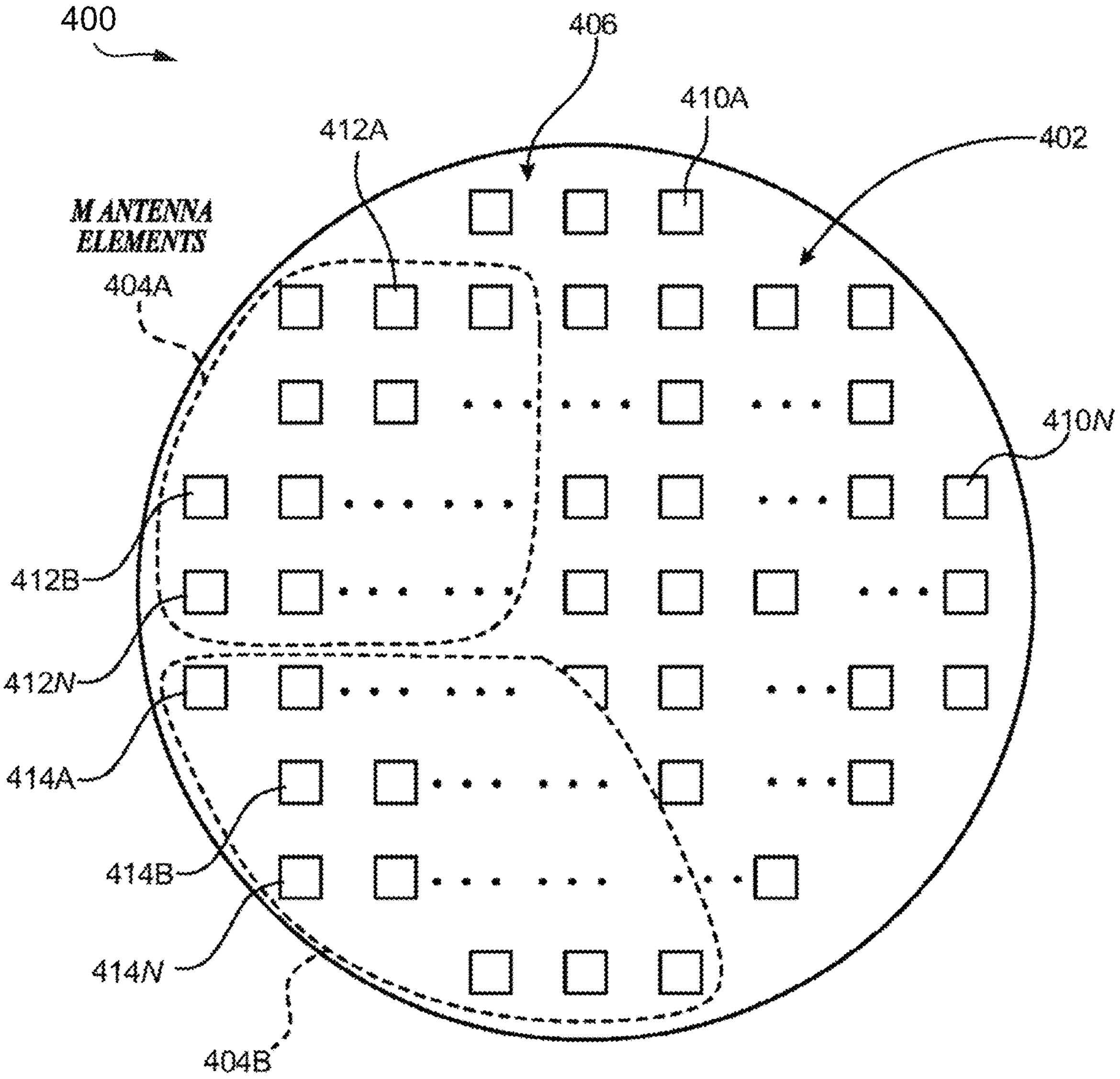
FIG. 4A is a diagram illustrating an example illustration of a top view of an antenna lattice, in accordance with some examples of the present disclosure.

FIG. 4A is a diagram 400 illustrating an example top view of an antenna lattice 406, in accordance with some examples of the present disclosure. The antenna lattice 406 can be part of a phased array antenna system, as further described below with respect to FIG. 4B and FIG. 4C. The antenna lattice 406 can include antenna elements 410A-410N (collectively "410"), 412 A-412N (collectively "412"), 414A-414N (collectively "414") configured to transmit and/or send radio frequency signals. In some examples, the antenna elements 410, 412, 414 can be coupled to (directly or indirectly) corresponding amplifiers, as further described below with respect to FIG. 4B and FIG. 4C. The amplifiers can include, for example, low noise amplifiers (LNAs) in the receiving (Rx) direction or power amplifiers (PAs) in the transmitting (Tx) direction.

An antenna aperture 402 of the antenna lattice 406 can be an area through which power is radiated or received. A phased array antenna can synthesize a specified electric field (phase and amplitude) across the antenna aperture 402. The antenna lattice 406 can define the antenna aperture 402 and can include the antenna elements 410, 412, 414 arranged in a particular configuration that is supported physically and/or electronically by a PCB.

Figure 4B:
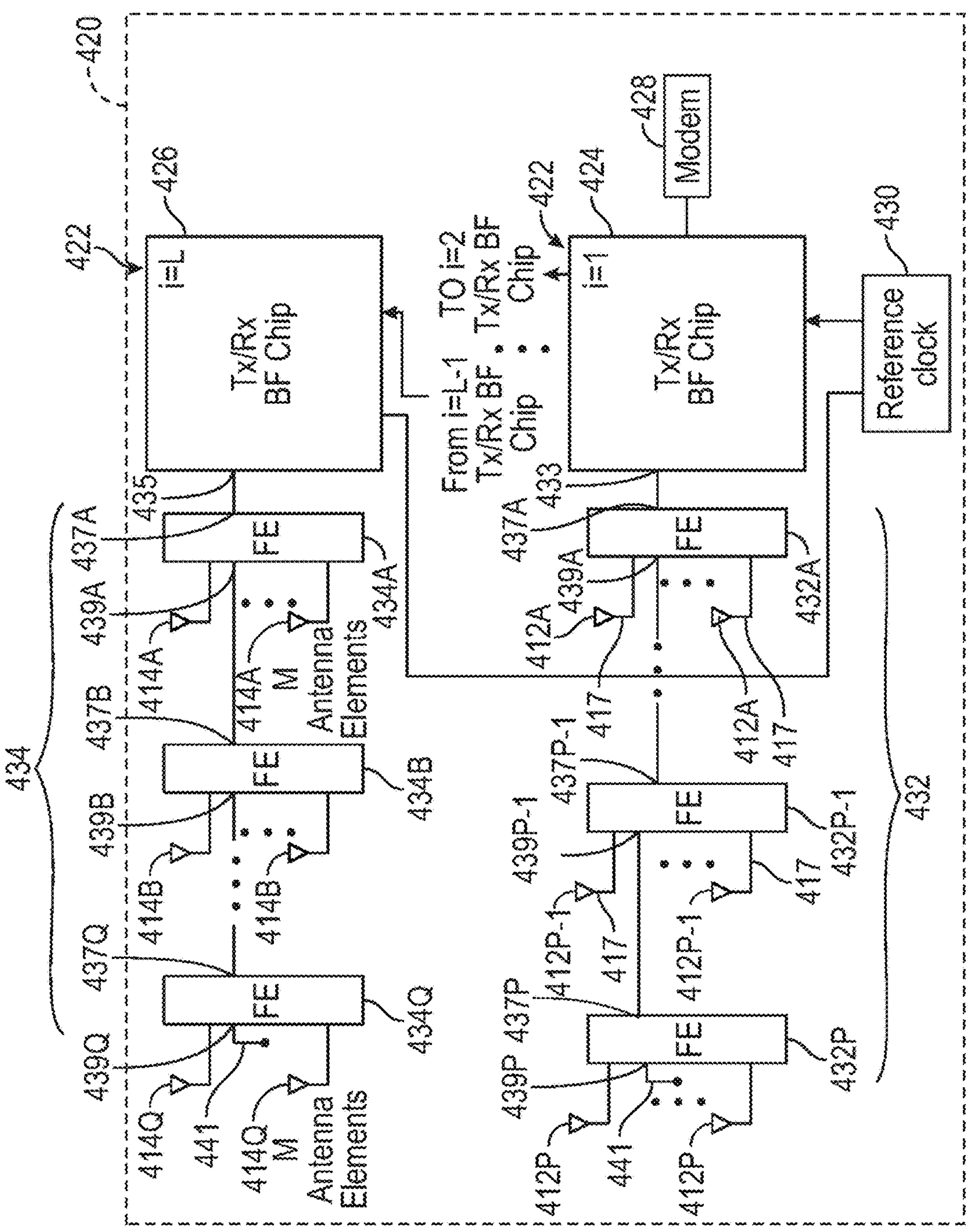
FIG. 4B is a diagram illustrating an example phased array antenna system, in accordance with some examples of the present disclosure.
Figure 4C:
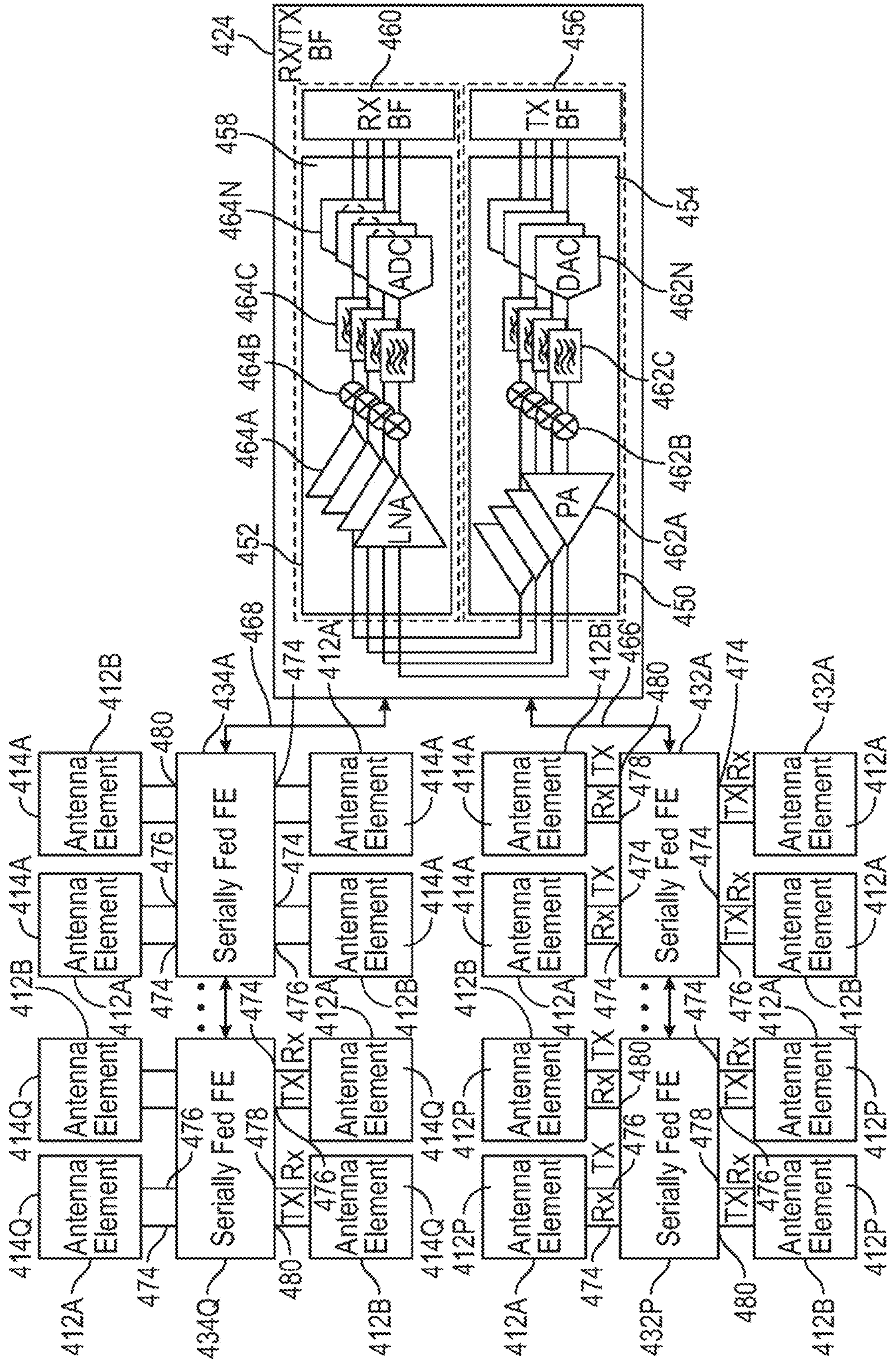
FIG. 4C is a diagram illustrating example components of a beamformer chip and serially fed frontend (FE) networks that interface the beamformer chip with antenna elements, in accordance with some examples of the present disclosure.

In some cases, the antenna aperture 402 can be grouped into subsets of antenna elements 404A and 404B. Each subset of antenna elements 404A, 404B of antenna elements can include N number of antenna elements 412, 414, which can be associated with specific beamformer (BF) chips as shown in FIG. 4B and FIG. 4C. The remaining antenna elements 410 in the antenna aperture 402 can be similarly associated with other BF chips (not shown).

FIG. 4B is a diagram illustrating an example phased array antenna system 420, in accordance with some examples of the present disclosure. The phased array antenna system 420 can include an antenna lattice 406 including antenna elements 412, 414, and a BF lattice 422, which in this example includes BF chips 424, 426, for receiving signals from a modem 428 in the transmit (Tx) direction and sending signals to the modem 428 in the receive (Rx) direction. The antenna lattice 406 can be configured to transmit and/or receive a beam of radio frequency signals having a radiation pattern from or to the antenna aperture 402.

The BF chips 424, 426 in the BF lattice 422 can include an L number of BF chips. For example, BF chip 424 can include a first BF chip i (i=1, where i=1 to L), and so forth, and BF chip 426 can include the Lth BF chip (i=L) of the BF chips in the BF lattice 422. Each BF chip 424, 426 of the BF lattice 422 electrically couples with one or more serially fed signal distribution networks. For the purposes of illustration, the examples of FIG. 4B and FIG. 4C illustrate serially fed FE networks 432, 434. Additional example configurations including serially fed signal distribution networks can be used without departing from the scope of the present disclosure. For example, although the examples of FIG. 4B and FIG. 4C illustrate amplification by PAs/LNAs and phase shifting by phase shifters included within individual FEs of a serially fed FE network, other example serially fed signal distribution networks may exclude LNAs, PAs, and/or phase shifters without departing from the scope of the present disclosure.

For example, a BF radio frequency input/output (RFIO) 433 of BF chip 424 is electrically coupled to serially fed FE network 432. Similarly, BF RFIO 435 of BF chip 426 is electrically coupled to serially fed FE network 434. Although one BF RFIO 433, 435 is shown for each BF chip 424, 426, each BF chip can include multiple BF RFIOs which can each couple to one or more serially fed FE networks as described in more detail below with respect to FIG. 4C and FIG. 5. Although FIG. 4B illustrates a phased array antenna system including multiple BF chips 426, in some cases, a phased array antenna system including a single BF chip 426 (e.g., L=1) can be used with serial fed FE networks (e.g., 432, 434) without departing from the scope of the present disclosure.

The phased array antenna system 420 can include serially fed FE networks 432, 434. Each serially fed FE network 432, 434 can include multiple individual FEs, with serial signal distribution between individual FEs of the serially fed FE networks 432, 434. For example, as illustrated in FIG. 4B, serially fed FE network 432 can include P individual FEs and serially fed FE network 434 can include Q individual FEs. In some embodiments, the number of individual FEs in each serially fed FE network 432, 434 of a phased array antenna system 420 can be equal (e.g., P=Q). However, there is no requirement for each of the serially fed FE networks 432, 434 in a phased array antenna system to include equal numbers of individual FEs.

In some cases, additional digital signals can be communicated between one or more BFs of the BF lattice and individual FEs of the serially fed FE networks. For example, digital signals (e.g., one or more clocks, control signals, or the like) can be provided to the serially fed FE networks 432, 434 by the BF chips 424, 426 of the BF lattice 422. In some cases, the digital signals can be provided to each individual FE of the phased array antenna in parallel. In some cases, the digital signals can be provided to initial FEs (e.g., 432A, 434A) of the serially fed FE networks and serially distributed to the remaining individual FEs of the serially fed FE networks.

Referring to FIG. 4B, each of the individual FEs, 432A-432P of the serially fed FE network 432 can include an RF port 437A through 437P and RF serial port 439A through 439P. Similarly, each of the induvial FEs 434A-434Q of the serially fed FE network 434 can include an RF port 437A through 437Q and an RF serial port 439A through 439Q. Each individual FE 432A-432P, 434A-434Q of the serially fed FE networks 432, 434 can interface with M antenna elements through coupling antenna traces 417. The value for M can be any positive integer. As used herein, the RF ports 437A through 437P of serially fed FE network 432 and RF ports 437A through 437Q of serially fed FE network 434 are collectively referred to as RF ports 437. As used herein, the RF serial ports 439A through 439P of serially fed FE network 432 and RF serial ports 439A through 439Q of serially fed FE network 434 are collectively referred to as RF serial ports 439. The term "serial" used to describe RF serial ports 439 indicates that the RF serial ports of each individual FE 432A-432P, 434A-434Q are further from the corresponding BF chip 424, 426 than the RF ports 437 of each individual FE. In some cases, in a transmit (Tx) configuration, the RF ports 437 can act as inputs for a transmit (Tx) signal to be transmitted by antenna elements 414 and the RF serial ports 439 can act as outputs for distributing the transmit (Tx) signal to an RF port 437 of another individual FE of a serially fed FE network 432, 434. In some examples, in a receive (Rx) configuration, RF serial ports 439 can act as inputs for received (Rx) signals output from an RF port 437 of another individual FE of a serially fed FE network 432, 434.

As illustrated in FIG. 4B, M antenna elements 412A are coupled to individual FE 432A, M antenna elements 412P-1 are coupled to individual FE 432P-1, and so on with M antenna elements 412P coupled to individual FE 432P at the end of the serially fed FE network 432. Similarly, M antenna elements 414A are coupled to individual FE 434A, M antenna elements 414B are coupled to individual FE 434B, and so on with M antenna elements 412Q coupled to individual FE 434Q at the end of the serially fed FE network 434. In some implementations, the individual FEs of the serially fed FE networks 432, 434 can include circuitry for performing analog processing of RF signals received from and/or transmitted to the antenna elements 412, 414. In some implementations, the BF chips 424, 426 in combination with the serially fed FE networks 432, 434 can collectively form a hybrid beamforming network (e.g., including both analog and digital beamforming components). A hybrid beamforming network may also be referred to as a hybrid beamformer, HBF, or hybrid analog/digital beamformer herein. In some cases, the BFs and FEs can form an analog beamforming network without departing from the scope of the present disclosure. In some implementations, the BF chips illustrated in FIG. 4B can be replaced with any RF transceiver. For example, in the case of a phased array antenna system including a single serially fed FE network (e.g., one of serially fed FE networks 432, 434), a single transceiver can be used in place of a BF chip and beamforming functionality can be performed by the individual FEs of the serially fed FE network. Although multiple BF chips 424, 426 are illustrated in FIG. 4B, a phased array antenna system including a single BF chip can be used with a serially fed FE network without departing from the scope of the present disclosure.

Each serially fed FE network 432, 434 can include an initial FE 432A, 434A, that interfaces with the BF chips 424, 426 and a first set of M antenna elements 412A, 414A. As used herein, references to an initial FE 432A, 434A means that the RF port 437A of the initial FE 432A, 434A is communicatively coupled to a BF IO and/or a distribution/combination network coupled to a corresponding BF IO. For example, an RF port 437A of initial FE 432A can communicatively couple with BF RFIO 433 of BF chip 424 and RF port 437A of the initial FE 434A can communicatively couple with BF RFIO 435 of BF chip 426. As illustrated, the RF serial port 439A of initial FE 432A of the serially fed FE network 432 can subsequently be coupled to the RF port 437B of individual FE 432B, and so on for each subsequent individual FE 432C through 432P to form serially fed FE network 432. Similarly, the RF serial port 439A of initial FE 434A of the serially fed FE network 434 can subsequently be coupled to the RF port 437B of FE 434B, and so on for each subsequent individual FE 434C through 434Q to form serially fed FE network 434.

The serially fed FE networks (e.g., serially fed FE networks 432, 434) can be configured to provide the same gain between a BF RFIO (e.g., BF RFIO 433 of BF chip 424, BF RFIO 435 of BF chip 426) and each of the antenna elements (e.g., antenna elements 412, 414) coupled to the BF RFIO through the serially fed FE network. For example, a gain between the BF RFIO 433 and each antenna element 412A coupled to individual FE 432A and a gain between BF RFIO 433 and each antenna element 412P-1 coupled to individual FE 432P-1 can be equal to a common gain. In addition, a gain between the BF RFIO 433 and each antenna element 412P coupled to individual FE 432P can also be equal the common gain. In some cases, the gain between the BF RFIO 433 and different antenna elements of the antenna elements 412 coupled to the individual FEs of serially fed FE network 432 can be different. For example, gains between the BF RFIO 433 and antenna elements 412 can be configured to provide a desired excitation taper (e.g., an amplitude taper)

For the last individual FE 432P in the serially fed FE network 432 and last individual FE 434Q in serially fed FE network 434 there is no individual FE to couple to the RF serial port 439. As illustrated, the RF serial port of each last individual FE 432P, 434Q can be terminated with a matched termination 441. In some embodiments, the RF serial port of each last individual FE 432P, 434Q, and/or any associated signal conditioning components (see FIG. 6) can be disabled. In some cases, disabling the RF serial port of a last individual FE 432P, 434Q can alleviate a requirement to terminate the RF serial port with a termination.

In some implementations, each individual FE module 432A-432P, 434A-434Q of the serially fed FE networks 432, 434 can include RF or millimeter wave (mmWave) frontend integrated circuits, modules, devices, and/or any other type of frontend package and/or component(s). In some cases, the individual FEs 432A-432P, 434A-434Q of the serially fed FE networks 432, 434 can include multiple-input, multiple-output FEs interfacing with multiple antenna elements and one or more BF chips.

Each BF chip of the BF lattice 422 can include an integrated circuit (IC) chip or an IC chip package including a plurality of pins. In some cases, a first subset of the plurality of pins can be configured to communicate signals with a respective, electrically coupled BF chip(s) (e.g., if the BF chips are digital beamformers (DBFs)) in a daisy chain configuration), and/or modem 428 in the case of BF chip 424. A second subset of the plurality of pins can be configured to transmit/receive signals with M antenna elements, and a third subset of the plurality of pins can be configured to receive a signal from a reference clock 430. The BF chips in the BF lattice 422 may also be referred to as transmit/receive (Tx/Rx) BF chips, Tx/Rx chips, transceivers, BF transceivers, and/or the like. As described above, the BF chips may be configured for Rx communication, Tx communication, or both. Although the illustrated example of FIG. 4B shows components such as an ADC normally associated with DBFs, the BF chips 424 can be analog beamformers, DBFs, and in some cases simple transceivers without departing from the scope of the present disclosure.

In some cases, the BF chips 424, 426 in the BF lattice 422 can include amplifiers, phase shifters, mixers, filters, up samplers, down samplers, variable gain amplifiers (VGAs), and/or other electrical components. In the receiving direction (Rx), a beamformer function can include delaying signals arriving from each antenna element so the signals arrive to a combining network at the same time. In the transmitting direction (Tx), the beamformer function can include delaying the signal sent to each antenna element such that the signals arrive at the target location at the same time (or substantially the same time). This delay can be accomplished by using "true time delay" or a phase shift at a specific frequency. In some examples, each of the BF chips 424, 426 can be configured to operate in half duplex mode, where the BF chips 424, 426 switch between receive and transmit modes as opposed to full duplex mode where RF signals/waveforms can be received and transmitted simultaneously. In other examples, each of the BF chips 424, 426 can be configured to operate in full duplex mode, where RF signals/waveforms can be received and transmitted simultaneously.

Each individual FE within the serially fed FE networks 432, 434 electrically couples to a group of respective M number of antenna elements. In turn, the individual FEs 432A-432P, 434A-434Q of the serially fed FE networks 432, 434 collectively couple a BF RFIO 433, 435 from each BF to a respective M number of elements multiplied by the number of FEs in the corresponding serially fed FE network 432, 434. For example, BF RFIO 433 of BF chip 424 can electrically couple to M*P antenna elements 412 through serially fed FE network 432. Similarly, BF RFIO 435 of BF chip 426 can electrically couple to M*Q number of antenna elements 414 through serially fed FE network 434.

The serially fed FE networks 432, 434 can include various components, such as RF ports, phase shifters, amplifiers (e.g., PAs, LNAs, VGAs, etc.), signal conditioning components, and the like. In some examples, in Rx mode, the serially fed FE networks 432, 434 can provide a gain to RF contents of each Rx input (e.g., input from antenna traces 417, such as antenna Rx ports 474 of FIG. 4C and/or Rx inputs received at RF serial ports 439 in Rx mode), and low noise power to suppress the signal-to-noise ratio impacts of noise contributors downstream in the Rx chain/path. In some cases, the serially fed FE networks 432, 434 can be configured to provide an equal gain between each individual antenna element of the antenna elements 412, 414 and a corresponding BF RFIO 433, 435. For example, a signal received at antenna element 414Q and a signal received at antenna element 414A can have equal gain along the path to BF RFIO 435.

Moreover, in Tx mode, the serially fed FE networks 432, 434 can provide gain to each Tx path (e.g., output to traces 417, antenna Tx ports 476 of FIG. 4C and/or Tx outputs transmitted from RF serial ports 439 in Tx mode) and drive RF power into a corresponding antenna element 412, 414. In some cases, the serially fed FE networks 432, 434 can be configured to provide an equal gain between each BF RFIO 466, 468 and each corresponding individual antenna element of the antenna elements 412, 414. For example, a signal transmitted from BF RFIO 433 can have an equal gain at antenna element 412A and antenna element 412P-1. In some cases, the serially fed FE networks 432, 434 can be configured to provide gains between the BF RFIOs 433, 435 and different individual antenna elements of the antenna elements 412, 414. For example, the gain to different individual antenna elements can be set to provide an excitation taper (e.g., an amplitude taper) to the antenna elements 412, 414.

In the illustrated example of FIG. 4B, the BF chips in the BF lattice 422 are electrically coupled to each other in a daisy chain arrangement. In some cases, such as where the BF chips are analog BF chips, digital communication between BFs by a daisy chain arrangement can be excluded. The BF chips are also coupled to serially fed FE networks 432, 434 that include analog beamforming functionality in a hybrid beamforming network. The serially fed FE networks 432, 434 can be used in many different configurations without departing from the scope of the present disclosure. For example, the serially fed FE networks 432 can be used with analog BFs, digital BFs, transceivers, receivers, and/or transmitters. As another example, in some cases, aspects of the disclosure can be implemented using BFs and/or FEs having different arrangement(s) and/or electrical coupling structure(s).

FIG. 4C is a diagram illustrating example components of BF chip 424 communicatively coupling with two serially fed FE networks 432, 434 that each interface with the BF chip 424 through separate BF RFIOs 466, 468, respectively. In the illustrated configuration, BF RFIO 466 of the BF chip 424 is communicatively coupled to serially fed FE network 432 and each individual FE 432A-432P of the serially fed FE network 432 is communicatively coupled to M antenna elements 412A through 412P, respectively. As a result, the BF RFIO 466 can be communicatively coupled to M*P antenna elements 412A through 412P while being connected directly to the initial FE 432A of serially fed FE network 432. As a result, the BF RFIO 466 can be communicatively coupled to M*P antenna elements 412A through 412P while being directly connected to the initial FE 432A of serially fed FE network 432. As illustrated in FIG. 4C, BF RFIO 468 of the BF chip 424 is communicatively coupled to serially fed FE network 434 and each individual FE 434A-434Q of the serially fed FE network 434 is communicatively coupled to M antenna elements 414A through 414Q, respectively. As a result, the BF RFIO 468 can be communicatively coupled to M*P antenna elements 412A through 412P while only being directly connected to the initial FE 434A of serially fed FE network 434. Each BF in the BF lattice 422 can similarly include multiple BF RFIOs each communicatively coupled to one or more serially fed FE networks, thereby allowing the number of antenna elements 412, 414 in the phased array antenna system 420 to be scaled. In some embodiments, one or more BF RFIOs 466, 468 can also be distributed (e.g., through a distribution network, distributor/combiners, or the like) to multiple serially fed FE networks as a means of scaling the phased array antenna system 420 (see FIG. 5)

In the illustrated example of FIG. 4C, the BF chip 424 can include a transmit section 450 and a receive section 452, and the serially fed FE networks 432, 434 can each include an RF port 437 and an RF serial port 439. In the illustrated embodiment, the RF ports 437 and RF serial ports 439 can each be used for bidirectional communication with the BF chip 424 and/or the antenna elements 412. As illustrated, each individual FE 432A through 432P includes M antenna Rx ports 474 and M antenna Tx ports 476, with an antenna Rx port 474 and an antenna Tx port 476 provided for each of the M connected antenna elements 412. Similarly, each individual FE 434A through 434Q also includes M antenna Rx ports 474 and antenna Tx ports 476, with an antenna Tx port 476 and an antenna Rx port 474 provided for each of the M connected antenna elements 414. In the illustrated example, each individual FE 432A through 432P, 434A through 434Q is coupled to four antenna elements 412, 414 (e.g., M=4). Different values for M can be chosen (e.g., M=2, M=3. M=8, or any other value) without departing from the scope of the present disclosure.

The transmit section 450 of BF chip 424 can include a transmit beamformer (Tx BF) 456 and one or more Tx RF sections 454. The Tx BF 456 can include a number of components (e.g., digital and/or analog) such as, for example and without limitation, a VGA, a time delay filter, a filter, a gain control, one or more phase shifters, one or more up samplers, one or more IQ gain and phase compensators, and the like. Each Tx RF section 454 can also include a number of components (e.g., digital and/or analog). In this example, each Tx RF section 454 includes a power amplifier (PA) 462A, a mixer 462B, a filter 462C such as a low pass filter, and a digital-to-analog converter (DAC) 464N. The one or more Tx RF sections 454 can be configured to ready the time delay and phase encoded digital signals for transmission. In some examples, the one or more Tx RF sections 454 can include a Tx RF section for each BF RFIO 466, 468 to each serially fed FE network 432, 434. Although the Tx RF section 454 is illustrated in a DBF configuration (e.g., including DACs 462N), an analog BF can be used without departing from the scope of the present disclosure.

The receive section 452 can include a receive beamformer (Rx BF) 460 and one or more Rx RF sections 458. The Rx BF 460 can include a number of components such as, for example and without limitation, a VGA, a time delay filter, a filter, an adder, one or more phase shifters, one or more down samplers, one or more filters, one or more IQ compensators, one or more direct current offset compensators (DCOCs), and the like. Each Rx RF section 458 can also include a number of components. In the example of FIG. 4C, each Rx RF section 458 includes a low noise amplifier (LNA) 464A, a mixer 464B, a filter 464C such as a low pass filter, and an analog-to-digital converter (ADC) 464N. In some examples, the one or more Rx RF sections 458 can include an Rx RF section for each BF RFIO 466, 468 to each serially fed FE network 432, 434, respectively. Although the receive section 452 is illustrated as BF ADCs 464N, an analog RX BF can be used without departing from the scope of the present disclosure.

The serially fed FE networks 432, 434 can include one or more Rx components (see components 682, 683 of FIG. 6) for processing Rx signals from the antenna elements 412, 414 and one or more Tx components (see components 683, 684 of FIG. 6) for processing Tx signals for each of the antenna elements 412, 414. As an illustrative and non-limiting example, one or more Rx components for processing Rx signals can include LNAs to amplify respective signals from the antenna elements 412, 414 without significantly degrading the signal-to-noise ratio of the signals, and one or more Tx components for processing Tx signals can include PAs to amplify signals from the transmit section 450 to the antenna elements 412, 414. The phase shifters 483 (e.g., for Rx and/or Tx) can apply a phase shift, a time delay, or the link to Tx and/or Rx signals to provide beamforming and beam steering for a phased array antenna. In some examples, the serially fed FE networks 432, 434 can include other components such as, for example, VGAs. In some cases, VGAs, LNAs 482, PAs 484 and/or phase shifters 483 can be included in separate FE components (not shown) coupled to the serially fed FE networks 432, 434. Individual FEs of the serially fed FE networks 432, 434 can also include one or more ports (not shown) for coupling to power and/or digital control signals.

In some cases, the serially fed FE networks 432, 434, can be communicatively coupled to one or more 90-degree hybrid couplers (not shown), which can be communicatively coupled to the antenna elements 412, 414. In some examples, a 90-degree hybrid coupler can be used for power splitting in the Rx direction and power combining in the Tx direction and/or to interface the serially fed FE networks 432, 434 with a circularly polarized antenna element. For example, an antenna Rx port 474 and an antenna Tx port 476 associated with each antenna element 412, 414 can be coupled to first and second isolated ports of a 90-degree hybrid coupler and third and fourth isolated ports of the 90-degree hybrid coupler can be coupled to first and second ports of a corresponding antenna elements 412, 414. While a 90-degree hybrid coupler is provided as an illustrative example, other directional coupler mechanisms are within the scope of the present disclosure.

The BF chip 424 and serially fed FE networks 432, 434 can process data signals, streams, or beams for transmission by the antenna elements 412, 414, and receive data signals, streams, or beams from antenna elements 412, 414. The BF chip 424 can also recover/reconstitute the original data signal in a signal received from antenna elements 412, 414 and serially fed FE networks 432, 434. For example, for a received (Rx) signal, the BF chip 424 can coherently combine a beamformed signal from each connected serially fed FE network 432, 434. Moreover, the BF chip 424 can strengthen signals in desired directions and suppress signals and noise in undesired directions.

For example, in transmit mode (e.g., the transmit direction), the one or more Tx RF sections 454 of the transmit section 450 can process signals from the Tx BF 456 and output corresponding signals amplified by the PA 462A. For example, signals to the antenna elements 412 can be routed from BF RFIO 466 to RF port 437A of the initial FE 432A, and signals to the antenna elements 414 can be routed from BF RFIO 468 to RF port 437A of the initial FE 434A. The initial FE 432A of serially fed FE network 432 can receive the amplified RF signal at RF port 437 and distribute the RF signal to antenna elements 412A. For example, the amplified RF signal can be split equally among each of the antenna elements (e.g., from the distribution/combination ports 459) and the RF serial port 439A of the initial FE 434A.

In some embodiments, each individual FE of the serially fed FE networks 432, 434 can include signal conditioning components (see signal conditioning components 647, 649 of FIG. 6) for amplitude and/or phase adjusting the RF signal in the transmit direction before outputting the RF signal to the next individual FE of the serially fed FE network 432, 434.

In the illustrated embodiment, initial FE 432A of serially fed FE network 432 distributes the RF signal from RF serial port 439A to the RF port 437B of the next individual FE 432B. In turn, the individual FE 432B can distribute the RF signal received from initial FE 432A to antenna elements 412B and the RF serial port 439B of individual FE 432B. The RF signal can be serially passed to each successive individual FE 432C through 432P and corresponding antenna elements 412C through 412P in a similar fashion. Similarly, the initial FE 434A of the serially fed FE network 434 can process an RF signal received from BF RFIO 468 and distribute the RF signal to antenna elements 414A.

In some cases, the signal conditioning components (e.g., signal conditioning components 647, 649 of FIG. 6) and/or PAs (e.g., PAs 684 of FIG. 6) can be configured to provide a common gain between a BF RFIO (e.g., BF RFIO 466, 468 of FIG. 4C) and each of the antenna elements 414R. In some implementations, the signal conditioning components and/or the PAs can be configured to provide a common gain between a BF RFIO 466, 468 and each of the RF ports 437 (see FIG. 4B) of the individual FEs. For example, the signal conditioning components of the initial FE 432A can be configured to make a first gain between a BF RFIO 466, 468 and RF port 437A and a second gain between the BF RFIO 433 and the RF port 437B equal to the common gain. In some cases, each individual FE can be configured such that the RF ports 437 of each individual FE of the serially fed FE network 432 receives a signal with a matched gain relative to the BF RFIO. In one illustrative example, a gain of one (e.g., unity gain) can be set between each RF port 437A through 437P-1 and each subsequent corresponding RF port 437B through 437P. In some cases, providing a unity gain can result in each individual FE of the serially fed FE networks 432 receiving a signal having the same amplitude at each RF port 437A-437P of the individual FEs 432A-432P.

In some examples, the signal conditioning components 447, 449, and/or the PAs 484 of individual FEs included in a phased array antenna can be configured to provide different gains to different antenna elements 414R. In one illustrative example, the gain of different PAs 484 in different individual FEs 492R can be varied to provide an excitation taper (e.g., and amplitude taper) to signals transmitted from the antenna elements 414R of the phased array antenna.

In receive mode (e.g., the receive direction), serially fed FE networks 432, 434 can receive RF signals from antenna elements 412, 414 and process the RF signals. For example, the initial FE 432A of the serially fed FE network 432 can receive RF signals from antenna elements 412A via respective antenna Rx ports 474. The one or more RX components (see components 682, 683 of FIG. 6) of the last individual FE 432P of the serially fed FE network 432 can, for example, amplify respective RF signals received from the antenna elements 412P without significantly degrading the signal-to-noise ratio of the RF signals (e.g., with one or more LNAs). The one or more Rx components (see components 682, 683 of FIG. 6) of the last individual FE 432P can also combine the signals from each of the antenna elements 412P. In one illustrative and non-limiting example, a distribution/combination network can combine the signals from each of the antenna elements 412P The last individual FE 432P can output the received RF signal (e.g., the combined signal from antenna elements 412P) to RF port 437P of the individual FE 432P, which can serve as an RF output port in the receive mode as mentioned above.

The one or more Rx components (see components 682, 683 of FIG. 6) of the next to last individual FE 432P-1 can, for example, amplify respective RF signals from the antenna elements 412P-1 without significantly degrading the signal-to-noise ratio of the RF signals. The RF serial port 439P-1 (which can act as an RF input port in the receive mode) of next to last individual FE 432P-1 can also receive the RF signal output (e.g., the combined signal from antenna elements 412P) from RF port 437P of last individual FE 432P. The one or more Rx components (see components 682, 683 of FIG. 6) of individual FE 432P-1 can also combine the RF signals from each of the antenna elements 412P-1 with the RF signal received from last individual FE 432P. The RF signals received from each of the antenna elements 412P-1 can be phase shifted (e.g., by phase shifters 483) so that the received signals originating from a desired direction (e.g., a beam direction) can be combined coherently. In some embodiments, each individual FE of the serially fed FE network can include signal conditioning components for amplitude adjusting (e.g., an amplifier) and/or phase adjusting (e.g., phase shifters 483) the RF signal in the receive direction before outputting the RF signal to the next individual FE of the serially fed FE networks 432.

The next to last individual FE 432P-1 can output the combined RF signal to RF port 437P-1, which can then be input by the RF serial port 439P-2 of the next individual FE 432P-2 of the serially fed FE network 432 and combined with RF signals received from the antenna elements 412P-2 coupled to the next individual FE 432P-2 and so on until a combined RF signal that includes the RF signals received from each of the antenna elements 412A through 412P is output from the RF port 437A of the initial FE 432A. The combined RF signal can be routed from the RF port 437A of the initial FE 432A through the BF RFIO 466 to the receive section 452 of the BF chip 424. Similarly, the serially fed FE network 434 can output a combined RF signal from RF port 437A of the initial FE 434A that includes the RF signals received from each of the antenna elements 414A through 414Q to the BF RFIO 468 which can be connected to the receive section 452 of the BF chip 424.

In some cases, the signal conditioning components (e.g., signal conditioning components 647, 649 of FIG. 6) and/or the LNAs (e.g., LNAs 682 of FIG. 6) can be configured to provide an equal gain between each of the antenna elements 414R and a BF RFIO (e.g., BF RFIO 466, 468 of FIG. 4C). In some implementations, the signal conditioning components (e.g., signal conditioning components 447, 449 of FIG. 6) and/or the LNAs (e.g., LNAs 682 of FIG. 6) can be configured to provide a common gain between each of the RF serial port 439R of the individual FEs and a BF RFIO 466, 468. For example, the signal conditioning components (e.g., signal conditioning components 447, 449 of FIG. 6 and/or the LNAs (e.g., LNAs 682 of FIG. 6) of the initial FE 492A can be configured to make a first gain between RF serial port 439A and a BF RFIO 466, 468 and a second gain between the RF serial out 439B and the BF RFIO 466, 468 equal to the common gain. In some cases, each individual can be configured such that the RF serial ports 439 of each individual FE of the serially fed FE network 432 receives a signal with a matched gain relative to the BF RFIO 466, 468. For example, the gain between RF serial port 439A and RF serial out B can be made equal to one (1). In some embodiments, a gain of one (e.g., unity gain) can be set between each RF serial port 439P-439B and each adjacent corresponding RF serial port 439P-1-439A.

The one or more Rx RF sections 458 of the receive section 452 of the BF chip 424 can process the received RF signals and output the processed signal to the Rx BF 460. In some examples, the processed signal can include a signal amplified by an LNA 464A of Rx RF section 458. The Rx BF 460 can receive the signal and output a beamformed signal to a modem (e.g., modem 428 of FIG. 4B).

In some examples, the transmit section 450 and the receive section 452 can support a same number and/or set of antenna elements and/or serially fed FE networks. In other examples, the transmit section 450 and the receive section 452 can support different numbers and/or sets of antenna elements and/or serially fed FE networks. Moreover, while FIG. 4C illustrates two serially fed FE networks 432, 434 interfacing with two separate BF RFIOs 466, 468 of the BF chip 424, it should be noted that a BF chip can interface with a single serially fed FE network or more than two serially fed FE networks. The configuration of each BF RFIO 466, 468 of the BF chip interfacing with a single serially fed FE network in FIG. 4C is merely an illustrative example provided for explanation purposes. For example, a combiner/distributer (or a network of combiner/distributors) can allow a single BF RFIO 466, 468 of the BF chip 424 to interface with multiple serially fed FE networks. Also, while the serially fed FE networks 432, 434 are shown in FIG. 4C with one RF port, one RF serial port, four antenna Rx ports 474 and four antenna Tx ports 476 supporting four (e.g., M=4) antenna elements, it should be noted that, in other examples, the serially fed FE networks 432 can include more or fewer RF ports and/or RF serial ports and can support more or fewer antenna elements than shown in FIG. 4C. For example, in some cases, the individual FEs of serially fed FE networks 432, 434 can include two RF ports and two RF serial ports (e.g., for two separate data beams as shown in FIGS. 9A and 9B). In some cases, the serially fed FE networks 432, 434 can support two, three, five, or more antenna elements with an antenna Rx port 474 and an antenna Tx port 476 provided for each supported antenna element.

In the illustrative example of FIG. 4C, a BF chip 424 configured for bidirectional communication (e.g., transmit (Tx) and receive (Rx) is shown and the serially fed FE networks 432, 434 are also illustrated as bidirectional serially fed FE networks. In some implementations, serially fed FE networks can be configured for transmit (Tx) only operation or receive (Rx) only operation. In some implementations, serially fed FE networks configured for Tx only operation can be used with Tx BF chips in a transmitting (Tx) phased array antenna. In some implementations serially fed FE networks configured for Rx only operation can be used with Rx only BF chips in a receiving (Rx) phased array antenna. In some implementations, Tx only BF chips, Rx only BF chips, and/or bidirectional BF chips (e.g., BF chip 424) can be used with Tx only serially fed FE networks, Rx only serially fed FE networks, Tx/Rx serially fed FE networks, and/or any combination thereof without departing from the scope of the present disclosure.

Multiple Beam Serially Fed Phased Array Antenna Configuration

FIG. 5 illustrates a block diagram for a signal distribution configuration 500 for a multiple beam phased array antenna system. In the illustrated example, the BF 524 can simultaneously receive and/or transmit RF signals corresponding to two separate data beams BEAM1, BEAM2 of a phased array antenna.

In the signal distribution configuration 500 of FIG. 5, BF RFIOs 586, 596 are coupled to initial FEs (e.g., initial FEs 432A, 434A of FIG. 4B and FIG. 4C) of serially fed FE networks 532, 534, 536. In the illustrated example, the serially fed FE networks 532, 534, 536 can be similar to and perform similar functions to the serially fed FE networks 432, 434 of FIGS. 4B, 4C. In the illustrated example, of FIG. 5, the serially fed FE networks 532, 534, 536 are arranged in pairs in FE network blocks 585A-585D (collectively referred to herein as FE network blocks 585). In the illustrated example of FIG. 5, antenna elements 512A and antenna elements 512B are coupled to two different individual FEs of the serially fed FE network 532, while antenna elements coupled to other individual FEs of the serially fed FE networks 534, 536 are not labeled. The labeled antenna elements 512A, 512B and unlabeled antenna elements coupled to individual FEs of the serially fed FE networks 532, 534, 536 are collectively referred to herein as antenna elements 512.

In the illustrated example of FIG. 5, each of the BF RFIOs 586A-586D (collectively referred to herein as BF RFIOs 586) and BF RFIOs 596A-596D (collectively referred to herein as BF RFIOs 596) of the BF 524 can electrically couple to the initial FEs of two different serially fed FE networks 532, 534, 536. For example, in the illustrated example of FIG. 5, each of the individual FEs of the serially fed FE networks 532, 534, 536 can include two RF ports 537 and two RF serial ports 539. Each individual RF port 537 can correspond to an RF port 437 of FIG. 4B for a respective data BEAM1, BEAM2. In some embodiments, the individual FEs (e.g., individual FE 692R of FIG. 6) can include additional components, including but not limited to additional receive (Rx) components and/or additional transmit (Tx) components to process the two data beams BEAM1, BEAM2 to/from the antenna elements 512.

In the example of FIG. 5, each of the distribution/combination networks 505, 507 includes a routing structure similar to the routing connections between BF RFIO 586 and serially fed FE networks 432, 434 of FIG. 4C. In the illustrated example, each of the distribution/combination networks 505, 507 is from a corresponding BF RFIO 586, 596 to a midpoint between two serially fed FE networks of each of the serially fed FE network blocks 585A through 585D (collectively referred to herein as serially fed FE network blocks 585). As illustrated, each distribution/combination network 505, 507 includes a branching junction that connects the corresponding distribution/combination network 505, 507 to the initial FEs of two serially fed FE networks of each serially fed FE network block 585. As illustrated the distribution/combination networks 505, 507 can include combiner/dividers 515. In the illustrated example of FIG. 5, the distribution/combination networks 505, 507 are also routed from the BF RFIOs 586, 596 in routing channels that can run between the rows formed by the FE network blocks 585. It should be noted that the routing illustrated in FIG. 5 provides only an example and routing configurations on different numbers of layers and/or over different routing paths can be used without departing from the scope of the present disclosure. In some cases, the signals from BF RFIOs 586, 596 received at RF ports 537 of the serially fed FE networks 532, 534, 536 can be routed to additional individual FEs of the serially fed FE networks by through paths 541, 543 for BEAM1 and BEAM2, respectively. The RF through paths 541, 543 can provide serial connections between individual FEs of the serially fed FE networks 532, 534, 536 as illustrated in FIG. 5. Accordingly, each BF RFIO 586, 596 can be communicatively coupled with thirty-two (32) antenna elements in the configuration shown in FIG. 5.

In one illustrative example, the distribution/combination networks 505, 507 can couple to initial FEs of the serially fed FE networks 532, 534, 536, and routing to the other individual FEs can occur through RF through paths 541 and RF through paths 543. In some cases, a BF RFIO associated with BEAM2 (e.g., BF RFIO 596A) can be electrically coupled to the RF through path 543 of a serially fed FE network. For example, as illustrated, BF RFIO 596A associated with BEAM2 is electrically coupled to the paths 543 (e.g., the upper paths) of the serially fed FE networks 532, 534. In contrast, BEAM2 is coupled to the paths 541 (e.g., the lower paths) of the serially fed FE networks 536 in the second block 585B. In some implementations, each of the RF through paths 541, 543 can be configured to selectively operate on any of two or more beams (e.g., BEAM1, BEAM2) to facilitate a non-overlapping layout. For example, the individual FEs of the serially fed FE networks 532, 534, 536 can be programmable to provide signal distribution and/or beamforming for either BEAM1 or BEAM2. As illustrated in FIG. 5, using the serially fed FE networks 532, 534, 536 in the signal distribution configuration 500, the distribution/combination networks 505, 507 do not cross. Because of the lack of crossing between the conductive traces of the distribution/combination networks 505, 507, in some cases, all of the routing between BF 524 and the serially fed FE networks 532, 534, 536 can be included in a single layer of a PCB.

The example of FIG. 5 illustrates only one example configuration for distribution of signals from a single BF RFIO (e.g., BF RFIO 596A to multiple serially fed FE networks (e.g., serially fed FE networks 532, 534). For example, although the serially fed FE network block 585A is shown with two serially fed FE networks 532, 534 arranged in a same "row" (e.g., along a straight line in the x-axis direction), other configurations can be used without departing from the scope of the present disclosure. For example, a serially fed FE network block can include serially fed FE networks in different "rows" of the phased array antenna. For example, a serially fed FE network block can include the serially fed FE network 534 and an adjacent serially fed FE network 536. In some examples, more than two (e.g., three or more) serially fed FE networks can share a single BF RFIO by including an additional combiner/divider layer to couple the BF RFIO to any number of serially fed FE networks. In one illustrative example, the serially fed FE networks included in serially fed FE network blocks 585A, 585B can be combined into a serially fed FE network block (not shown) including four serially fed FE networks. In such a configuration, a single BF RFIO (e.g., BF RFIO 596A) can be mapped to sixty-four (64) antenna elements for either BEAM1 or BEAM2.

In addition, although each of the serially fed FE networks 532, 534, 536 of FIG. 5 are shown including an equal number of individual FEs (e.g., four), serially fed FE networks of a phased array antenna can include a different number of individual FEs (e.g., two or more). In some cases, serially fed FE network blocks can include serially fed FE networks with differing numbers of individual FEs. For example, in an alternative configuration, serially fed FE network 532 can include four individual FEs and serially fed FE network 534 can include three (or two, five, or more) individual FEs instead of the four individual FEs shown in FIG. 5.

In some embodiments, the BF 524 and/or other components (e.g., portions of distribution/combination networks 505, 507) can be included in an auxiliary component (e.g., on a separate PCB from the antenna elements).

FIG. 6 illustrates an example configuration 600 of an individual FE 692R, which can be included in a serially fed FE network 692 (not shown). For the purposes of the illustration of FIG. 6, the value R can correspond to an index of the individual FE 692R within a serially fed FE network 692 (not shown). For example, an initial FE 692A of the serially fed FE network 692 has an index of R=A. The serially fed FE network 692 (not shown) that includes individual FE 692R can correspond to serially fed FE networks 432, 434 shown in FIG. 4B and FIG. 4C and the individual FE 692R can correspond to any of the individual FEs included in serially fed FE networks 432, 434.

The individual FE 692R can include a distribution/combination network 685. The distribution/combination network 685 can combine signals in a receive (Rx) mode and distribute signals in a transmit (Tx) mode. In a transmit (Tx) mode, the distribution/combination network 685 can distribute a signal received at RF serial port 637A of individual FE 692R and conditioned by the signal conditioning components 649 to distribution/combination ports 659 and the RF serial port 639A of individual FE 692R. Similarly, the distribution/combination network 685 can distribute a signal received at RF serial port 637B of individual FE 692R and conditioned by the signal conditioning components 649 to distribution/combination ports 659 and the RF serial port 639B of individual FE 692R. The distributed signals can be amplified by PAs 684 and/or phase shifted by phase shifters 683 prior to being received by the antenna elements 614R. Referring to FIG. 6, phase shifters 683 can apply a phase shift to the corresponding distributed signals to generate a coherently combining transmitted signal in a desired direction (e.g., the beam direction). In turn antenna elements 614R coupled to tranxmit (Tx) ports 676 can radiate the amplified and phase adjusted RF signal.

In a receive (Rx) mode, the distribution/combination network 685 can combine a signal received at the RF serial port 639A and conditioned by the signal conditioning components 647 with signals from each antenna element 614R received at receive (Rx) ports 674 and in turn routed to distribution/combination ports 659. Similarly, the distribution/combination network 685 can combine a signal received at the RF serial port 639B and conditioned by the signal conditioning components 647 with signals from each antenna element 614R received at distribution/combination ports 659. The signal from each antenna element 614R can be amplified by LNAs 682 and/or phase shifted by phase shifters 683. In the illustrated example of FIG. 6, the Tx and Rx signal paths share a common distribution/combination port 659 and the paths are joined at a junction 675. In the example of FIG. 6 with four antenna elements 614R coupled to the individual FE 692R (e.g., M=4), the distribution/combination network 685 can act as a 5-way distributor/combiner. In some cases, for any value of M, the distribution/combination network 685 can include an M+1-way distributor/combiner. In one illustrative example, the distribution/combination network 685 can include an M+1-way Wilkinson distributor/combiner.

In some embodiments, the individual FE 692R can include one or more components 682, 683 for processing Rx signals from the antenna elements 614R and one or more components 683, 684 for processing Tx signals to the antenna elements 614R. In FIG. 6, the components 682 include LNAs to amplify respective signals from the antenna elements 614R without significantly degrading the signal-to-noise ratio of the signals.

Although a single LNA 682 and phase shifter 683 is shown coupled to each antenna element, 614R, in some cases, a separate phase shifter 683 and/or LNA 682 can be coupled to each individual antenna element 614R for each data beam. For example, in the case of two beam (e.g., BEAM1, BEAM2) individual FE 692R of FIG. 6, each antenna element 614R can be phase shifted by a separate phase shifter 683. In some cases, a single LNA 682 can be shared by two or more phase shifters 683. In some cases, a separate LNA 682 can be provided for each phase shifter 683.

Similarly, although a single phase shifter 683 and PA 684 is shown coupled to each antenna element 614R in FIG. 6, in some cases, a separate phase shifter 683 and/or PA 684 can be coupled to each individual antenna element 614R for each data beam. For example, in the case of two beam (e.g., BEAM1, BEAM2) individual FE 692R of FIG. 6, each antenna element 614R can be phase shifted by a separate phase shifter 683. In some cases, a single PA can be shared by two or more phase shifters 683. In some cases, a separate PAs 684 can be provided for each phase shifter 683.

The individual FE 692R can include signal conditioning components 649 communicatively coupled to the RF serial ports 637A, 637B and the distribution/combination network 685. The individual FE 692R can also include signal conditioning components 647 communicatively coupled to the RF serial ports 639A, 639B and the distribution/combination network 685. In some examples, the one or more of the signal conditioning components 647, 649 can include components such as, for example, LNAs, PAs, VGAs, transformers, and/or phase shifters (e.g., for Rx and/or Tx).

As described above with respect to FIG. 4B and FIG. 4C, in a receive (Rx) mode, the individual FEs 692R of the serially fed FE network 692 can be configured to provide an equal gain between each of the antenna elements 614R and a corresponding BF RFIO (e.g., BF RFIO 466, 468 of FIG. 4C). In some implementations, signal conditioning components 647, 649 can be configured to provide a common gain between RF serial ports 639A, 639B of each individual FE 492R and a corresponding BF RFIO (e.g., BF RFIO 466, 468 of FIG. 4C). In one illustrative example, the signal conditioning components 647, 649 of the individual FE 692A can be configured to make a first gain between RF serial port 639A of individual FE 692A and a first BF RFIO (e.g., BF RFIO 466, 468 of FIG. 4C) and the signal conditioning components 647, 649 of FE 692B can be configured to make a second gain between RF serial port 639A of individual FE 692B and the first BF RFIO (e.g., BF RFIO 466, 468 of FIG. 4C) equal to the common gain. In another illustrative example, the signal conditioning components 647, 649 of the individual FE 692A can be configured to make a third gain between RF serial port 639B of individual FE 692A and a second BF RFIO (e.g., BF RFIO 466, 468 of FIG. 4C) equal to a common gain and the signal conditioning components 647, 649 of FE 692B can be configured to make a fourth gain between RF serial port 639B of individual FE 692B and the second BF RFIO (e.g., BF RFIO 466, 468 of FIG. 4C) equal to the common gain. In some implementations, the signal conditioning components 647, 649 can be configured to provide a unity gain between successive RF serial ports 639A, 639B of each individual FE 692R in the serially fed FE network 692. In some cases, providing a unity gain in the receive mode can result in each individual FE 692R of the serially fed FE network 692 receiving a signal having the same gain at each RF serial port 639A, 639B of the individual FEs 692R.

Moreover, in transmit (Tx) mode, each individual FE 692R of the serially fed FE network 692 can be configured to provide an equal gain between each of the BF RFIOs (e.g., BF RFIO 466, 468 of FIG. 4C) and each of the antenna elements 614R. In some implementations, signal conditioning components 647, 649 can be configured to provide a common gain between each BF RFIO (e.g., BF RFIO 466, 468 of FIG. 4C) and a corresponding RF serial port 637A. In one illustrative example, the signal conditioning components 647, 649 of the individual FE 692A and/or the individual FE 692B can be configured to make a first gain between a first BF RFIO (e.g., BF RFIO 466, 468 of FIG. 4C) and the RF port 612 of a first individual FE 692A and a second gain between the BF RFIO (e.g., BF RFIO 466, 468 of FIG. 4C) and the RF port 613 of individual FE 692B equal to the common gain. In some cases, applying a unity gain in the Tx mode can result in each individual FE 692R of the serially fed FE network 692 receiving a signal having the same gain at each RF serial port 637A of the individual FEs 692R for a first data beam. In some examples, applying a unity gain in the Tx mode can result in each individual FE 692R of the serially fed FE network 692 receiving a signal having the same gain at each RF serial port 637B of the individual FEs 692R for a second data beam In some cases, the individual FE 692R can be an initial FE 692A (e.g., R=A) of the serially fed FE network 692 (not shown). The initial FE 692A can correspond to initial FE 432A, 434A of FIG. 4B and FIG. 4C. As described above with respect to FIG. 4B and FIG. 4C, the RF serial port 637A of an initial FE 692A can be coupled to a BF RFIO (e.g., BF RFIOs 433, 435 of FIG. 4B and FIG. 4C) of a BF (e.g., BF chips 424, 426 shown in FIG. 4B and FIG. 4C). The RF serial port 639A of an initial FE 692A can be coupled to an RF port 612 of an individual FE 692B that is serially connected to the initial FE 692A. Similarly, the RF serial port 639B of an initial FE 692A can be coupled to the RF port 613 of an individual FE 692B.

In some cases, the individual FE 692R can be a last individual FE 692P (e.g., last individual FEs 432P, 434Q of FIG. 4B and FIG. 4C, R=P). In some embodiments, the RF serial ports 639A, 639B of the last individual FE 692P can each be coupled to a matched termination. In some embodiments, the RF serial ports 639A, 639B of the last individual FE 692P can be disabled (e.g., by disabling one or more of the signal conditioning components 647).

FIG. 6 illustrates example cross-coupling signals for an individual FE 692R. As illustrated, the RF port 612 can correspond to a first data beam BEAM1 and the RF port 613 can correspond to a second data beam BEAM2. For example, in a receiving (Rx) configuration, signals received at the antenna elements 614R can be amplified by LNAs 682, phase shifted by phase shifters 683, and routed to the RF ports 612, 613 by the distribution/combination network 685.

In transmit (Tx) mode, signals received at the RF ports 612, 613 can be routed by the distribution/combination network 685, phase shifted by phase shifters 683, and amplified by the PAs 684. In some cases, the antenna elements 614R can be stimulated to transmit an RF signal over the air.

FIG. 7A shows an example schematic 700 illustrating an example main lobe 712 and side lobes 716 emanating from an antenna array of an example phased array antenna system (e.g., phased array antenna system 420 of FIG. 4B). The schematic 700 may represent a polar plot, whereby the main lobe 712 and the various side lobes 716 represent a radiation pattern, or effective isotropic radiation pattern (EIRP), of the phased array antenna system. As illustrated in FIG. 7A, the main lobe 712 may have a larger field strength compared to other lobes (e.g., side lobes 716) resulting from the transmission of the signal. The main lobe 712 may correspond to the steering direction 714 of the signal from a phased array antenna system to a satellite. In some examples, main lobe 712 may correspond to the steering direction 714 of a signal from the phased array antenna system to a user terminal (e.g., UTs 112 of FIG. 1A) and/or gateway terminal (e.g., SAGs 104 of FIG. 1A). The other lobes, or side lobes 716, may be the result of the size/shape of the array aperture (e.g., antenna aperture 402 of FIG. 4A) and any kind of excitation taper (e.g., amplitude taper) applied to the antenna array. These sidelobes might be worse in the case of an imperfect calibration resulting in systematic and/or random errors in the individual antenna signals (magnitude and/or phase). Therefore, the overall EIRP mask and the achievable sidelobe levels depends on the accuracy/quality of the calibration of the antenna array of the phased array antenna system.

FIG. 7B is a diagram 750 illustrating an example vector summation model defining a voltage magnitude and phase of a coupling result for a coupling victim 751 and aggressor 755A. Referring to FIG. 7B, the coupling victim 751. In the example of FIG. 7B, the coupling victim 751 and aggressor 755A are modeled as vectors with linear voltage magnitudes and phases. Victim phase Av represents the phase of the vector of the coupling victim 751 and aggressor phase OA represents the phase of the aggressor 755A. In some cases, as a result of interference between the aggressor 755A, the radiation pattern from the antenna element can have a phase and magnitude represented by the sum vector 758. The vector summation is illustrated graphically by a shifted aggressor vector 755B having a tail originating at the tip of the coupling victim 751. Sum phase θs represents the phase of the sum vector 758. In some implementations, the aggressor 755A can include a signal that represents B2B coupling between two data beams (e.g., BEAM1, BEAM2). In some cases, B2B coupling can occur along signal through paths (e.g., between individual FEs ports (e.g., RF ports 437, RF serial ports 439 of FIG. 4B) internal to individual FEs, and/or between routing traces connecting individual FEs of serially fed FE networks). In some examples, B2B coupling can occur along APs (e.g., coupling within antenna signal paths of individual FEs and/or coupling between antenna ports (e.g., antenna Rx ports 474, antenna Tx ports 476 of FIG. 4C) of individual FEs.

Through Path Beam-to-Beam (B2B) Coupling Cancellation

FIG. 8A is a block diagram 800 illustrating an example through path B2B coupling configuration. In the illustrated example of FIG. 8A, individual FEs 834A, 834B, 834C can be individual FEs of a serially fed FE network 834 (e.g., serially fed FE networks 432, 434 of FIG. 4B and FIG. 4C). In the illustrated example, the individual FE 834A can be an initial FE (e.g., initial FE 432A, 434A) of a serially fed FE network. For example, in a transmit section, the individual FE 834A can receive a first data beam BEAM1 and a second data beam BEAM2 from one or more signal sources (e.g., transmitters, transceivers, BF ports, DBF ports, and/or any combination thereof). As illustrated, the first data beam BEAM1, and second data beam BEAM2 can experience RF port B2B coupling 822 (e.g., at RF ports 437 of FIG. 4B) of the individual FE 834A. For example, in some cases, the first data beam BEAM1 and/or second data beam BEAM2 can couple between conductive traces, solder balls, bond pads, other coupling sources, and/or any combination thereof associated with the individual FE 834A.

As illustrated in FIG. 8A, RF signals for first data beam BEAM1 and second data beam BEAM2 can be output from the RF serial ports of the individual FE 834A. In some cases, the RF signals output from the RF serial ports of the individual FE 834A can couple between conductive traces, solder balls, bond pads at the RF serial ports of the individual FE 834A, between the individual FE 834A and the individual FE 834B, and/or at the RF ports of individual FE 834B. As illustrated, components of the B2B coupling between individual FE 834A and individual FE 834B can include RF serial port B2B coupling 824, routing B2B coupling 826, and RF port B2B coupling 822. As used herein, the RF serial port B2B coupling 824, routing B2B coupling 826, and RF port B2B coupling 822 are collectively referred to as through path B2B coupling 828. In the illustrated example of FIG. 8A, B2B coupling between the individual FE 834B and the individual FE 834C can also nominally be equal to through path B2B coupling 828. In some cases, the routing between individual FEs in a serially fed FE can be length matched, the individual FEs can have matching configurations, and/or other techniques can be used to minimize differences in B2B coupling between different pairs of individual FEs of a serially fed FE network 834 (e.g., serially fed FE networks 432, 434 of FIG. 4B and FIG. 4C).

FIG. 8B is an additional block diagram 840 illustrating coupling coefficients of an example through path B2B coupling configuration. As illustrated in FIG. 8B, the B2B coupling at the RF ports of an initial FE (e.g., individual FE 834A of FIG. 8A) can include four coupling parameters. As illustrated, the first coupling parameter 842 can correspond to a coupling parameter $C_{1\rightarrow 1,B2B,pkg\text{-}B}$, which can represent the coupling between the input first data beam BEAM1 and a signal path of the individual FE 834A associated with the first data beam BEAM1. Similarly, the second coupling parameter 844 can correspond to a coupling parameter $C_{2\rightarrow 2,B2B,pkg\text{-}B}$, which can represent the coupling between the second data beam BEAM2 and a signal path of the individual FE 834A associated with the second data beam BEAM2.

As illustrated, a first cross-coupling parameter 846 can correspond to a coupling parameter $C_{2\rightarrow 1,B2B,pkg\text{-}B}$, which can represent the coupling of the second data beam BEAM2 into a signal path associated with the first data beam BEAM1. Similarly, a second cross-coupling parameter 848 can correspond to a coupling parameter $C_{1\rightarrow 2,B2B,pkg\text{-}B}$, which can represent the coupling of the first data beam BEAM1 into the signal path associated with the second data beam BEAM2. As illustrated, a summation block 850 shows that the signals associated with the first coupling parameter 842 and first cross-coupling parameter 846 can be provided to the first RF port of the individual FE 834A. Similarly, a summation block 850 illustrates that the signals associated with the second coupling parameter 844 and the second cross-coupling parameter 848 can be provided to the second RF port of the individual FE 834A.

In one illustrative example, first cross-coupling parameter 846 and second cross-coupling parameter 848 can be associated with coupling between external electrical connections for RF ports of the individual FE 834A (e.g., solder balls)

and/or coupling associated with electrical circuitry internal to the individual FE 834A (e.g., distribution/combination network 685 of FIG. 6).

As illustrated in FIG. 8B, phase shifter 853 can correspond to a phase shifter 836 of the individual FE 834A associated with the first data beam BEAM1. Similarly, phase shifter 853 can correspond to a phase shifter 836 of the individual FE 834A associated with the second data beam BEAM2. In some cases, the phase shifters 853, 855 can be used to introduce phase shifts to cancel at least a portion of the RF port B2B coupling 822 at the individual FE 834A.

As illustrated in FIG. 8B, the through path B2B coupling 828 can be modeled by a first through path B2B coupling parameter 852, a second through path coupling parameter 854, a first through path B2B cross-coupling parameter 856, and a second through path B2B cross-coupling parameter 858.

As illustrated in FIG. 8B, the through path B2B coupling 828 between RF serial ports (e.g., RF serial ports 439 of FIG. 4B and FIG. 4C) of an initial FE (e.g., individual FE 834A of FIG. 8A) and a second FE (e.g., individual FE 834B of FIG. 8A) coupled to the RF serial ports of the initial FE can include four coupling parameters. As illustrated, the first through path B2B coupling parameter 852 can correspond to a coupling parameter $C_{1\rightarrow 1,B2B,THRU}$, which can represent the coupling between the first data beam BEAM1 output by the individual FE 834A and a first RFIO port of the individual FE 834B associated with the first data beam BEAM1. Similarly, the second through path coupling parameter 854 can correspond to a coupling parameter $C_{2\rightarrow 2,B2B,THRU}$, which can represent the coupling between the second data beam BEAM2 output by the individual FE 834A and a second RFIO port of the individual FE 834B associated with the second data beam BEAM2.

As illustrated, a first through path B2B cross-coupling parameter 856 can correspond to a coupling parameter $C_{2\rightarrow 1,B2B,THRU}$, which can represent the coupling between the second data beam BEAM2 output by the individual FE 834A and the first RFIO port of the individual FE 834B associated with the first data beam BEAM1. Similarly, a second through path B2B cross-coupling parameter 858 can correspond to a coupling parameter $C_{1\rightarrow 2,B2B,THRU}$, which can represent the coupling between the first data beam BEAM1 output by the individual FE 834A and the second RFIO port of the individual FE 834B associated with the second data beam BEAM2. As illustrated, a summation block 850 illustrates that the signals associated with the first first through path B2B coupling parameter 852 and first first through path B2B cross-coupling parameter 856 can be provided to the first RF port of the individual FE 834B. Similarly, a summation block 850 illustrates that the signals associated with the second second through path coupling parameter 854 and the second through path B2B cross-coupling parameter 858 can be provided to the second RF port of the individual FE 834B.

As illustrated in FIG. 8B, phase shifter 857 can correspond to a phase shifter 836 of a second individual FE 834B associated with the first data beam BEAM1. Similarly, phase shifter 859 can correspond to a phase shifter 836 of the second individual FE 834B associated with the second data beam BEAM2. In some cases, the phase shifters 857, 859 can be used to introduce phase shifts to cancel at least a portion of the through path B2B coupling 828 between the individual FE 834A and the second individual FE 834B.

As illustrated in FIG. 8B, phase shifter 861 can correspond to a phase shifter 836 of a third individual FE 834C associated with the first data beam BEAM1. Similarly, phase shifter 863 can correspond to a phase shifter 836 of the third individual FE 834C associated with the second data beam BEAM2. In some cases, the phase shifters 861, 863 can be used to introduce phase shifts to cancel at least a portion of the through path B2B coupling 828 between the second individual FE 834B and the third individual FE 834C.

Figure 8C:
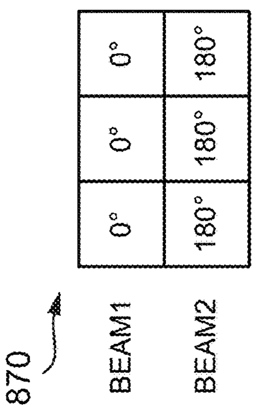
FIG. 8C through FIG. 8H are diagrams illustrating example phase shifts for providing B2B coupling cancellation as illustrated in FIG. 8A and FIG. 8B, in accordance with some examples of the present disclosure.

FIG. 8C through FIG. 8H are diagrams illustrating example phase shifts for providing through path B2B coupling cancellation and/or AP B2B coupling cancellation. In the example tables 870, 875, 880, and 885 of FIG. 8C through FIG. 8F can represent phase shifts for a serially fed FE network including three individual FEs (e.g., as illustrated in FIG. 8A and FIG. 8B). In the illustrated example of FIG. 8C through FIG. 8H, each column of the tables can correspond to a different individual FE of a serially fed FE network. For example, the first column of example table 870 can correspond to an initial FE of the serially fed FE network, the second column of example table 870 can correspond to a second FE of the serially fed FE network, and the third column of example table 870 can correspond to a final FE of the serially fed FE network. For the example tables of FIG. 8G and FIG. 8H, a similar correspondence between columns and individual FEs of a serially fed FE network including five individual FEs is provided. Additionally, the rows of the tables in FIG. 8C through FIG. 8H can correspond to phase shifts for first data beam BEAM1 and second data beam BEAM2, respectively:

FIG. 8C illustrates an example table 870 including non-alternating phase shifts that can be utilized for through path B2B coupling cancellation. In the example of example table 870, the phase shifts of 0 degrees (0°) indicated by the first row for first data beam BEAM1 can correspond to phase shifts applied by the phase shifters 853, 857, and 861 of FIG. 8B. Similarly, the phase shifts of 180 degrees (180°) indicated by the second row for second data beam BEAM2 can correspond to phase shifts applied by the phase shifters 855, 859, and 863 of FIG. 8B.

Figure 8D:
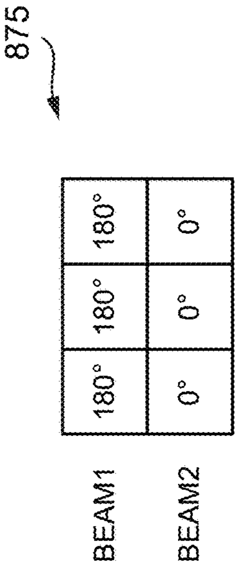

FIG. 8D illustrates another example table 875 including non-alternating phase shifts. As illustrated, the phase values of the first and second rows of example table 875 of FIG. 8C are swapped. Accordingly, phase shifts of 180 degrees (180°) indicated by the first row for first data beam BEAM1 can correspond to phase shifts applied by the phase shifters 853, 857, and 861 of FIG. 8B. Similarly, the phase shifts of 0180 degrees (180°) indicated by the second row for second data beam BEAM2 can correspond to phase shifts applied by the phase shifters 855, 859, and 863 of FIG. 8B.

Figure 8E:
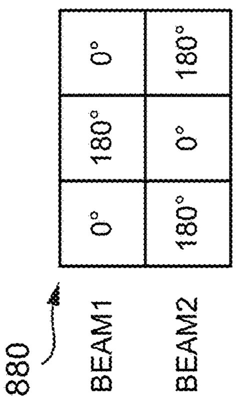

FIG. 8E illustrates an example table 880 including alternating phase shifts. As illustrated, a first phase shifter (e.g., phase shifter 853 of FIG. 8B) for first data beam BEAM1 can apply a phase shift of 0 degrees (0°), a second phase shifter (e.g., phase shifter 857 of FIG. 8B) can apply a phase shift of 180 degrees (180°), and a third phase shifter (e.g., phase shifter 861 of FIG. 8B) can apply a phase shift of 0 degrees (0°). Similarly, a first phase shifter (e.g., phase shifter 855 of FIG. 8B) for first data beam BEAM1 can apply a phase shift of 180 degrees (180°), a second phase shifter (e.g., phase shifter 859 of FIG. 8B) can apply a phase shift of 0 degrees (0°), and a third phase shifter (e.g., phase shifter 863 of FIG. 8B) can apply a phase shift of 180 degrees (180°).

Figure 8F:
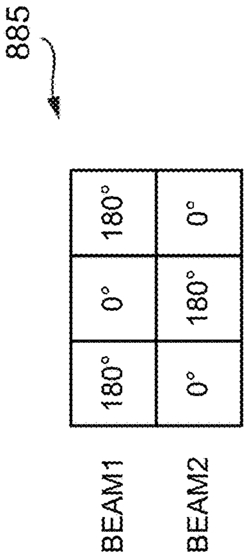

FIG. 8F illustrates an example table 885 including alternating phase shifts. As illustrated, a first phase shifter (e.g., phase shifter 853 of FIG. 8B) for first data beam BEAM1 can apply a phase shift of 180 degrees (180°), a second phase shifter (e.g., phase shifter 857 of FIG. 8B) can apply a phase shift of 0 degrees (0°), and a third phase shifter (e.g., phase shifter 861 of FIG. 8B) can apply a phase shift of 180 degrees (180°). Similarly, a first phase shifter (e.g., phase shifter 855 of FIG. 8B) for first data beam BEAM1 can apply a phase shift of 0 degrees (0°), a second phase shifter (e.g., phase shifter 859 of FIG. 8B) can apply a phase shift of 180 degrees (180°), and a third phase shifter (e.g., phase shifter 863 of FIG. 8B) can apply a phase shift of 0 degrees (0°).

Figure 8G:
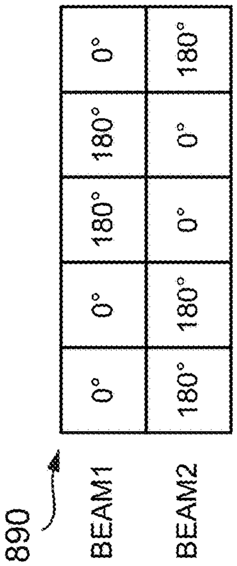

FIG. 8G illustrates an example table 890 including alternating phase shifts. As illustrated, phase shifters of a serially fed FE network including five individual FEs (not shown) for first data beam BEAM1 can apply phase shifts in the first row of the example table 890. Similarly, phase shifters of a serially fed FE network including five individual FEs (not shown) for second data beam BEAM2 can apply phase shifts in the second row of the example table 890.

Figure 8H:
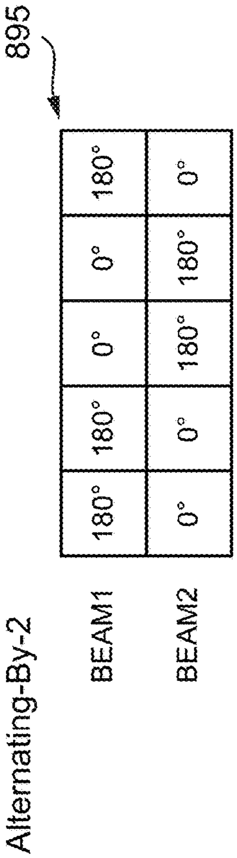

FIG. 8H illustrates an example table 895 including alternating phase shifts. As illustrated, phase shifters of a serially fed FE network including five individual FEs (not shown) for first data beam BEAM1 can apply phase shifts in the first row of the example table 895. Similarly, phase shifters of a serially fed FE network including five individual FEs (not shown) for second data beam BEAM2 can apply phase shifts in the second row of the example table 895.

FIG. 9A, FIG. 10A, and FIG. 11A illustrate examples of through path B2B coupling with application of different phase shifts. For the purposes of illustration, the illustrations of FIG. 9A, FIG. 10A, and FIG. 11A illustrate coupling of a first data beam BEAM1 into the signal path of a second data beam BEAM2. Similarly, FIG. 9B, FIG. 10B, and FIG. 11B illustrate changes in signal from the first data beam BEAM1 observed at the steering angle for second data beam BEAM2 that can be caused by application of different phase shifts as described with respect FIG. 9A, FIG. 10A, and FIG. 11A. It should be understood that the second data beam BEAM2 may also coupled into the signal path of the first data beam BEAM1 (e.g., as described with respect to FIG. 8A and FIG. 8B above). One skilled in the art should understand that the systems and techniques for through path B2B coupling cancellation described herein can be used for coupling of the second data beam BEAM2 into the signal path of the first data beam BEAM1. Similarly, one skilled in the art should understand from FIG. 9B, FIG. 10B, and FIG. 11B that the application of different phase shifts may result in changes in signal from the second data beam BEAM2 observed at the steering angle for the first data beam BEAM1.

FIG. 9A illustrates an example configuration 900 illustrating through path B2B coupling without application of phase shifts for providing through path B2B coupling cancellation. The configuration 900 of FIG. 9A illustrates three individual FEs 934A, 934B, 934C that can be included in a serially fed FE network 934. In some cases, the serially fed FE network 934 can correspond to serially fed FE networks 432, 434 of FIG. 4A and FIG. 4C.

In the illustrated example of FIG. 9A, each of the three individual FEs 934A, 934B, 934C can include one or more signal conditioning components for applying a phase shift and/or gain to the first data beam BEAM1 before outputting the first data beam BEAM1 from a first RF serial port to a first RF port of a subsequent FE of the serially fed FE network 934. In the example of FIG. 9A, the one or more signal conditioning components for applying a phase shift and/or gain to the first data beam BEAM1 can include phase shifter 853 for the first individual FE 934A, phase shifter 857 for the second individual FE 934B, and phase shifter 861 for the third individual FE 934C.

In the illustrated example of FIG. 9A, each of the three individual FEs 934A, 934B, 934C can include one or more signal conditioning components for applying a phase shift and/or gain to the second data beam BEAM2 before outputting the second data beam BEAM2 from a second RF serial port to a second RF port of a subsequent FE of the serially fed FE network 934. In the example of FIG. 9A, the one or more signal conditioning components for applying a phase shift and/or gain to the second data beam BEAM2 can include phase shifter 855 for the first individual FE 934A, phase shifter 859 for the second individual FE 934B, and phase shifter 863 for the third individual FE 934C.

In the illustrated example of FIG. 9A, none of the phase shifters 853, 855, 857, 859, 861, 863 apply any phase shift to the first data beam BEAM1 or the second data beam BEAM2 for performing through path B2B coupling cancellation.

In the illustrated example, first RF port 901 of the first individual FE 934A can receive a first data beam BEAM1. As illustrated in FIG. 9A, a first AP component of the first data beam BEAM1 902 can be phase shifted by a phase shifter 984 of the first individual FE 934A with a phase shift corresponding to a first data beam BEAM1 steering angle. A second through path component of the first data beam BEAM1 903 can be input into the phase shifter 853 where no phase shift is applied in the configuration 900 of FIG. 9A.

A second RF port 911 of the first individual FE 934A can receive a second data beam BEAM2. As illustrated, the first data beam BEAM1 can couple to the second data beam BEAM2 signal path with a cross-coupling parameter 906 having a complex coupling value $C_{1\rightarrow 2}$. In some cases, the cross-coupling parameter 906 can correspond to second cross-coupling parameter 848 of FIG. 8B. A first cross-coupled first data beam BEAM1 component 908 can be combined (e.g., summed in voltage) with second data beam BEAM2 as illustrated by summation block 950 of first individual FE 934A.

A portion of the first cross-coupled first data beam BEAM1 component 908 and a first AP component of the second data beam BEAM2 904 can be phase shifted by a phase shifter 984 of first individual FE 934A with a phase shift corresponding to a second data beam BEAM2 steering angle. In some implementations, the first data beam BEAM1 and the second data beam BEAM2 can be transmitted simultaneously with different steering angles.

Equation (1) below illustrates a phase $\varphi_{obs1,b1\rightarrow b2}$ of the first cross-coupled first data beam BEAM1 component 1008 from the first individual FE 934A and observed at the second data beam BEAM2 steering angle:

$$\varphi_{obs1,b1\rightarrow b2} = \varphi_{b1,CM} + \varphi_{C,1\rightarrow 2} + \varphi_{b2,1} + \varphi_{ota,1} \tag{1}$$

Where $\varphi_{b1,CM}$ is the common mode phase shift for first data beam BEAM1 (e.g., phase of first data beam BEAM1 at the first RF port 901), $\varphi_{C,1\rightarrow 2}$ is the phase shift associated with cross-coupling parameter 906, $\varphi_{b2,1Z}$ is the phase shift applied by the phase shifter 984 of first individual FE 934A corresponding to the second data beam BEAM2 steering angle, and $\varphi_{ota,1}$ is the inverse of the phase of the second data beam BEAM2 signal transmitted by the antenna of first individual FE 934A. Equation (2a) and Equation (2b) below illustrate a substitution for $\varphi_{ota,1}$ that can be used to simplify the expression for $\varphi_{obs1,b1\rightarrow b2}$ of Equation (1):

$$\varphi_{ant1,b2} = (\varphi_{b2,CM} + \varphi_{b2,1}) = -\varphi_{ota,1} \tag{2a}$$

$$\varphi_{b2,1} + \varphi_{ota,1} = -\varphi_{b2,CM} \tag{2b}$$

Where $\varphi_{b2,CM}$ is the common mode phase shift for second data beam BEAM2 (e.g., phase of first data beam BEAM1 at the second RF port 911). In some cases, $\varphi_{b1,CM}$ and $\varphi_{b2,CM}$ can be phase values provided by a BF RFIO (e.g., BF RFIOs 433, 435 of FIG. 4B).

Substituting Equation (2b) into Equation (1) yields Equation (3) below:

$$\varphi_{obs1,b1\rightarrow b2} = \varphi_{b1,CM} + \varphi_{C,b1\rightarrow b2} - \varphi_{b2,CM} \tag{3}$$

As illustrated, a first through path portion of the cross-coupled first data beam BEAM1 component 909 and a first through path component of the second data beam BEAM2 905 can be input to the phase shifter 855 where no phase shift is applied in the configuration 900 of FIG. 9A.

As illustrated, the first data beam BEAM1 can experience a phase shift $\varphi_{thru}$ along routing traces between the first individual FE 934A and the second individual FE 934B. Similarly, second data beam BEAM2 can experience a phase shift $\varphi_{thru}$ along routing traces between the first individual FE 934A and the second individual FE 934B.

As illustrated in FIG. 9A, the second individual FE 934B can receive the through path component of the first data beam BEAM1 903 and the first through path component of the second data beam BEAM2 905 at RF ports of the second individual FE 934B. In the first data beam BEAM1 signal path of the second individual FE 934B, a second AP component of the first data beam BEAM1 902 can be phase shifted by a phase shifter 984 of the second individual FE 934B with a phase shift corresponding to the first data beam BEAM1 steering angle. A second through path component of the first data beam BEAM1 903 can be input into the phase shifter 857 where no phase shift is applied in the configuration 900 of FIG. 9A.

As illustrated, the through path component of the first data beam BEAM1 903 can couple to the second data beam BEAM2 signal path with a cross-coupling parameter 910 having a complex coupling value $C_{1\rightarrow 2}$. In some cases, the cross-coupling parameter 910 can correspond to second through path B2B cross-coupling parameter 858 of FIG. 8B for second individual FE 834B of FIG. 8A. A second cross-coupled first data beam BEAM1 component 912 can be combined (e.g., summed in voltage) with through path component of the second data beam BEAM2 905 and the first through path portion of the cross-coupled first data beam BEAM1 component 909 as illustrated by summation block 950 of second individual FE 934B. In the illustrated example, the first through path portion of the cross-coupled first data beam BEAM1 component 909 and second cross-coupled first data beam BEAM1 component 912 are collectively shown as an AP component of a combined cross-coupled first data beam BEAM1 914 and a through path component of a combined cross-coupled first data beam BEAM1 915.

The AP component of a combined cross-coupled first data beam BEAM1 914 and a second AP component of the second data beam BEAM2 904 can be phase shifted by a phase shifter 984 of second individual FE 934B with a phase shift corresponding to the second data beam BEAM2 steering angle. Accordingly, the amount of first data beam BEAM1 power transmitted by the second individual FE 934B can be greater than the amount of first data beam BEAM1 power transmitted by the first individual FE 934A. As illustrated, through path component of a combined cross-coupled first data beam BEAM1 915 and a second through path component of the second data beam BEAM2 905 can be input to the phase shifter 859 where no phase shift is applied in the configuration 900 of FIG. 9A.

As illustrated, the first data beam BEAM1 can experience a phase shift $\varphi_{thru}$ along routing traces between the second individual FE 934B and the third individual FE 934C. Similarly, second data beam BEAM2 can experience a phase shift $\varphi_{thru}$ along routing traces between the second individual FE 934B and the third individual FE 934C.

Equation (4a) below illustrates the phase $\varphi_{obs2,b1\rightarrow b2}[1]$ of a component of first data beam BEAM1 observed at the second data beam BEAM2 steering angle transmitted by the second individual FE 934B corresponding to the first through path portion of the cross-coupled first data beam BEAM1 component 909 resulting from the cross-coupling parameter 906 associated with first individual FE 934A:

$$\varphi_{obs2,b1\rightarrow b2}[1] = \varphi_{b1,CM} + \varphi_{C,1\rightarrow 2} + \varphi_{thru} + \varphi_{b2,2} + \varphi_{ota,2} \tag{4a}$$

Where $\varphi_{b2,2}$ is the phase shift applied by the phase shifter 984 of the second individual FE 934B and $\varphi_{ota,2}$ is the inverse of the phase of the second data beam BEAM2 signal transmitted by the antenna of second individual FE 934B.

Equation (4b) below illustrates the phase $\varphi_{obs2,b1\rightarrow b2}[2]$ of AP component of a combined cross-coupled first data beam BEAM1 914 observed at second data beam BEAM2 steering angle transmitted by second individual FE 934B corresponding to the cross-coupling parameter 910 associated with second individual FE 934B:

$$\varphi_{obs2,b1\rightarrow b2}[2] = \varphi_{b1,CM} + \varphi_{thru} + \varphi_{C,1\rightarrow 2} + \varphi_{b2,2} + \varphi_{ota,2} \tag{4b}$$

Using the assumption that $\varphi_{C,1\rightarrow 2}$ is the same for the cross-coupling parameter 906 and cross-coupling parameter 910, the two first data beam BEAM1 components observed at the second data beam BEAM2 steering angle transmitted by the second individual FE 934B can be treated as equal as illustrated in Equation (5) below:

$$\varphi_{obs2,b1\rightarrow b2}[1] = \varphi_{obs2,b1\rightarrow b2}[2] = \varphi_{obs2,b1\rightarrow b2} \tag{5}$$

Equation (6a) and Equation (6b) below illustrate a substitution for $\varphi_{ota,2}$ that can be used to simplify the expression for $\varphi_{obs2,b1\rightarrow b2}$:

$$\varphi_{ant2,b2} = (\varphi_{b2,CM} + \varphi_{thru} + \varphi_{b2,2}) = -\varphi_{ota,2} \tag{6a}$$

$$\varphi_{b2,2} + \varphi_{ota,2} = -(\varphi_{b2,CM} + \varphi_{thru}) \tag{6b}$$

Substituting equation (6b) into either equation (4a) or (4b) yields a simplified expression for $\varphi_{obs2,b1\rightarrow b2}$ as illustrated in Equation (7):

$$\varphi_{obs2,b1\rightarrow b2} = \varphi_{C,1\rightarrow 2} + \varphi_{b1,CM} - \varphi_{b2,CM} \quad (7)$$

Notably, the phase $\varphi_{obs2,b1\rightarrow b2}$ is identical to the phase $\varphi_{obs1,b1\rightarrow b2}$ (see Equation (3)).

As illustrated in FIG. 9A, in the first data beam BEAM1 signal path, an AP component of the first data beam BEAM1 902 can be phase shifted by a phase shifter 984 of the third individual FE 934C with a phase shift corresponding to the first data beam BEAM1 steering angle. A through path component of the first data beam BEAM1 903 can be input into the phase shifter 861 where no phase shift is applied in the configuration 900 of FIG. 9A.

As illustrated in FIG. 9A, the third individual FE 934C can receive the through path component of the first data beam BEAM1 903 and the first through path component of the second data beam BEAM2 905 at RF ports of the third individual FE 934C. As illustrated, the through path component of the first data beam BEAM1 903 can couple to the second data beam BEAM2 signal path with a cross-coupling parameter 916 having a complex coupling value $C_{1\rightarrow 2}$. In some cases, the cross-coupling parameter 916 can correspond to second through path B2B cross-coupling parameter 858 of FIG. 8B for third individual FE 834C of FIG. 8A.

A third cross-coupled first data beam BEAM1 component 918 can be combined (e.g., summed in voltage) with through path component of the second data beam BEAM2 905 and the through path component of a combined cross-coupled first data beam BEAM1 915 as illustrated by summation block 950 of third individual FE 934C. In the illustrated example, through path component of combined cross-coupled first data beam BEAM1 915 and third cross-coupled first data beam BEAM1 component 918 are collectively shown as AP component of second combined cross-coupled first data beam BEAM1 920 and through path component of second combined cross-coupled first data beam BEAM1 921.

The portion of second combined cross-coupled first data beam BEAM1 component 920 and a portion of the second data beam BEAM2 904 can be phase shifted by a phase shifter 984 of third individual FE 934C with a phase shift corresponding to the second data beam BEAM2 steering angle. Accordingly, the amount of first data beam BEAM1 power transmitted by the third individual FE 934C can be greater than the amount of first data beam BEAM1 power transmitted by either the first individual FE 934A or the second individual FE 934B. As illustrated, the through path component of combined cross-coupled first data beam BEAM1 915 and second through path component of the second data beam BEAM2 905 can be input to the phase shifter 859 where no phase shift is applied in the configuration 900 of FIG. 9A. In some cases, second data beam BEAM2 can be coupled to an additional individual FE of a serially fed FE network or the RF serial ports of third individual FE 934C can be terminated if third individual FE 934C is a final individual FE of a serially fed FE network 934 as illustrated in FIG. 9A.

Equation (8a) below illustrates the phase $\varphi_{obs3,b1\rightarrow b2}[1]$ of first cross-coupled first data beam BEAM1 component 908 observed at the second data beam BEAM2 steering angle transmitted by the third individual FE 934C corresponding to the first through path portion of the cross-coupled first data beam BEAM1 component 909 resulting from the cross-coupling parameter 906 associated with first individual FE 934A:

$$\varphi_{obs3,b1\rightarrow b2}[1] = \varphi_{b1,CM} + \varphi_{C,1\rightarrow 2} + 2\varphi_{thru} + \varphi_{b2,3} + \varphi_{ota,3} \quad (8a)$$

Where $\varphi_{Pb2,3}$ is the phase shift applied by the phase shifter 984 of the third individual FE 934C and $\varphi_{ota,3}$ is the inverse of the phase of the second data beam BEAM2 signal transmitted by the antenna of third individual FE 934C.

Equation (8b) below illustrates the phase $\varphi_{obs3,b1\rightarrow b2}[2]$ of second cross-coupled first data beam BEAM1 component 912 observed at second data beam BEAM2 steering angle transmitted by third individual FE 934C corresponding to the cross-coupling parameter 910 associated with second individual FE 934B:

$$\varphi_{obs3,b1\rightarrow b2}[2] = \varphi_{b1,CM} + \varphi_{thru} + \varphi_{C,1\rightarrow 2} + \varphi_{thru} + \varphi_{b2,3} + \varphi_{ota,3} \quad (8b)$$

Equation (8c) below illustrates the phase $\varphi_{obs3,b1\rightarrow b2}[3]$ of third cross-coupled first data beam BEAM1 component 918 observed at second data beam BEAM2 steering angle transmitted by third individual FE 934C corresponding to the cross-coupling parameter 916 associated with third individual FE 934C:

$$\varphi_{obs3,b1\rightarrow b2}[3] = \varphi_{b1,CM} + 2\varphi_{thru} + \varphi_{C,1\rightarrow 2} + \varphi_{b2,3} + \varphi_{ota,3} \quad (8c)$$

Using the assumption that $\varphi_{C,1\rightarrow 2}$ is the same for the cross-coupling parameter 906 and cross-coupling parameter 910, and cross-coupling parameter 916, the three first data beam BEAM1 components observed at the second data beam BEAM2 steering angle transmitted by the third individual FE 934C can be treated as equal as illustrated in Equation (9) below:

$$\varphi_{obs3,b1\rightarrow b2}[1] = \varphi_{obs3,b1\rightarrow b2}[2] = \varphi_{obs3,b1\rightarrow b2}[3] = \varphi_{obs3,b1\rightarrow b2} \quad (9)$$

Equation (10a) and Equation (10b) below illustrate a substitution for $\varphi_{ota,3}$ that can be used to simplify the expression for $\varphi_{obs3,b1\rightarrow b2}$:

$$\varphi_{ant3,b2} = \varphi_{b2,CM} + 2\varphi_{thru} + \varphi_{b2,3} = -\varphi_{ota,3} \quad (10a)$$

$$\varphi_{b2,3} + \varphi_{ota,3} = -(\varphi_{b2,CM} + 2\varphi_{thru}) \quad (10b)$$

Substituting equation (10b) into either equation (4a) or (4b) yields a simplified expression for $\varphi_{obs3,b1\rightarrow b2}$ as illustrated in Equation (11) below:

$$\varphi_{obs3,b1\rightarrow b2} = \varphi_{C,1\rightarrow 2} + \varphi_{b1,CM} - \varphi_{b2,CM} \quad (11)$$

Notably, the phase $\varphi_{obs3,b1\rightarrow b2}$ is identical to the phases $\varphi_{obs1,b1\rightarrow b2}$ and $\varphi_{obs2,b1\rightarrow b2}$ as illustrated in Equation (12) below:

$$\varphi_{obs1,b1\rightarrow b2} = \varphi_{obs2,b1\rightarrow b2} = \varphi_{obs3,b1\rightarrow b2} \quad (12)$$

Using the phases calculated above from Equation (1) through Equation (12), voltages associated with first data beam BEAM1 observed at second data beam BEAM2 steering angle can be calculated.

Equation (13) below illustrates the voltage $V_{obs1,B1\rightarrow B2}$ associated with first data beam BEAM1 observed at second data beam BEAM2 steering angle transmitted by first individual FE 934A:

$$V_{obs1,B1\rightarrow B2} = |C_{1\rightarrow 2}|e^{j\varphi_{obs1,B1\rightarrow B2}} \tag{13}$$

Equation (14a) through Equation (14c) below illustrate the voltage $V_{obs2,B1\rightarrow B2}$ associated with first data beam BEAM1 observed at second data beam BEAM2 steering angle transmitted by second individual FE 934B. For example, Equation (14a) below illustrates that $V_{obs2,B1\rightarrow B2}$ is the sum of the two components $V_{obs2,B1\rightarrow B2}[1]$, $V_{obs2,B1\rightarrow B2}[2]$ corresponding to $\varphi_{obs2,b1\rightarrow b2}[1]$ and $\varphi_{obs2,b1\rightarrow b2}[2]$ of Equation (4a) and Equation (4b), respectively:

$$V_{obs2,B1\rightarrow B2} = V_{obs2,B1\rightarrow B2}[1] + V_{obs2,B1\rightarrow B2}[2] \tag{14a}$$

Furthermore, assuming that the magnitude of cross-coupling parameters 906 and 910 are equal to an identical value $|C_{1\rightarrow 2}|$, voltages $V_{obs1,B1\rightarrow B2}$, $V_{obs2,B1\rightarrow B2}[1]$, $V_{obs2,B1\rightarrow B2}[2]$ can all be equal as shown in Equation (14b) below:

$$V_{obs2,B1\rightarrow B2}[1] = V_{obs1,B1\rightarrow B2} = V_{obs2,B1\rightarrow B2}[2] \tag{14b}$$

Substituting Equation (13) into Equation (14a) yields $V_{obs2,B1\rightarrow B2}$ as shown in Equation (14c) below:

$$V_{obs2,B1\rightarrow B2} = 2|C_{1\rightarrow 2}|e^{j\varphi_{obs1,B1\rightarrow B2}} \tag{14c}$$

Accordingly, based on the assumptions outlined above, the voltage $V_{obs2,B1\rightarrow B2}$ can be double the voltage $V_{obs1,B1\rightarrow B2}$.

Similar substitutions based on an assumption that the magnitude of cross-coupling parameters 906, 910, and 916 are equal to an identical value $C_{1\rightarrow 2}$, to determine the voltage $V_{obs3,B1\rightarrow B2}$ associated with the first data beam BEAM1 observed at the second data beam BEAM2 steering angle transmitted by third individual FE 934C. For example, Equation (15a) below illustrates that $V_{obs3,B1\rightarrow B2}$ is the sum of the three voltage components $V_{obs3,B1\rightarrow B2}[1]$, = $V_{obs3,B1\rightarrow B2}[2]$, and $V_{obs3,B1\rightarrow B2}[3]$ corresponding to $\varphi_{obs3,b1\rightarrow b2}[1]$, $\varphi_{obs3,b1\rightarrow b2}[2]$, and $\varphi_{obs3,b1\rightarrow b2}[3]$ of Equation (8a), Equation (8b), and Equation (8c), respectively:

$$V_{obs3,B1\rightarrow B2} = V_{obs3,B1\rightarrow B2}[1] + V_{obs3,B1\rightarrow B2}[2] + V_{obs3,B1\rightarrow B2}[3] \tag{15a}$$

Equation (15b) below shows that three voltage components $V_{obs3,B1\rightarrow B2}[1]$, $V_{obs3,B1\rightarrow B2}[2]$, and $V_{obs3,B1\rightarrow B2}[3]$ can be equal to $V_{obs1,B1\rightarrow B2}$:

$$V_{obs3,B1\rightarrow B2}[1] = V_{obs1,B1\rightarrow B2} = V_{obs3,B1\rightarrow B2}[2] = V_{obs3,B1\rightarrow B2}[3] \tag{15b}$$

Substituting Equation (13) into Equation (15a) yields Equation (16) below:

$$V_{obs3,B1\rightarrow B2} = 3|C_{1\rightarrow 2}|e^{j\varphi_{obs1,B1\rightarrow B2}} \tag{16}$$

Equation (17) below illustrates the magnitude of the sum of the voltages from Equation (13), Equation (14c), and Equation (16) above to illustrate the total voltage magnitude associated with first data beam BEAM1 observed at second data beam BEAM2 steering angle transmitted by the three individual FEs 934A, 934B, 934C:

$$|V_{obs,\sum b1\rightarrow b2}| = 6|C_{1\rightarrow 2}| \tag{17}$$

Equation (18) below illustrates the effective coupling magnitude for the serially fed FE network 934 which is equal to the total voltage magnitude shown in Equation (17) divided by the number of paths (e.g., one for each of the three individual FEs 934A, 934B, 934C):

$$\text{Effective } B1 \rightarrow B2|\text{Coupling}| = \frac{|V_{obs,\sum b1\rightarrow b2}|}{\sum \text{paths}} = 2|C_{1\rightarrow 2}| \tag{18}$$

FIG. 9B illustrates a plot 970 of first data beam BEAM1 radiation patterns (e.g., gain) in the steering direction of the first data beam BEAM1 and in the steering direction of second data beam BEAM2 for the example configuration 900 of FIG. 9A. As illustrated in FIG. 9B, first data beam BEAM1 gain in a region 952 around the first data beam BEAM1 steering angle includes a main lobe 954 and side lobes 956. Similarly, first data beam BEAM1 gain in a region 958 around the second data beam BEAM2 steering angle includes a peak value 960 that is approximately −25 dBc relative to the peak gain of the main lobe 954.

As illustrated by FIG. 9A and FIG. 9B, in the absence of phase shifts for through path B2B coupling cancellation, significant power from one beam (e.g., first data beam BEAM1) can be transmitted in the steering direction of the other beam (e.g., second data beam BEAM2).

FIG. 10A illustrates an example configuration 1000 illustrating B2B coupling with non-alternating application of phase shifts for providing through path B2B coupling cancellation.

The configuration 1000 of FIG. 10A illustrates three individual FEs 1034A, 1034B, 1034C that can be included in a serially fed FE network 1034. In some cases, the serially fed FE network 1034 can correspond to serially fed FE networks 432, 434 of FIG. 4A and FIG. 4C.

In the illustrated example of FIG. 10A, each of the three individual FEs 1034A, 1034B, 1034C can include one or more signal conditioning components for applying a phase shift and/or gain to the first data beam BEAM1 before outputting the first data beam BEAM1 from a first RF serial port to a first RF port of a subsequent FE of the serially fed FE network 1034. In the example of FIG. 10A, the one or more signal conditioning components for applying a phase shift and/or gain to the first data beam BEAM1 can include phase shifter 853 for the first individual FE 1034A, phase shifter 857 for the second individual FE 1034B, and phase shifter 861 for the third individual FE 1034C.

In the illustrated example of FIG. 10A, each of the three individual FEs 1034A, 1034B, 1034C can include one or more signal conditioning components for applying a phase shift and/or gain to the second data beam BEAM2 before outputting the second data beam BEAM2 from a second RF serial port to a second RF port of a subsequent FE of the serially fed FE network 1034. In the example of FIG. 10A, the one or more signal conditioning components for applying a phase shift and/or gain to the second data beam BEAM2 can include phase shifter 855 for the first individual FE 1034A, phase shifter 859 for the second individual FE 1034B, and phase shifter 863 for the third individual FE 1034C.

In the illustrated example of FIG. 10A, none of the phase shifters for the first data beam BEAM1 853, 857, 861 apply any phase shift to the first data beam BEAM1. However, as shown in FIG. 10A, the phase shifters 855, 859, 863 apply a phase shift of 180 degrees (180°) to through path components of the second data beam BEAM2 for performing through path B2B coupling cancellation.

In the illustrated example, first RF port 1001 of the first individual FE 1034A can receive a first data beam BEAM1. As illustrated in FIG. 10A, an AP component of the first data beam BEAM1 signal 1002 can be phase shifted by a phase shifter 1084 of the first individual FE 1034A with a phase shift corresponding to a first data beam BEAM1 steering angle. A through path component of the first data beam BEAM1 1003 can be input into the phase shifter 853 where no phase shift is applied in the configuration 1000 of FIG. 10A.

A second RF port 1091 of the first individual FE 1034A can receive a second data beam BEAM2. As illustrated, the first data beam BEAM1 can couple to the second data beam BEAM2 signal path with a cross-coupling parameter 1006 having a complex coupling value $C_{1\rightarrow 2}$. In some cases, the cross-coupling parameter 1006 can correspond to second cross-coupling parameter 848 of FIG. 8B. A first cross-coupled first data beam BEAM1 component 1008 can be combined (e.g., summed in voltage) with second data beam BEAM2 as illustrated by summation block 1050 of first individual FE 1034A.

In some cases, first cross-coupled first data beam BEAM1 component 1008 and an AP component of the second data beam BEAM2 1004 can be phase shifted by a phase shifter 1085 of first individual FE 1034A with a phase shift corresponding to a second data beam BEAM2 steering angle. In some implementations, the first data beam BEAM1 and the second data beam BEAM2 can be transmitted simultaneously with different steering angles.

Equation (19) below illustrates a phase $\varphi_{obs1,b1\rightarrow b2}$ of the first cross-coupled first data beam BEAM1 component 1008 transmitted from the first individual FE 1034A and observed at the second data beam BEAM2 steering angle:

$$\varphi_{obs1,b1\rightarrow b2} = \varphi_{b1,CM} + \varphi_{C,1\rightarrow 2} + \varphi_{b2,1} + \varphi_{ota,1} \quad (19)$$

Where $\varphi_{b1,CM}$ is the common mode phase shift for first data beam BEAM1 (e.g., phase of first data beam BEAM1 at the first RF port 1001), $\varphi_{C,1\rightarrow 2}$ is the phase shift associated with cross-coupling parameter 1006, $\varphi_{b2,1}$ is the phase shift applied by the phase shifter 1085 of first individual FE 1034A corresponding to the second data beam BEAM2 steering angle, and $\varphi_{ota,1}$ is the inverse of the phase of the second data beam BEAM2 signal transmitted by the antenna of first individual FE 1034A. Equation (2a) and Equation (2b) above illustrate a substitution for $\varphi_{ota,1}$ that can be used to simplify the expression for $\varphi_{obs1,b1\rightarrow b2}$ of Equation (19).

Substituting Equation (2b) into Equation (19) yields Equation (20) below:

$$\varphi_{obs1,b1\rightarrow b2} = \varphi_{b1,CM} + \varphi_{C,1\rightarrow 2} - \varphi_{b2,CM} \quad (20)$$

As illustrated, a through path component of the first cross-coupled first data beam BEAM1 component 1009 and a through path component of the second data beam BEAM2 1005 can be input to the phase shifter 855 where a phase shift of 180 degrees (180°) is applied in the configuration 1000 of FIG. 10A. For the purposes of illustration, a phase shifted through path component of the first cross-coupled first data beam BEAM1 component 1011 and phase shifted through path component of the second data beam BEAM2 1007 are illustrated with different line patterns at the output of the phase shifter 855 of first individual FE 1034A to illustrate the difference in phase.

As illustrated, the first data beam BEAM1 can experience a phase shift $\varphi_{thru}$ along routing traces between the first individual FE 1034A and the second individual FE 1034B. Similarly, second data beam BEAM2 can experience a phase shift $\varphi_{thru}$ along routing traces between the first individual FE 1034A and the second individual FE 1034B.

As illustrated in FIG. 10A, in the first data beam BEAM1 signal path, AP component of the first data beam BEAM1 signal 1002 can be phase shifted by a phase shifter 1084 of the second individual FE 1034B with a phase shift corresponding to the first data beam BEAM1 steering angle. A through path component of the first data beam BEAM1 1003 can be input into the phase shifter 857 where no phase shift is applied in the configuration 1000 of FIG. 10A.

As shown in FIG. 10A, the second individual FE 1034B can receive the second data beam BEAM2. As illustrated, the through path component of the first data beam BEAM1 1003 can couple to the second data beam BEAM2 signal path with a cross-coupling parameter 1010 having a complex coupling value $C_{1\rightarrow 2}$. In some cases, the cross-coupling parameter 1010 can correspond to second through path B2B cross-coupling parameter 858 of FIG. 8B for second individual FE 834B of FIG. 8A. A second cross-coupled first data beam BEAM1 component 1012 can be combined (e.g., summed in voltage) with phase shifted through path component of the second data beam BEAM2 1007 and the through path component of the first cross-coupled first data beam BEAM1 component 1009 as illustrated by summation block 1050 of second individual FE 1034B.

In the illustrated example, the second cross-coupled first data beam BEAM1 component 1012 and through path component of the first cross-coupled first data beam BEAM1 component 1009 are shown to cancel one another as the through path component of the first cross-coupled first data beam BEAM1 component 1009 can be 180 degrees (180°) out of phase with the second cross-coupled first data beam BEAM1 component 1012. Accordingly, the first data beam BEAM1 power transmitted by the second individual FE 1034B can be significantly less than the amount of first data beam BEAM1 power transmitted by the first individual FE 1034A. For example, in the case of a perfect cancellation of the through path component of the first cross-coupled first data beam BEAM1 component 1009 and second cross-coupled first data beam BEAM1 component 1012, no first data beam BEAM1 power would be transmitted by the second individual FE 1034B. However, in some practical implementations, perfect cancellation may not be possible. For example, the cross-coupling parameter 1006 for the first individual FE 1034A (e.g., second cross-coupling parameter 848 of FIG. 8B) may be smaller than the cross-coupling parameter 1010 (e.g., second through path B2B cross-coupling parameter 858 of FIG. 8B), frequency dependent phase shift values may not be fully compensated, or the like. As illustrated, phase shifted through path component of the second data beam BEAM2 1013 can be input to the phase shifter 859 where a 180 degrees (180°) phase shift is applied in the configuration 1000 of FIG. 10A. As illustrated, the resulting through path component of the second data beam BEAM2 1014 output by the phase shifter 859 of second individual FE 1034B can have an identical phase to the through path component of the second data beam BEAM2 1005 as indicated by identical line patterns in FIG. 10A.

An AP component of the second data beam BEAM2 1024 can be phase shifted by a phase shifter 1087 of second individual FE 1034B with a phase shift corresponding to the second data beam BEAM2 steering angle. In some cases, the phase shift applied by the phase shifter 1087 can include compensation for the 180 degrees (180°) phase shift induced in the phase shifted through path component of the second data beam BEAM2 1007 by the phase shifter 855 of first individual FE 1034A.

As illustrated, the first data beam BEAM1 can experience a phase shift $\varphi_{thru}$ along routing traces between the second individual FE 1034B and the third individual FE 1034C. Similarly, second data beam BEAM2 can experience a phase shift $\varphi_{thru}$ along routing traces between the second individual FE 1034B and the third individual FE 1034C.

As noted above, in the case of perfect through path B2B coupling cancellation, there will not be any component of first data beam BEAM1 observed at the second data beam BEAM2 steering angle transmitted by the second individual FE 1034B as shown in Equation (21) below:

$$\varphi_{obs2,b1\to b2} = \text{canceled} \tag{21}$$

As illustrated in FIG. 10A, in the first data beam BEAM1 signal path, AP component of the first data beam BEAM1 signal 1002 can be phase shifted by a phase shifter 1084 of the third individual FE 1034C with a phase shift corresponding to the first data beam BEAM1 steering angle. A through path component of the first data beam BEAM1 1003 can be input into the phase shifter 861 where no phase shift is applied in the configuration 1000 of FIG. 10A.

As illustrated, the through path component of the first data beam BEAM1 1003 can couple to the second data beam BEAM2 signal path with a cross-coupling parameter 1016 having a complex coupling value. In some cases, the cross-coupling parameter 1016 can correspond to second through path B2B cross-coupling parameter 858 of FIG. 8B for third individual FE 834C of FIG. 8A.

In some cases, a second RF port of the third individual FE 1034C can receive the through path component of the second data beam BEAM2 1014. A third cross-coupled first data beam BEAM1 component 1018 can be combined (e.g., summed in voltage) with through path component of the second data beam BEAM2 1014 as illustrated by summation block 1050 of third individual FE 1034C. In some cases, third cross-coupled first data beam BEAM1 component 1018 and an AP component of the second data beam BEAM2 1044 can be phase shifted by a phase shifter 1089 of third individual FE 1034C with a phase shift corresponding to a second data beam BEAM2 steering angle. In some implementations, the first data beam BEAM1 and the second data beam BEAM2 can be transmitted simultaneously with different steering angles.

Accordingly, the amount of first data beam BEAM1 power transmitted by the third individual FE 1034C can be equal to the amount of first data beam BEAM1 power transmitted by the first individual FE 1034A. As illustrated, through path component of the second data beam BEAM2 1045 and through path component of third cross-coupled first data beam BEAM1 component 1019 can be input to the phase shifter 859 where a phase shift of 180 degrees (180°) is applied in the configuration 1000 of FIG. 10A. In some cases, second data beam BEAM2 can be coupled to an additional individual FE of a serially fed FE network or the RF serial ports of third individual FE 1034C can be terminated if third individual FE 1034C is the final individual FE of a serially fed FE network 1034 as illustrated in FIG. 10A.

Equation (22) below illustrates the phase of a component of first data beam BEAM1 observed at the second data beam BEAM2 steering angle transmitted by the third individual FE 1034C corresponding to the third cross-coupled first data beam BEAM1 component 1018 resulting from the cross-coupling parameter 1016 associated with third individual FE 1034C:

$$\varphi_{obs3,b1\to b2} = \varphi_{b1,CM} + 2\varphi_{thru} + \varphi_{C,1\to 2} + \varphi_{b2,3} + \varphi_{ota,3} \tag{22}$$

The phase $\varphi_{obs3,b1\to b2}$ can be identical to the phase of the $\varphi_{obs3,b1\to b2}[3]$ for the configuration 900 of FIG. 9A as shown in Equation (8c) above.

Equation (23a) and Equation (23b) below illustrate a substitution for $\varphi_{ota,3}$ that can be used to simplify the expression for $\varphi_{obs3,b1\to b2}$:

$$\varphi_{ant3,b2} = \varphi_{b2,CM} + 2\varphi_{thru} + 180° + 180° + \varphi_{b2,3} = -\varphi_{ota,3} \tag{23a}$$

$$\varphi_{b2,3} + \varphi_{ota,3} = -(\varphi_{b2,CM} + 2\varphi_{thru}) \tag{23b}$$

Substituting equation (23b) into equation (22) yields a simplified expression for $\varphi_{obs3,b1\to b2}$ as illustrated in Equation (24) below:

$$\varphi_{obs3,b1\to b2} = \varphi_{b1,CM} + \varphi_{C,1\to 2} - \varphi_{b2,CM} \tag{24}$$

Notably, the phase $\varphi_{obs3,b1\to b2}$ is identical to the phase $\varphi_{obs1,b1\to b2}$ as illustrated in Equation (25) below:

$$\varphi_{obs1,b1\to b2} = \varphi_{obs3,b1\to b2} \tag{25}$$

Using the phases calculated above from Equation (19) through Equation (25), voltages associated with first data beam BEAM1 observed at second data beam BEAM2 steering angle can be calculated.

Equation (26) below illustrates the voltage $V_{obs1,b1\to b2}$ associated with first data beam BEAM1 observed at second data beam BEAM2 steering angle transmitted by first individual FE 934A:

$$V_{obs1,b1\to b2}=|C_{1\to 2}|e^{j\varphi_{obs1,b1\to b2}} \quad (26)$$

Equation (27) below illustrates the voltage $V_{obs2,b1\to b2}$ associated with first data beam BEAM1 observed at second data beam BEAM2 steering angle, which has been canceled as described above:

$$V_{obs2,b1\to b2}=0 \quad (27)$$

Substitutions based on an assumption that the magnitude of cross-coupling parameters 1006 and 1016 are equal to an identical value $C_{1\to 2}$ can be used to determine the voltage $V_{obs3,b1\to b2}$ associated with the first data beam BEAM1 observed at the second data beam BEAM2 steering angle transmitted by third individual FE 1034C. By further substituting the equivalent phases as shown in the Equation (25), Equation (28) below illustrates $V_{obs3,b1\to b2}$:

$$V_{obs3,b1\to b2}=|C_{1\to 2}|e^{j\varphi_{obs3,b1\to b2}}=|C_{1\to 2}|e^{j\varphi_{obs1,b1\to b2}} \quad (28)$$

Equation (29) below illustrates the magnitude of the sum of the voltages from Equation (26), Equation (27), and Equation (28) above to illustrate the total voltage magnitude associated with first data beam BEAM1 observed at second data beam BEAM2 steering angle transmitted by the three individual FEs 1034A, 1034B, 1034C:

$$|V_{obs,\Sigma b1\to b2}|=2|C_{1\to 2}| \quad (29)$$

Equation (30) below illustrates the effective coupling magnitude for the serially fed FE network 1034 which is equal to the total voltage magnitude shown in Equation (29) divided by the number of paths (e.g., one for each of the three individual FEs 1034A, 1034B, 1034C):

$$\text{Effective } B1\to B2|\text{Coupling}|=\frac{|V_{obs,\Sigma,b1\to b2}|}{\sum \text{paths}}=\frac{2}{3}|C_{1\to 2}| \quad (30)$$

Accordingly, by performing through path B2B coupling cancellation as illustrated in configuration 1000 of FIG. 10A, the total first data beam BEAM1 power observed at second data beam BEAM2 steering angle can be reduced.

As should be understood by a person skilled in the art, the non-alternating phase shifts illustrated in FIG. 10A can be applied to serially fed FE networks including two individual FEs or serially fed FE networks including four or more individual FEs. For example, a fourth FE added to the serially fed FE network of FIG. 10A could cancel the through path component of third cross-coupled first data beam BEAM1 component 1019 in a similar fashion to the cancellation at the summation block 1050 of the second individual FE 1034B in FIG. 10A.

FIG. 10B illustrates a plot 1070 of first data beam BEAM1 radiation patterns (e.g., gain) in the steering direction of the first data beam BEAM1 and in the steering direction of second data beam BEAM2 for the example configuration 1000 of FIG. 10A. As illustrated in FIG. 10B, first data beam BEAM1 gain in a region 1052 around the first data beam BEAM1 steering angle includes a main lobe 1054 and side lobes 1056. Similarly, first data beam BEAM1 gain in a region 1058 around the second data beam BEAM2 steering angle includes a peak value 1060 that is approximately −35 dBc relative to the peak gain of the main lobe 1054. In addition, the total first data beam BEAM1 energy within the region 1058 around the second data beam BEAM2 is significantly reduced relative to the region 958 around the second data beam BEAM2 of FIG. 9B.

As illustrated by FIG. 10A and FIG. 10B, the use of phase shifts for through path B2B coupling cancellation can reduce power from one beam (e.g., first data beam BEAM1) that is transmitted in the steering direction of the other beam (e.g., second data beam BEAM2).

FIG. 11A illustrates an example configuration 1100 illustrating B2B coupling with alternating application of phase shifts for providing through path B2B coupling cancellation. The configuration 1100 of FIG. 11A illustrates three individual FEs 1134A, 1134B, 1134C that can be included in a serially fed FE network 1134. In some cases, the serially fed FE network 1134 can correspond to serially fed FE networks 432, 434 of FIG. 4A and FIG. 4C.

In the illustrated example of FIG. 11A, each of the three individual FEs 1134A, 1134B, 1134C can include one or more signal conditioning components for applying a phase shift and/or gain to the first data beam BEAM1 before outputting the first data beam BEAM1 from a first RF serial port to a first RF port of a subsequent FE of the serially fed FE network 1134. In the example of FIG. 11A, the one or more signal conditioning components for applying a phase shift and/or gain to the first data beam BEAM1 can include phase shifter 853 for the first individual FE 1134A, phase shifter 857 for the second individual FE 1134B, and phase shifter 861 for the third individual FE 1134C.

In the illustrated example of FIG. 11A, each of the three individual FEs 1134A, 1134B, 1134C can include one or more signal conditioning components for applying a phase shift and/or gain to the second data beam BEAM2 before outputting the second data beam BEAM2 from a second RF serial port to a second RF port of a subsequent FE of the serially fed FE network 1134. In the example of FIG. 11A, the one or more signal conditioning components for applying a phase shift and/or gain to the second data beam BEAM2 can include phase shifter 855 for the first individual FE 1134A, phase shifter 859 for the second individual FE 1134B, and phase shifter 863 for the third individual FE 1134C.

As shown in FIG. 11A, the phase shifter 857 of second individual FE 1134B for the first data beam BEAM1, the phase shifter 855 of first individual FE 1134A for second data beam BEAM2 and phase shifter 863 of third individual FE 1134C for second data beam BEAM2 do not apply any phase shifts.

In the illustrated example of FIG. 11A, the phase shifters phase shifter 853 for the first data beam BEAM1 853 of first individual FE 1134A and phase shifter 861 for the third individual FE 1134C apply a 180 degrees (180°) phase shift to the first data beam BEAM1. Similarly, the phase shifter 859 for the second individual FE 1134B applies a 180 degrees (180°) phase shift to the second data beam BEAM2. Collectively, the phase shifts applied by phase shifters 853, 855, 857, 859, 861, and 863 can be used to perform through path B2B coupling cancellation.

In the illustrated example, first RF port 1101 of the first individual FE 1134A can receive a first data beam BEAM1. As illustrated in FIG. 11A, an AP component of the first data beam BEAM1 signal 1102 can be phase shifted by a phase shifter 1184 of the first individual FE 1134A with a phase shift corresponding to a first data beam BEAM1 steering angle. A through path component of the first data beam BEAM1 1103 can be input into the phase shifter 853 where a 180 degrees (180°) phase shift is applied to through path component of the first data beam BEAM1 1103 in the configuration 1100 of FIG. 11A. For the purposes of illustration, a phase shifted through path component of the first data beam BEAM1 is illustrated with different line patterns at the output of the phase shifter 853 of first individual FE 1134A to illustrate the difference in phase. As illustrated the phase shifted through path component of the first data beam BEAM1 is received by the second individual FE 1134B and divided (e.g., by a distribution/combination network 685 of FIG. 6) into an AP phase shifted through path component of the first data beam BEAM1 1122 and a through path phase shifted component of the first data beam BEAM1 1123.

A second RF port 1111 of the first individual FE 1134A can receive a second data beam BEAM2. As illustrated, the first data beam BEAM1 can couple to the second data beam BEAM2 signal path with a cross-coupling parameter 1106 having a complex coupling value $C_{1\rightarrow 2}$. In some cases, the cross-coupling parameter 1106 can correspond to second cross-coupling parameter 848 of FIG. 8B. A first cross-coupled first data beam BEAM1 component 1108 can be combined (e.g., summed in voltage) with second data beam BEAM2 as illustrated by summation block 1150 of first individual FE 1134A.

In some cases, first cross-coupled first data beam BEAM1 component 1108 and an AP component of the second data beam BEAM2 1104 can be phase shifted by a phase shifter 1185 of first individual FE 1134A with a phase shift corresponding to a second data beam BEAM2 steering angle. In some implementations, the first data beam BEAM1 and the second data beam BEAM2 can be transmitted simultaneously with different steering angles.

Equation (31) below illustrates a phase $\varphi_{obs1,b1\rightarrow b2}=\varphi_{b1,CM}$ of the first cross-coupled first data beam BEAM1 component 1108 transmitted from the first individual FE 1134A and observed at the second data beam BEAM2 steering angle:

$$\varphi_{obs1,b1\rightarrow b2}=\varphi_{b1,CM}+\varphi_{C,1\rightarrow 2}+\varphi_{b2,1}+\varphi_{ota,1} \tag{31}$$

Where $\varphi_{b1,CM}$ is the common mode phase shift for first data beam BEAM1 (e.g., phase of first data beam BEAM1 at the first RF port 1101), $\varphi_{C,1\rightarrow 2}$ is the phase shift associated with cross-coupling parameter 1106, $\varphi_{b2,1}$ is the phase shift applied by the phase shifter 1185 of first individual FE 1134A corresponding to the second data beam BEAM2 steering angle, and $\varphi_{ota,1}$ is the inverse of the phase of the second data beam BEAM2 signal transmitted by the antenna of first individual FE 1134A. Equation (2a) and Equation (2b) above illustrate a substitution for $\varphi_{ota,1}$ that can be used to simplify the expression for $\varphi_{obs1,b1\rightarrow b2}$ of Equation (31).

Substituting Equation (2b) into Equation (31) yields Equation (32) below:

$$\varphi_{obs1,b1\rightarrow b2}=\varphi_{b1,CM}+\varphi_{C,1\rightarrow 2}-\varphi_{b2,CM} \tag{32}$$

As illustrated, a through path component of the first cross-coupled first data beam BEAM1 component 1109 and a through path component of the second data beam BEAM2 1105 can be input to the phase shifter 855 where no phase shift is applied in the configuration 1100 of FIG. 11A.

As illustrated, the first data beam BEAM1 can experience a phase shift $\varphi_{thru}$ along routing traces between the first individual FE 1134A and the second individual FE 1134B. Similarly, second data beam BEAM2 can experience a phase shift $\varphi_{thru}$ along routing traces between the first individual FE 1134A and the second individual FE 1134B.

As illustrated in FIG. 11A, in the first data beam BEAM1 signal path, AP phase shifted through path component of the first data beam BEAM1 1122 can be phase shifted by a phase shifter 1186 of the second individual FE 1134B with a phase shift corresponding to the first data beam BEAM1 steering angle. In some cases, the phase shift applied by the phase shifter 1186 can include compensation for the 180 degrees (180°) phase shift induced in the through path phase shifted component of the first data beam BEAM1 1113 by the phase shifter 853 of first individual FE 1134A. A through path phase shifted component of the first data beam BEAM1 1123 can be input into the phase shifter 857 where no phase shift is applied in the configuration 1100 of FIG. 11A.

As shown in FIG. 11A, the second individual FE 1134B can receive the second data beam BEAM2. As illustrated, the through path component of the first data beam BEAM1 1103 can couple to the second data beam BEAM2 signal path with a cross-coupling parameter 1110 having a complex coupling value $C_{1\rightarrow 2}$. In some cases, the cross-coupling parameter 1110 can correspond to second through path B2B cross-coupling parameter 858 of FIG. 8B for second individual FE 834B of FIG. 8A. A second cross-coupled first data beam BEAM1 component 1112 can be combined (e.g., summed in voltage) with through path component of the second data beam BEAM2 1105 and the through path component of the first cross-coupled first data beam BEAM1 component 1109 as illustrated by summation block 1150 of second individual FE 1134B.

In the illustrated example, the second cross-coupled first data beam BEAM1 component 1112 and through path component of the first cross-coupled first data beam BEAM1 component 1109 are shown to cancel one another as the through path component of the first cross-coupled first data beam BEAM1 component 1109 can be 180 degrees (180°) out of phase with the second cross-coupled first data beam BEAM1 component 1112. Accordingly, the first data beam BEAM1 power transmitted by the second individual FE 1134B can be significantly less than the amount of first data beam BEAM1 power transmitted by the first individual FE 1134A. For example, in the case of a perfect cancellation of the through path component of the first cross-coupled first data beam BEAM1 component 1109 and second cross-coupled first data beam BEAM1 component 1112, no first data beam BEAM1 power would be transmitted by the second individual FE 1134B. However, in some practical implementations, perfect cancellation may not be possible. For example, the cross-coupling parameter 1106 for the first individual FE 1134A (e.g., second cross-coupling parameter 848 of FIG. 8B) may be smaller than the cross-coupling parameter 1110 (e.g., second through path B2B cross-coupling parameter 858 of FIG. 8B), frequency dependent phase shift values may not be fully compensated, or the like. As illustrated, through path component of the second data beam BEAM2 1115 can be input to the phase shifter 859 where a 180 degrees (180°) phase shift is applied in the configuration 1100 of FIG. 11A. As illustrated, the resulting phase shifted through path component of the second data beam BEAM2 1125 output by the phase shifter 859 of second individual FE

1134B can have a 180 degrees (180°) phase shift relative to the through path component of the second data beam BEAM2 1115 as indicated by different line patterns in FIG. 11A.

An AP component of the second data beam BEAM2 1124 can be phase shifted by a phase shifter 1187 of second individual FE 1134B with a phase shift corresponding to the second data beam BEAM2 steering angle.

As illustrated, the first data beam BEAM1 can experience a phase shift $\phi_{THRU}$ along routing traces between the second individual FE 1134B and the third individual FE 1134C. Similarly, second data beam BEAM2 can experience a phase shift $\phi_{THRU}$ along routing traces between the second individual FE 1134B and the third individual FE 1134C.

As noted above, in the case of perfect through path B2B coupling cancellation, there will not be any component of first data beam BEAM1 observed at the second data beam BEAM2 steering angle transmitted by the second individual FE 1134B as shown in Equation (33) below:

$$\varphi_{obs2,b1\to b2} = \text{canceled} \tag{33}$$

As illustrated in FIG. 11A, in the first data beam BEAM1 signal path, AP component of the first data beam BEAM1 signal 1142 can be phase shifted by a phase shifter 1188 of the third individual FE 1134C with a phase shift corresponding to the first data beam BEAM1 steering angle. In some cases, the phase shift applied by the phase shifter 1188 can include compensation for the 180 degrees (180°) phase shift induced in the through path phase shifted component of the first data beam BEAM1 1123 by the phase shifter 853 of first individual FE 1134A. A through path component of the first data beam BEAM1 1143 can be input into the phase shifter 861 where a 180 degrees (180°) phase shift is applied in the configuration 1100 of FIG. 11A. In some cases, first data beam BEAM1 can be coupled to an additional individual FE of a serially fed FE network or the RF serial ports of third individual FE 1134C can be terminated if third individual FE 1134C is the final individual FE of a serially fed FE network 1134 as illustrated in FIG. 11A.

As illustrated, the through path phase shifted component of the first data beam BEAM1 1123 can couple to the second data beam BEAM2 signal path with a cross-coupling parameter 1116 having a complex coupling value $C_{1\to 2}$. In some cases, the cross-coupling parameter 1116 can correspond to second through path B2B cross-coupling parameter 858 of FIG. 8B for third individual FE 834C of FIG. 8A.

In some cases, a second RF port of the third individual FE 1134C can receive the phase shifted through path component of the second data beam BEAM2 1125. A third cross-coupled first data beam BEAM1 component 1118 can be combined (e.g., summed in voltage) with phase shifted through path component of the second data beam BEAM2 1125 as illustrated by summation block 1150 of third individual FE 1134C. In some cases, third cross-coupled first data beam BEAM1 component 1118 and an AP component of the phase shifted second data beam BEAM2 1144 can be phase shifted by a phase shifter 1189 of third individual FE 1134C with a phase shift corresponding to a second data beam BEAM2 steering angle. In some implementations, the first data beam BEAM1 and the second data beam BEAM2 can be transmitted simultaneously with different steering angles.

Accordingly, the amount of first data beam BEAM1 power transmitted by the third individual FE 1134C can be equal to the amount of first data beam BEAM1 power transmitted by the first individual FE 1134A. As illustrated, through path component of the phase shifted second data beam BEAM2 1147 and through path component of third cross-coupled first data beam BEAM1 component 1119 can be input to the phase shifter 859 where a phase shift of 180 degrees (180°) is applied in the configuration 1100 of FIG. 11A. In some cases, second data beam BEAM2 can be coupled to an additional individual FE of a serially fed FE network or the RF serial ports of third individual FE 1134C can be terminated if third individual FE 1134C is the final individual FE of a serially fed FE network 1134 as illustrated in FIG. 11A.

Equation (34) below illustrates the phase $\varphi_{obs3,b1\to b2}$ of a component of first data beam BEAM1 observed at the second data beam BEAM2 steering angle transmitted by the third individual FE 1134C corresponding to the third cross-coupled first data beam BEAM1 component 1118 resulting from the cross-coupling parameter 1116 associated with third individual FE 1134C:

$$\varphi_{obs3,b1\to b2} = \varphi_{b1,CM} + 180° + 2\varphi_{thru} + \varphi_{C,1\to 2} + \varphi_{b2,3} + \varphi_{ota,3} \tag{34}$$

The phase $\varphi_{obs3,b1\to b2}$ can be identical to the phase of the $\varphi_{obs3,b1\to b2}[3]$ for the configuration 900 of FIG. 9A as shown in Equation (8c) above.

Equation (35a) and Equation (35b) below illustrate a substitution for $\varphi_{ota,3}$ that can be used to simplify the expression for $\varphi_{obs3,b1\to b2}$:

$$\varphi_{ant3,b2} = \varphi_{b2,CM} + 2\varphi_{thru} + 180° + \varphi_{b2,3} = -\varphi_{ota,3} \tag{35a}$$

$$180° + \varphi_{b2,3} + \varphi_{ota,3} = -\varphi_{b2,CM} - 2\varphi_{thru} \tag{35b}$$

Substituting equation (35b) into equation (34) yields a simplified expression for $\varphi_{obs3,b1\to b2}$ as illustrated in Equation (36) below:

$$\varphi_{obs3,b1\to b2} = \varphi_{b1,CM} + \varphi_{C,1\to 2} - \varphi_{b2,CM} \tag{36}$$

Notably, the phase $\varphi_{obs3,b1\to b2}$ is identical to the phase $\varphi_{obs3,b1\to b2}$ as illustrated in Equation (37) below:

$$\varphi_{obs1,b1\to b2} = \varphi_{obs3,b1\to b2} \tag{37}$$

Using the phases calculated above from Equation (31) through Equation (37), voltages associated with first data beam BEAM1 observed at second data beam BEAM2 steering angle can be calculated.

Equation (38) below illustrates the voltage $V_{obs1,b1\to b2}$ associated with first data beam BEAM1 observed at second data beam BEAM2 steering angle transmitted by first individual FE 934A:

$$V_{obs1,b1\to b2} = |C_{1\to 2}|e^{j\varphi_{obs1,b1\to b2}} \tag{38}$$

Equation (39) below illustrates the voltage $V_{obs2,b1\rightarrow b2}$ associated with first data beam BEAM1 observed at second data beam BEAM2 steering angle, which has been canceled as described above:

$$V_{obs2,b1\rightarrow b2}=0 \tag{39}$$

Substitutions based on an assumption that the magnitude of cross-coupling parameters 1106 and 1116 are equal to an identical value $C_{1\rightarrow 2}$ can be used to determine the voltage $V_{obs3,b1\rightarrow b2}$ associated with the first data beam BEAM1 observed at the second data beam BEAM2 steering angle transmitted by third individual FE 1134C. By further substituting the equivalent phases as shown in the Equation (37), Equation (40) below illustrates $V_{obs3,b1\rightarrow b2}$:

$$V_{obs3,b1\rightarrow b2}=|C_{1\rightarrow 2}|e^{j\varphi_{obs3,b1\rightarrow b2}}=|C_{1\rightarrow 2}|e^{j\varphi_{obs1,b1\rightarrow b2}} \tag{40}$$

Equation (41) below illustrates the magnitude of the sum of the voltages from Equation (38), Equation (39), and Equation (40) above to illustrate the total voltage magnitude associated with first data beam BEAM1 observed at second data beam BEAM2 steering angle transmitted by the three individual FEs 1134A, 1134B, 1134C:

$$|V_{obs,\sum b1\rightarrow b2}|=2|C_{1\rightarrow 2}| \tag{41}$$

Equation (42) below illustrates the effective coupling magnitude for the serially fed FE network 1134 which is equal to the total voltage magnitude shown in Equation (41) divided by the number of paths (e.g., one for each of the three individual FEs 1134A, 1134B, 1134C):

$$\text{Effective } B1\rightarrow B2|\text{Coupling}|=\frac{|V_{obs,\sum b1\rightarrow b2}|}{\sum \text{paths}}=\frac{2}{3}|C_{1\rightarrow 2}| \tag{42}$$

Accordingly, by performing through path B2B coupling cancellation as illustrated in configuration 1100 of FIG. 11A, the total first data beam BEAM1 power observed at second data beam BEAM2 steering angle can be reduced.

As should be understood by a person skilled in the art, the non-alternating phase shifts illustrated in FIG. 11A can be applied to serially fed FE networks including two individual FEs or serially fed FE networks including four or more individual FEs. For example, a fourth FE added to the serially fed FE network of FIG. 11A could cancel the through path component of third cross-coupled first data beam BEAM1 component 1119 in a similar fashion to the cancellation at the summation block 1150 of the second individual FE 1134B in FIG. 11A.

FIG. 11B illustrates a plot 1170 of first data beam BEAM1 radiation patterns (e.g., gain) in the steering direction of the first data beam BEAM1 and in the steering direction of second data beam BEAM2 for the example configuration 1100 of FIG. 11A. As illustrated in FIG. 11B, first data beam BEAM1 gain in a region 1152 around the first data beam BEAM1 steering angle includes a main lobe 1154 and side lobes 1156. Similarly, first data beam BEAM1 gain in a region 1158 around the second data beam BEAM2 steering angle includes a peak value 1160 that is approximately −35 dBc relative to the peak gain of the main lobe 1154. In addition, the total first data beam BEAM1 energy within the region 1158 around the second data beam BEAM2 is significantly reduced relative to the region 958 around the second data beam BEAM2 of FIG. 9B.

As illustrated by FIG. 9A through FIG. 11B, the use of phase shifts for through path B2B coupling cancellation can reduce power from one beam (e.g., first data beam BEAM1) that is transmitted in the steering direction of the other beam (e.g., second data beam BEAM2).

While the examples of FIG. 9A through FIG. 11B illustrate serially fed FE networks 934, 1034, 1134, respectively, that each include three individual FEs, it should be understood that serially fed FE networks including two individual FEs or four or more individual FEs can perform through path B2B coupling cancellation using the systems and techniques described herein without departing from the scope of the present disclosure.

In addition, while each of the individual FEs of the serially fed FE networks 934, 1034, 1134 of FIG. 9A through FIG. 11B are shown with a single antenna element, it should be understood that serially fed FE networks with individual FEs coupled to two or more antenna elements (e.g., individual FE 692R of FIG. 6) can be used without departing from the scope of the present disclosure.

It should also be understood that while the examples of FIG. 9A through FIG. 11B illustrate serially fed FE networks 934, 1034, 1134 configured for transmitting signals, the through path B2B coupling cancellation systems and techniques described herein can be utilized with serially fed FE networks configured for receiving signals. For example, without limitation, through path B2B coupling can be performed in a transmit only phased array antenna system, a receive only phased array antenna system, a transmit and receive phased array antenna system, a half duplex phased array antenna system, a full duplex phased array antenna system, and/or any other system including serially fed FE networks. AP BEAM-TO-BEAM (B2B) COUPLING CANCELLATION FIG. 12A illustrates a simplified diagram 1200 of an example individual FE 1292R that can be utilized to perform AP B2B coupling cancellation in a serially fed FE network (e.g., serially fed FE networks 432, 434 of FIG. 4B and FIG. 4C). The simplified diagram 1200 illustrates the individual FE 1292R in a transmit (Tx) configuration. In the illustrated example of FIG. 12A, the individual FE 1292R can include a first RF port 1201 for receiving first data beam BEAM1 and a second RF port 1211 for receiving second data beam BEAM2. In the illustrated example of FIG. 12A, an AP for the first data beam BEAM1 can include a PA 1284 and a phase shifter 1283. Similarly, an AP for the second data beam BEAM2 can include a PA 1284 and a phase shifter 1283. As illustrated, a summation block 1260 (e.g., a Wilkinson combiner/divider) can combine the first data beam BEAM1 component from the AP for first data beam BEAM1 and the AP for second data beam BEAM2. In some cases, the output of summation block 1260 can be coupled to antenna element 1214 for transmission OTA. In the illustrated example, the AP for first data beam BEAM1 and AP for second data beam BEAM2 can experience cross-coupling as indicated by the AP B2B coupling block 1250. The individual FE 1292R includes a through path for the first data beam BEAM1 including a phase shifter 1236 that can be used for applying phase shifts for AP B2B coupling cancellation. Similarly, the individual FE 1292R includes a through path for the second data beam BEAM2 including a phase shifter 1238 that can be used for applying phase shifts for AP B2B coupling cancellation.

FIG. 12B illustrates an example coupling model for the AP B2B coupling block 1250 of FIG. 12A. As illustrated in FIG. 12B, the AP B2B coupling of AP B2B coupling block 1250 can include four coupling parameters. As illustrated, the first coupling parameter 1242 can correspond to a coupling parameter $C_{1\rightarrow 1,AP}$, which can represent the coupling for the AP for first data beam BEAM1. Similarly, the second coupling parameter 1244 can correspond to a coupling parameter $C_{2\rightarrow 2,AP}$, which can represent the coupling for the AP for second data beam BEAM2.

As illustrated, a first cross-coupling parameter 1246 can correspond to a cross-coupling parameter $C_{2\rightarrow 1,AP}$, which can represent the coupling of the second data beam BEAM2 into the AP for the first data beam BEAM1. Similarly, a second cross-coupling parameter 1248 can correspond to a cross-coupling parameter $C_{1\rightarrow 2,AP}$, which can represent the coupling of the first data beam BEAM1 into the AP for second data beam BEAM2. As illustrated, a summation block 1251 shows that the signals associated with the first coupling parameter 1242 and first cross-coupling parameter 1246 can be provided to the phase shifter 1283 for the first data beam BEAM1. Similarly, a summation block 1253 illustrates that the signals associated with the second coupling parameter 1244 and the second cross-coupling parameter 1248 can be provided to the phase shifter 1283 for the second data beam BEAM2.

FIG. 12C illustrates a simplified diagram 1270 of an example individual FE 1292R that can be utilized to perform AP B2B coupling cancellation in a serially fed FE network (e.g., serially fed FE networks 432, 434 of FIG. 4B and FIG. 4C). The simplified diagram 1270 illustrates the individual FE 1292R in a receive (Rx) configuration. In the illustrated example of FIG. 12C, the individual FE 1292R can include a first RF serial port 1221 for receiving first data beam BEAM1 and a second RF serial port 1231 for receiving second data beam BEAM2. In the illustrated example of FIG. 12A, an AP for the first data beam BEAM1 can include an LNA 1282 and a phase shifter 1283. Similarly, an AP for the second data beam BEAM2 can include an LNA 1282 and a phase shifter 1283. As illustrated, a distribution block 1261 (e.g., a Wilkinson combiner/divider) can divide a received signal (e.g., received OTA) from the antenna element 1214 to provide a first component of the received signal to the AP for the first data beam BEAM1 and provide a second component of the received signal to the the AP for second data beam BEAM2. In the illustrated example, the AP for first data beam BEAM1 and AP for second data beam BEAM2 can experience cross-coupling as indicated by the AP B2B coupling block 1256. The individual FE 1292R includes a through path for the first data beam BEAM1 including a phase shifter 1237 that can be used for applying phase shifts for AP B2B coupling cancellation. Similarly, the individual FE 1292R includes a through path for the second data beam BEAM2 including a phase shifter 1239 that can be used for applying phase shifts for AP B2B coupling cancellation.

FIG. 12D illustrates an example coupling model for the AP B2B coupling block 1256 of FIG. 12C. As illustrated in FIG. 12D, the AP B2B coupling of AP B2B coupling block 1256 can include four coupling parameters. As illustrated, the first coupling parameter 1243 can correspond to a coupling parameter $C_{1\rightarrow 1,AP}$, which can represent the coupling for the AP for first data beam BEAM1. Similarly, the second coupling parameter 1245 can correspond to a coupling parameter $C_{2\rightarrow 2,AP}$, which can represent the coupling for the AP for second data beam BEAM2.

As illustrated, a first cross-coupling parameter 1247 can correspond to a cross-coupling parameter $C_{2\rightarrow 1,AP}$, which can represent the coupling of the second data beam BEAM2 into the AP for the first data beam BEAM1. Similarly, a second cross-coupling parameter 1249 can correspond to a cross-coupling parameter $C_{1\rightarrow 2,AP}$, which can represent the coupling of the first data beam BEAM1 into the AP for second data beam BEAM2. As illustrated, a summation block 1255 shows that the signals associated with the first coupling parameter 1243 and first cross-coupling parameter 1247 can be provided to the LNA 1282 for the first data beam BEAM1. Similarly, a summation block 1257 illustrates that the signals associated with the second coupling parameter 1245 and the second cross-coupling parameter 1249 can be provided to the LNA 1282 for the second data beam BEAM2.

FIG. 13A illustrates an example configuration 1300 illustrating AP B2B coupling without application of phase shifts for providing AP B2B coupling cancellation. The configuration 1300 of FIG. 13A illustrates two individual FEs 1334A, 1334B that can be included in a serially fed FE network 1334. In some cases, the serially fed FE network 1334 can correspond to serially fed FE networks 432, 434 of FIG. 4A and FIG. 4C. Although FIG. 13A illustrates a serially fed FE network including two individual FEs 1334A, 1334B, it should be understood that the two individual FEs 1334A, 1334B could be part of a longer serially fed FE network without departing from the scope of the present disclosure.

In the illustrated example of FIG. 13A, each of the two individual FEs 1334A, 1334B can include one or more signal conditioning components for applying a phase shift and/or gain to the first data beam BEAM1 before outputting the first data beam BEAM1 from a first RF serial port to a first RF port of a subsequent FE of the serially fed FE network 1334. In the example of FIG. 13A, the one or more signal conditioning components for applying a phase shift and/or gain to the first data beam BEAM1 can include phase shifter 853 for the first individual FE 1334A and phase shifter 857 for the second individual FE 1334B.

In the illustrated example of FIG. 13A, each of the two individual FEs 1334A, 1334B can include one or more signal conditioning components for applying a phase shift and/or gain to the second data beam BEAM2 before outputting the second data beam BEAM2 from a second RF serial port to a second RF port of a subsequent FE of the serially fed FE network 1334. In the example of FIG. 13A, the one or more signal conditioning components for applying a phase shift and/or gain to the second data beam BEAM2 can include phase shifter 855 for the first individual FE 1334A and a phase shifter 859 for the second individual FE 1334B.

In the illustrated example of FIG. 13A, none of the phase shifters 853, 855, 857, 859 apply any phase shift to the first data beam BEAM1 or the second data beam BEAM2 for performing through path B2B coupling cancellation.

In the illustrated example, first RF port 1301 of the first individual FE 1334A can receive a first data beam BEAM1. As illustrated in FIG. 13A, a first AP component of the first data beam BEAM1 1302 can be phase shifted by a phase shifter 1383 of the first individual FE 1334A with a phase shift corresponding to a first data beam BEAM1 steering angle. A through path component of the first data beam BEAM1 1303 can be input into the phase shifter 853 where no phase shift is applied in the configuration 1300 of FIG. 13A.

A second RF port 1311 of the first individual FE 1334A can receive a second data beam BEAM2. As illustrated, an AP component of the first data beam BEAM1 can couple to the AP of second data beam BEAM2 with a cross-coupling parameter 1306 having a complex coupling value $C_{1\rightarrow 2}$. In some cases, the cross-coupling parameter 1306 can correspond to second cross-coupling parameter 848 of FIG. 8B. A first cross-coupled first data beam BEAM1 component 1308 can be combined (e.g., summed in voltage) with an AP component of the second data beam BEAM2 1304.

A first cross-coupled first data beam BEAM1 component 1308 and the AP component of the second data beam BEAM2 1304 can be phase shifted by a phase shifter 1384 of first individual FE 1334A with a phase shift corresponding to a second data beam BEAM2 steering angle. In some implementations, the first data beam BEAM1 and the second data beam BEAM2 can be transmitted simultaneously with different steering angles.

Equation (43) below illustrates a phase $\varphi_{obs1,b1\rightarrow b2}$ of the first cross-coupled first data beam BEAM1 component 1308 from the first individual FE 1334A and observed at the second data beam BEAM2 steering angle:

$$\varphi_{obs1,b1\rightarrow b2}=\varphi_{b1,CM}+\varphi_{C,1\rightarrow 2}+\varphi_{b2,1}+\varphi_{ota,1} \tag{43}$$

In some examples, the $\varphi_{obs1,b1\rightarrow b2}$ of Equation (43) and $\varphi_{obs1,b1\rightarrow b2}$ of Equation (1) show that first data beam BEAM1 energy at the second data beam BEAM2 steering angle due to AP B2B coupling can take the same form. Accordingly, the simplifications of $\varphi_{obs1,b1\rightarrow b2}$ illustrated in Equation (2a) and Equation (2b) can also apply to Equation (43).

Substituting Equation (2b) into Equation (43) yields Equation (44) below:

$$\varphi_{obs1,b1\rightarrow b2}=\varphi_{b1,CM}+\varphi_{C,1\rightarrow 2}-\varphi_{b2,CM} \tag{44}$$

As illustrated, a through path component of the second data beam BEAM2 1305 can be input to the phase shifter 855 where no phase shift is applied in the configuration 1300 of FIG. 13A. As can be seen in FIG. 13A, because the AP B2B coupling occurs outside of the through path, the AP B2B coupling does not propagate to the second individual FE 1334B.

As illustrated, the first data beam BEAM1 can experience a phase shift $\varphi_{thru}$ along routing traces between the first individual FE 1334A and the second individual FE 1334B. Similarly, second data beam BEAM2 can experience a phase shift $\varphi_{thru}$ along routing traces between the first individual FE 1334A and the second individual FE 1334B.

As illustrated in FIG. 13A, the second individual FE 1334B can receive the through path component of the first data beam BEAM1 1303 and the through path component of the second data beam BEAM2 1305 at RF ports of the second individual FE 1334B.

As illustrated in FIG. 13A, in the first data beam BEAM1 signal path, AP component of the first data beam BEAM1 1322 can be phase shifted by a phase shifter 1385 of the second individual FE 1334B with a phase shift corresponding to the first data beam BEAM1 steering angle. A through path component of the first data beam BEAM1 1323 can be input into the phase shifter 857 where no phase shift is applied in the configuration 1300 of FIG. 13A.

As illustrated, an AP component of the first data beam BEAM1 can couple to the AP of second data beam BEAM2 with a cross-coupling parameter 1310 having a complex coupling value $C_{1\rightarrow 2}$. In some cases, the cross-coupling parameter 1310 can correspond to second through path B2B cross-coupling parameter 858 of FIG. 8B. A second cross-coupled first data beam BEAM1 component 1328 can be combined (e.g., summed in voltage) with an AP component of the second data beam BEAM2 1324.

A second cross-coupled first data beam BEAM1 component 1328 and the AP component of the second data beam BEAM2 1324 can be phase shifted by a phase shifter 1386 of second individual FE 1334B with a phase shift corresponding to a second data beam BEAM2 steering angle. In some implementations, the first data beam BEAM1 and the second data beam BEAM2 can be transmitted simultaneously with different steering angles.

Equation (45) below illustrates a phase $\varphi_{obs2,b1\rightarrow b2}$ of the second cross-coupled first data beam BEAM1 component 1328 from the second individual FE 1334B and observed at the second data beam BEAM2 steering angle:

$$\varphi_{obs2,b1\rightarrow b2}=\varphi_{b1,CM}+\varphi_{thru}+\varphi_{C,1\rightarrow 2}+\varphi_{b2,2}+\varphi_{ota,2} \tag{45}$$

In some examples, the $\varphi_{obs2,b1\rightarrow b2}$ of Equation (45) and $\varphi_{obs2,b1\rightarrow b2}[2]$ of Equation (4b) can take the same form. Accordingly, the simplifications of $\varphi_{obs2,b1\rightarrow b2}$ illustrated in Equation (6a) and Equation (6b) can also apply to Equation (45).

Substituting Equation (6b) into Equation (45) yields Equation (46) below:

$$\varphi_{obs2,b1\rightarrow b2}=\varphi_{C,1\rightarrow 2}+\varphi_{b1,CM}-\varphi_{b2,CM} \tag{46}$$

As illustrated, a through path component of the second data beam BEAM2 1325 can be input to the phase shifter 859 where no phase shift is applied in the configuration 1300 of FIG. 13A. As can be seen in FIG. 13A, because the AP B2B coupling occurs outside of the through path, the AP B2B coupling does not propagate to the RF serial port of the second individual FE 1334B.

Equation (47) below illustrates a voltage of the first data beam BEAM1 energy transmitted by the first individual FE 1334A:

$$V_{obs1,b1\rightarrow b2}=|C_{1\rightarrow 2}|e^{j\varphi_{obs1,b1\rightarrow b2}} \tag{47}$$

Similarly, Equation (48) below illustrates a voltage of the first data beam BEAM1 energy transmitted by the second individual FE 1334B:

$$V_{obs2,b1\rightarrow b2}=|C_{1\rightarrow 2}|e^{j\varphi_{obs2,b1\rightarrow b2}}=|C_{1\rightarrow 2}|e^{j\varphi_{obs1,b1\rightarrow b2}} \tag{48}$$

The total voltage of first data beam BEAM1 observed at the second data beam BEAM2 steering angle due to AP B2B coupling is shown in Equation (49a) below:

$$V_{obs,b1\rightarrow b2} + V_{obs2,b1\rightarrow b2} = 2|C_{1\rightarrow 2}| \tag{49a}$$

Applying Equation (18) above, the effective power of first data beam BEAM1 observed at the second data beam BEAM2 steering angle due to AP B2B coupling is shown in Equation (49b) below:

$$\text{Effective } B1 \rightarrow B2|\text{Coupling}| = |C_{1\rightarrow 2}| \tag{49b}$$

FIG. 13B illustrates a plot 1370 of first data beam BEAM1 radiation patterns (e.g., gain) in the steering direction of the first data beam BEAM1 and in the steering direction of second data beam BEAM2 for the example configuration 1300 of FIG. 13A. As illustrated in FIG. 13B, first data beam BEAM1 gain in a region 1352 around the first data beam BEAM1 steering angle includes a main lobe 1354 and side lobes 1356. Similarly, first data beam BEAM1 gain in a region 1358 around the second data beam BEAM2 steering angle includes a peak value 1360 that is approximately −35 dBc relative to the peak gain of the main lobe 1354. As illustrated by FIG. 13A and FIG. 13B, in the absence of phase shifts for through path B2B coupling cancellation, significant power from one beam (e.g., first data beam BEAM1) can be transmitted in the steering direction of the other beam (e.g., second data beam BEAM2).

As illustrated in FIG. 13B, the first data beam BEAM1 energy in the second data beam BEAM2 steering direction resulting from AP B2B coupling of FIG. 13A (see FIG. 13B) can be lower than the beam1 energy in the second data beam BEAM2 steering direction from through path B2B coupling of FIG. 9A. Such a result can be expected as the effective coupling for the AP B2B coupling of FIG. 13A is shown to be equal to $|C_{1\rightarrow 2}|$ as illustrated by Equation (49) above while the effective coupling for through path B2B coupling of FIG. 9A is shown to be equal to $2|C_{1\rightarrow 2}|$ as illustrated by Equation (18) above.

FIG. 14A illustrates an example configuration 1400 illustrating AP coupling with non-alternating application of phase shifts for providing AP B2B coupling cancellation. The configuration 1400 of FIG. 14A illustrates two individual FEs 1434A, 1434B that can be included in a serially fed FE network 1434. In some cases, the serially fed FE network 1434 can correspond to serially fed FE networks 432, 434 of FIG. 4A and FIG. 4C. Although FIG. 14A illustrates a serially fed FE network including two individual FEs 1434A, 1434B, it should be understood that the two individual FEs 1434A, 1434B could be part of a longer serially fed FE network without departing from the scope of the present disclosure.

In the illustrated example of FIG. 14A, each of the two individual FEs 1434A, 1434B can include one or more signal conditioning components for applying a phase shift and/or gain to the first data beam BEAM1 before outputting the first data beam BEAM1 from a first RF serial port to a first RF port of a subsequent FE of the serially fed FE network 1434. In the example of FIG. 14A, the one or more signal conditioning components for applying a phase shift and/or gain to the first data beam BEAM1 can include phase shifter 853 for the first individual FE 1434A and phase shifter 857 for the second individual FE 1434B.

In the illustrated example of FIG. 14A, each of the two individual FEs 1434A, 1434B can include one or more signal conditioning components for applying a phase shift and/or gain to the second data beam BEAM2 before outputting the second data beam BEAM2 from a second RF serial port to a second RF port of a subsequent FE of the serially fed FE network 1434. In the example of FIG. 14A, the one or more signal conditioning components for applying a phase shift and/or gain to the second data beam BEAM2 can include phase shifter 855 for the first individual FE 1434A and a phase shifter 859 for the second individual FE 1434B.

In the illustrated example of FIG. 14A, neither of the phase shifters for the first data beam BEAM1 853, 857 apply any phase shift to the first data beam BEAM1. However, as shown in FIG. 14A, the phase shifters 855, 859 apply a phase shift of 180 degrees (180°) to through path components of the second data beam BEAM2 as a part of performing AP B2B coupling cancellation.

In the illustrated example, first RF port 1401 of the first individual FE 1434A can receive a first data beam BEAM1. As illustrated in FIG. 14A, a first AP component of the first data beam BEAM1 1402 can be phase shifted by a phase shifter 1483 of the first individual FE 1434A with a phase shift corresponding to a first data beam BEAM1 steering angle. A through path component of the first data beam BEAM1 1403 can be input into the phase shifter 853 where no phase shift is applied in the configuration 1400 of FIG. 14A.

A second RF port 1411 of the first individual FE 1434A can receive a second data beam BEAM2. As illustrated, an AP component of the first data beam BEAM1 can couple to the AP of second data beam BEAM2 with a cross-coupling parameter 1406 having a complex coupling value $C_{1\rightarrow 2}$. In some cases, the cross-coupling parameter 1406 can correspond to second cross-coupling parameter 848 of FIG. 8B. A first cross-coupled first data beam BEAM1 component 1408 can be combined (e.g., summed in voltage) with an AP component of the second data beam BEAM2 1404.

A first cross-coupled first data beam BEAM1 component 1408 and the AP component of the second data beam BEAM2 1404 can be phase shifted by a phase shifter 1484 of first individual FE 1434A with a phase shift corresponding to a second data beam BEAM2 steering angle. In some implementations, the first data beam BEAM1 and the second data beam BEAM2 can be transmitted simultaneously with different steering angles.

Equation (50) below illustrates a phase $\varphi_{obs1,b1\rightarrow b2}$ of the first cross-coupled first data beam BEAM1 component 1408 from the first individual FE 1434A and observed at the second data beam BEAM2 steering angle:

$$\varphi_{obs1,b1\rightarrow b2} = \varphi_{b1,CM} + \varphi_{C,1\rightarrow 2} + \varphi_{b2,1} + \varphi_{ota,1} \tag{50}$$

In some examples, the $\varphi_{obs1,b1\rightarrow b2}$ of Equation (50) and $\varphi_{obs1,b1\rightarrow b2}$ of Equation (1) show that first data beam BEAM1 energy at the second data beam BEAM2 steering angle due to AP B2B coupling can take the same form. Accordingly, the simplifications of $\varphi_{obs1,b1\rightarrow b2}$ illustrated in Equation (2a) and Equation (2b) can also apply to Equation (50).

Substituting Equation (2b) into Equation (50) yields Equation (51) below:

$$\varphi_{obs1,b1\rightarrow b2} = \varphi_{b1,CM} + \varphi_{C,1\rightarrow 2} - \varphi_{b2,CM} \tag{51}$$

As illustrated, a through path component of the second data beam BEAM2 1405 can be input to the phase shifter 855 where 180 degrees (180°) phase shift is applied in the configuration 1400 of FIG. 14A. As can be seen in FIG. 14A, because the AP B2B coupling occurs outside of the through path, the AP B2B coupling does not propagate to the second individual FE 1434B. For the purposes of illustration, a phase shifted through path component of the second data beam BEAM2 1425 is illustrated with a different line pattern at the output of the phase shifter 855 of first individual FE 1434A to illustrate the difference in phase.

As illustrated, the first data beam BEAM1 can experience a phase shift $\varphi_{thru}$ along routing traces between the first individual FE 1434A and the second individual FE 1434B. Similarly, second data beam BEAM2 can experience a phase shift $\varphi_{thru}$ along routing traces between the first individual FE 1434A and the second individual FE 1434B.

As illustrated in FIG. 14A, the second individual FE 1434B can receive the through path component of the first data beam BEAM1 1403 and the through path component of the second data beam BEAM2 1405 at RF ports of the second individual FE 1434B.

As illustrated in FIG. 14A, in the first data beam BEAM1 signal path, AP component of the first data beam BEAM1 1422 can be phase shifted by a phase shifter 1485 of the second individual FE 1434B with a phase shift corresponding to the first data beam BEAM1 steering angle. A through path component of the first data beam BEAM1 1423 can be input into the phase shifter 857 where no phase shift is applied in the configuration 1400 of FIG. 14A.

As illustrated, an AP component of the first data beam BEAM1 can couple to the AP of second data beam BEAM2 with a cross-coupling parameter 1410 having a complex coupling value $C_{1\rightarrow 2}$. In some cases, the cross-coupling parameter 1410 can correspond to second through path B2B cross-coupling parameter 858 of FIG. 8B. A second cross-coupled first data beam BEAM1 component 1428 can be combined (e.g., summed in voltage) with a phase shifted AP component of the second data beam BEAM2 1424.

A second cross-coupled first data beam BEAM1 component 1428 and the AP component of the second data beam BEAM2 1424 can be phase shifted by a phase shifter 1486 of second individual FE 1434B with a phase shift corresponding to a second data beam BEAM2 steering angle. In some cases, the phase shift applied by the phase shifter 1486 of second individual FE 1434B can include compensation for the 180 degrees (180°) phase shift induced in the phase shifted through path component of the second data beam BEAM2 1425 by the phase shifter 855 of first individual FE 1434A. In some implementations, the first data beam BEAM1 and the second data beam BEAM2 can be transmitted simultaneously with different steering angles.

Equation (52) below illustrates a phase $\varphi_{obs2,b1\rightarrow b2}$ of the second cross-coupled first data beam BEAM1 component 1428 from the second individual FE 1434B and observed at the second data beam BEAM2 steering angle:

$$\varphi_{obs2,b1\rightarrow b2} = \varphi_{b1,CM} + \varphi_{thru} + \varphi_{C,1\rightarrow 2} + \varphi_{b2,2} + \varphi_{ota,2} \tag{52}$$

Equation (53a) and Equation (53b) below illustrate a substitution for $\varphi_{ota,2}$ that can be used to simplify the expression for $\varphi_{obs2,b1\rightarrow b2}$:

$$\varphi_{ant2,b2} = \varphi_{b2,CM} + 180^\circ + \varphi_{thru} + \varphi_{b2,2} = -\varphi_{ota,2} \tag{53a}$$

$$\varphi_{b2,2} + \varphi_{ota,2} = -(\varphi_{b2,CM} + 180^\circ + \varphi_{thru}) \tag{53b}$$

Substituting Equation (53b) into Equation (52) yields Equation (54) below:

$$\varphi_{obs2,b1\rightarrow b2} = \varphi_{C,1\rightarrow 2} + \varphi_{b1,CM} - \varphi_{b2,CM} - 180^\circ \tag{54}$$

As illustrated, a through path component of the second data beam BEAM2 1425 can be input to the phase shifter 859 where no phase shift is applied in the configuration 1400 of FIG. 14A. As can be seen in FIG. 14A, because the AP B2B coupling occurs outside of the through path, the AP B2B coupling does not propagate to an RF serial port of the second individual FE 1434B.

Equation (55) below illustrates a voltage of the first data beam BEAM1 energy transmitted by the first individual FE 1434A:

$$V_{obs1,b1\rightarrow b2} = |C_{1\rightarrow 2}|e^{j\varphi_{obs1,b1\rightarrow b2}} \tag{55}$$

Similarly, Equation (56a) and (56b) below illustrate a voltage of the first data beam BEAM1 energy transmitted by the second individual FE 1434B:

$$V_{obs2,b1\rightarrow b2} = |C_{1\rightarrow 2}|e^{j\varphi_{obs2,b1\rightarrow b2}} = |C_{1\rightarrow 2}|e^{-j\pi}e^{j\varphi_{obs2,b1\rightarrow b2}} \tag{56a}$$

$$|C_{1\rightarrow 2}|e^{j\pi}e^{j\varphi_{obs2,b1\rightarrow b2}} = -|C_{1\rightarrow 2}|e^{j\varphi_{obs1,b1\rightarrow b2}} \tag{56b}$$

The total voltage of first data beam BEAM1 observed at the second data beam BEAM2 steering angle due to AP B2B coupling is shown in Equation (57) below:

$$V_{obs,\Sigma,b1\rightarrow b2} = V_{obs,b1\rightarrow b2} + V_{obs2,b1\rightarrow b2} = 0 \tag{57}$$

As illustrated above, the first data beam BEAM1 energy observed at the second data beam BEAM2 steering angle can destructively interfere. In some cases, the cancellation at the second data beam BEAM2 steering angle can incidentally produce a constructive interference at another angle. In some cases, the angle of the constructive interference can be depending on common mode phase, first data beam BEAM1 steering angle, second data beam BEAM2 steering angle, frequency; through path phase, and/or any combination thereof.

As should be understood by a person skilled in the art, the non-alternating phase shifts illustrated in FIG. 14A can be applied to serially fed FE networks including three or more individual FEs. In some cases, serially fed FE networks including an even number of individual FEs can produce destructive interference of the first data beam BEAM1 at the second data beam BEAM2 steering angle. In some cases, serially fed FE networks including an odd number of individual FEs may produce a net signal equal to the first data beam BEAM1 signal provided by a single individual FE in the absence of any coupling cancellation (e.g., first individual FE 1334A or second individual FE 1334B of FIG. 13A).

FIG. 14B illustrates a plot 1470 of first data beam BEAM1 radiation patterns in the steering direction of the first data beam BEAM1 and in the steering direction of second data beam BEAM2 for the example configuration 1400 of FIG. 14A. As illustrated in FIG. 14B, first data beam BEAM1 gain in a region 1452 around the first data beam BEAM1 steering angle includes a main lobe 1454 and side lobes 1456. As illustrated, first data beam BEAM1 gain in a region 1458 around the second data beam BEAM2 steering angle does not exhibit any value greater than −40 dBc relative to the peak gain of the main lobe 1454. As a result, the AP B2B coupling cancellation of FIG. 14A can be considered to effectively cancel the AP B2B coupling in the second data beam BEAM2 direction.

However, the first data beam BEAM1 energy may instead be directed to other directions outside of the region 1452 and region 1458. For example, first data beam BEAM1 energy 1462 may include a portion of the first data beam BEAM1 energy resulting from the AP B2B coupling within a serially fed FE network.

As illustrated by FIG. 14A and FIG. 14B, the use of phase shifts for AP B2B coupling cancellation can reduce power from one beam (e.g., first data beam BEAM1) that is transmitted in the steering direction of the other beam (e.g., second data beam BEAM2).

FIG. 15A illustrates an example configuration 1500 illustrating AP coupling with alternating application of phase shifts for providing AP B2B coupling cancellation. The configuration 1500 of FIG. 15A illustrates two individual FEs 1534A, 1534B that can be included in a serially fed FE network 1534. In some cases, the serially fed FE network 1534 can correspond to serially fed FE networks 432, 434 of FIG. 4A and FIG. 4C. Although FIG. 15A illustrates a serially fed FE network including two individual FEs 1534A, 1534B, it should be understood that the two individual FEs 1534A, 1534B could be part of a longer serially fed FE network without departing from the scope of the present disclosure.

In the illustrated example of FIG. 15A, each of the two individual FEs 1534A, 1534B can include one or more signal conditioning components for applying a phase shift and/or gain to the first data beam BEAM1 before outputting the first data beam BEAM1 from a first RF serial port to a first RF port of a subsequent FE of the serially fed FE network 1534. In the example of FIG. 15A, the one or more signal conditioning components for applying a phase shift and/or gain to the first data beam BEAM1 can include phase shifter 853 for the first individual FE 1534A and phase shifter 857 for the second individual FE 1534B.

In the illustrated example of FIG. 15A, each of the two individual FEs 1534A, 1534B can include one or more signal conditioning components for applying a phase shift and/or gain to the second data beam BEAM2 before outputting the second data beam BEAM2 from a second RF serial port to a second RF port of a subsequent FE of the serially fed FE network 1534. In the example of FIG. 15A, the one or more signal conditioning components for applying a phase shift and/or gain to the second data beam BEAM2 can include phase shifter 855 for the first individual FE 1534A and a phase shifter 859 for the second individual FE 1534B.

In the illustrated example of FIG. 15A, the phase shifter 853 for the first data beam BEAM1 and the phase shifter 859 for the second data beam BEAM2 apply a 180 degrees (180°) phase shift to through path components of first data beam BEAM1 and the second data beam BEAM2, respectively as a part of performing AP B2B coupling cancellation. The phase shifter 855 for the first data beam BEAM1 and the phase shifter 857 for the first data beam BEAM12 apply no phase shift.

In the illustrated example, first RF port 1501 of the first individual FE 1534A can receive a first data beam BEAM1. As illustrated in FIG. 15A, a first AP component of the first data beam BEAM1 1502 can be phase shifted by a phase shifter 1583 of the first individual FE 1534A with a phase shift corresponding to a first data beam BEAM1 steering angle. A through path component of the first data beam BEAM1 1503 can be input into the phase shifter 853 where 180 degrees (180°) phase shift is applied in the configuration 1500 of FIG. 15A. For the purposes of illustration, a phase shifted through path component of the second data beam BEAM2 1523 is illustrated with a different line pattern at the output of the phase shifter 855 of first individual FE 1534A to illustrate the difference in phase.

A second RF port 1511 of the first individual FE 1534A can receive a second data beam BEAM2. As illustrated, an AP component of the first data beam BEAM1 can couple to the AP of second data beam BEAM2 with a cross-coupling parameter 1506 having a complex coupling value $C_{1\rightarrow 2}$. In some cases, the cross-coupling parameter 1506 can correspond to second cross-coupling parameter 848 of FIG. 8B. A first cross-coupled first data beam BEAM1 component 1508 can be combined (e.g., summed in voltage) with an AP component of the second data beam BEAM2 1504.

A first cross-coupled first data beam BEAM1 component 1508 and the AP component of the second data beam BEAM2 1504 can be phase shifted by a phase shifter 1584 of first individual FE 1534A with a phase shift corresponding to a second data beam BEAM2 steering angle. In some implementations, the first data beam BEAM1 and the second data beam BEAM2 can be transmitted simultaneously with different steering angles.

Equation (58) below illustrates a phase $\varphi_{obs1,b1\rightarrow b2}$ of the first cross-coupled first data beam BEAM1 component 1508 from the first individual FE 1534A and observed at the second data beam BEAM2 steering angle:

$$\varphi_{obs1,b1\rightarrow b2}=\varphi_{b1,CM}+\varphi_{C,1\rightarrow 2}+\varphi_{b2,1}+\varphi_{ota,1} \tag{58}$$

In some examples, the $\varphi_{obs1,b1\rightarrow b2}$ of Equation (58) and $\varphi_{obs1,b1\rightarrow b2}$ of Equation (1) show that first data beam BEAM1 energy at the second data beam BEAM2 steering angle due to AP B2B coupling can take the same form. Accordingly, the simplifications of $\varphi_{obs1,b1\rightarrow b2}$ illustrated in Equation (2a) and Equation (2b) can also apply to Equation (58).

Substituting Equation (2b) into Equation (58) yields Equation (59) below:

$$\varphi_{obs1,b1\rightarrow b2}=\varphi_{b1,CM}+\varphi_{C,1\rightarrow 2}-\varphi_{b2,CM} \tag{59}$$

As illustrated, a through path component of the second data beam BEAM2 1505 can be input to the phase shifter 855 where no phase shift is applied in the configuration 1500 of FIG. 15A. As can be seen in FIG. 15A, because the AP B2B coupling occurs outside of the through path, the AP B2B coupling does not propagate to the second individual FE 1534B.

As illustrated, the first data beam BEAM1 can experience a phase shift $\varphi_{thru}$ along routing traces between the first individual FE 1534A and the second individual FE 1534B. Similarly, second data beam BEAM2 can experience a phase shift $\varphi_{thru}$ along routing traces between the first individual FE 1534A and the second individual FE 1534B.

As illustrated in FIG. 15A, the second individual FE 1534B can receive the through path component of the first data beam BEAM1 1503 and the through path component of the second data beam BEAM2 1505 at RF ports of the second individual FE 1534B.

As illustrated in FIG. 15A, in the first data beam BEAM1 signal path, phase shifted AP component of the first data beam BEAM1 1522 can be phase shifted by a phase shifter 1585 of the second individual FE 1534B with a phase shift corresponding to the first data beam BEAM1 steering angle. In some cases, the phase shift applied by the phase shifter 1585 of second individual FE 1534B can include compensation for the 180 degrees (180°) phase shift induced in the phase shifted through path component of the first data beam BEAM1 1513 by the phase shifter 853 of first individual FE 1534A. A phase shifted through path component of the first data beam BEAM1 1523 can be input into the phase shifter 857 where no phase shift is applied in the configuration 1500 of FIG. 15A.

As illustrated, an AP component of the first data beam BEAM1 can couple to the AP of second data beam BEAM2 with a cross-coupling parameter 1510 having a complex coupling value $C_{1\to2}$. In some cases, the cross-coupling parameter 1510 can correspond to second through path B2B cross-coupling parameter 858 of FIG. 8B. A second cross-coupled first data beam BEAM1 component 1528 can be combined (e.g., summed in voltage) with AP component of the second data beam BEAM2 1524.

A second cross-coupled first data beam BEAM1 component 1528 and the AP component of the second data beam BEAM2 1524 can be phase shifted by a phase shifter 1586 of second individual FE 1534B with a phase shift corresponding to a second data beam BEAM2 steering angle. As illustrated, because the phase shifted AP component of the first data beam BEAM1 1522 is 180 degrees (180°) out of phase with the first AP component of the first data beam BEAM1 1502, the second cross-coupled first data beam BEAM1 component 1528 can be 180 degrees (180°) out of phase with the first cross-coupled first data beam BEAM1 component 1508 of the first individual FE 1534A. For the purposes of illustration, a second cross-coupled first data beam BEAM1 component 1528 is illustrated with a different line pattern than the first cross-coupled first data beam BEAM1 component 1508 to illustrate the difference in phase. In some implementations, the first data beam BEAM1 and the second data beam BEAM2 can be transmitted simultaneously with different steering angles.

Equation (60) below illustrates a phase $\varphi_{obs2,b1\to b2}$ of the second cross-coupled first data beam BEAM1 component 1528 from the second individual FE 1534B and observed at the second data beam BEAM2 steering angle:

$$\varphi_{obs2,b1\to b2}=\varphi_{b1,CM}+180+\varphi_{thru}+\varphi_{C,1\to2}+\varphi_{b2,2}+\varphi_{ota,2} \tag{60}$$

Equation (61a) and Equation (61b) below illustrate a substitution for $\varphi_{ota,2}$ that can be used to simplify the expression for φobs2, b1→b2:

$$\varphi_{ant2,b2}=\varphi_{b2,CM}+\varphi_{thru}+\varphi_{b2,2}=-\varphi_{ota,2} \tag{61a}$$

-continued $$\varphi_{b2,2}+\varphi_{ota,2}=-(\varphi_{b2,CM}+\varphi_{thru}) \tag{61b}$$

Substituting Equation (61b) into Equation (60) yields Equation (62) below:

$$\varphi_{obs2,b1\to b2}=\varphi_{C,1\to2}+\varphi_{b1,CM}-\varphi_{b2,CM}+180^\circ \tag{62}$$

As illustrated, a through path component of the second data beam BEAM2 1525 can be input to the phase shifter 859 where no phase shift is applied in the configuration 1500 of FIG. 15A. As can be seen in FIG. 15A, because the AP B2B coupling occurs outside of the through path, the AP B2B coupling does not propagate to an RF serial port of the second individual FE 1534B.

Equation (63) below illustrates a voltage of the first data beam BEAM1 energy transmitted by the first individual FE 1534A:

$$V_{obs1,b1\to b2}=|C_{1\to2}|e^{j\varphi_{obs1,b1\to b2}} \tag{63}$$

Similarly, Equation (64a) and (64b) below illustrate a voltage of the first data beam BEAM1 energy transmitted by the second individual FE 1534B:

$$V_{obs2,b1\to b2}=|C_{1\to2}|e^{j\varphi_{obs2,b1\to b2}}=|C_{1\to2}|e^{j\pi}e^{j\varphi_{obs2,b1\to b2}} \tag{64a}$$

$$|C_{1\to2}|e^{j\pi}e^{j\varphi_{obs2,b1\to b2}}=-|C_{1\to2}|e^{j\varphi_{obs1,b1\to b2}} \tag{64b}$$

Applying Equation (18) above, the total voltage of first data beam BEAM1 observed at the second data beam BEAM2 steering angle due to AP B2B coupling is shown in Equation (65) below:

$$V_{obs,\Sigma,b1\to b2}=V_{obs,b1\to b2}+V_{obs2,b1\to b2}=0 \tag{65}$$

As illustrated above, the first data beam BEAM1 energy observed at the second data beam BEAM2 steering angle can destructively interfere. In some cases, the cancellation at the second data beam BEAM2 steering angle can incidentally produce a constructive interference at another angle. In some cases, the angle of the constructive interference can be depending on common mode phase, first data beam BEAM1 steering angle, second data beam BEAM2 steering angle, frequency, through path phase, and/or any combination thereof.

As should be understood by a person skilled in the art, the non-alternating phase shifts illustrated in FIG. 15A can be applied to serially fed FE networks including three or more individual FEs. In some cases, serially fed FE networks including an even number of individual FEs can produce destructive interference of the first data beam BEAM1 at the second data beam BEAM2 steering angle. In some cases, serially fed FE networks including an odd number of individual FEs may produce a net signal equal to the first data beam BEAM1 signal provided by a single individual FE in the absence of any coupling cancellation (e.g., first individual FE 1334A or second individual FE 1334B of FIG. 13A).

FIG. 15B illustrates a plot 1570 of first data beam BEAM1 radiation patterns in the steering direction of the first data beam BEAM1 and in the steering direction of second data beam BEAM2 for the example configuration 1500 of FIG. 15A. As illustrated in FIG. 15B, first data beam BEAM1 gain in a region 1552 around the first data beam BEAM1 steering angle includes a main lobe 1554 and side lobes 1556. As illustrated, first data beam BEAM1 gain in a region 1558 around the second data beam BEAM2 steering angle does not exhibit any value greater than −40 dBc relative to the peak gain of the main lobe 1554. As a result, the AP B2B coupling cancellation of FIG. 15A can be considered to effectively cancel the AP B2B coupling in the second data beam BEAM2 direction.

However, the first data beam BEAM1 energy may instead be directed to other directions outside of the region 1552 and region 1558. For example, first data beam BEAM1 energy 1562 may include a portion of the first data beam BEAM1 energy resulting from the AP B2B coupling within a serially fed FE network.

As illustrated by FIG. 15A and FIG. 15B, the use of phase shifts for AP B2B coupling cancellation can reduce power from one beam (e.g., first data beam BEAM1) that is transmitted in the steering direction of the other beam (e.g., second data beam BEAM2).

In some examples, one or more processes, such as digital signaling and/or data processing operations, may be performed by one or more computing devices or apparatuses. In some examples, the phased array antenna systems, FEs, BF modules, RFIO circuits, and/or other components described herein can be implemented by a user terminal or SAT shown in FIG. 1A and/or one or more computing devices with the computing device architecture 1600 shown in FIG. 16. In some cases, such a computing device or apparatus may include a processor, microprocessor, microcomputer, or other component of a device that is configured to carry out one or more operations described herein. In some examples, such computing device or apparatus may include one or more antennas for sending and receiving RF signals. In some examples, such computing device or apparatus may include an antenna and a modem for sending, receiving, modulating, and demodulating RF signals.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

In some cases, one or more operations described herein can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which any operations are described is not intended to be construed as a limitation, and any number of the described operations can be combined in any order and/or in parallel to implement the processes.

FIG. 16 illustrates an example computing device architecture 1600 of an example computing device which can implement various techniques and/or operations described herein. For example, the computing device architecture 1600 can be used to implement at least some portions of the SATs 102, the SAGs 104, the user terminals 112 and/or the user network devices 114 shown in FIG. 1A, and perform at least some of the operations described herein. The components of the computing device architecture 1600 are shown in electrical communication with each other using a connection 1605, such as a bus. The example computing device architecture 1600 includes a processing unit (CPU or processor) 1610 and a computing device connection 1605 that couples various computing device components including the computing device memory 1615, such as read only memory (ROM) 1620 and random access memory (RAM) 1625, to the processor 1610.

The computing device architecture 1600 can include a cache of high-speed memory connected directly with, in close proximity to, or integrated as part of the processor 1610. The computing device architecture 1600 can copy data from the memory 1615 and/or the storage device 1630 to the cache 1612 for quick access by the processor 1610. In this way, the cache can provide a performance boost that avoids processor 1610 delays while waiting for data. These and other modules can control or be configured to control the processor 1610 to perform various actions. Other computing device memory 1615 may be available for use as well. The memory 1615 can include multiple different types of memory with different performance characteristics. The processor 1610 can include any general purpose processor and a hardware or software service stored in storage device 1630 and configured to control the processor 1610 as well as a special-purpose processor where software instructions are incorporated into the processor design. The processor 1610 may be a self-contained system, containing multiple cores or processors, a bus, memory controller, cache, etc. A multi-core processor may be symmetric or asymmetric.

To enable user interaction with the computing device architecture 1600, an input device 1645 can represent any number of input mechanisms, such as a microphone for speech, a touch-sensitive screen for gesture or graphical input, keyboard, mouse, motion input, speech and so forth. An output device 1635 can also be one or more of a number of output mechanisms known to those of skill in the art, such as a display, projector, television, speaker device. In some instances, multimodal computing devices can enable a user to provide multiple types of input to communicate with the computing device architecture 1600. The communication interface 1640 can generally govern and manage the user input and computing device output. There is no restriction on operating on any particular hardware arrangement and therefore the basic features here may easily be substituted for improved hardware or firmware arrangements as they are developed.

Storage device 1630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1625, read only memory (ROM) 1620, and hybrids thereof. The storage device 1630 can include software, code, firmware, etc., for controlling the processor 1610. Other hardware or software modules are contemplated. The storage device 1630 can be connected to the computing device connection 1605. In one aspect, a hardware module that performs a particular function can include the software component stored in a computer-readable medium in connection with the necessary hardware components, such as the processor 1610, connection 1605, output device 1635, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using signals and/or computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory; USB devices provided with non-volatile memory; networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("$<$") and greater than ("$>$") symbols or terminology used herein can be replaced with less than or equal to ("$\leq$") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication devices, or integrated circuit devices having multiple uses including application in wireless communications and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry: Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

While illustrative embodiments have been illustrated and described, it will be appreciated that various changes can be made therein without departing from the spirit and scope of the disclosure.

What is claimed is:

1. A method for beam-to-beam (B2B) coupling cancellation, the method comprising:

obtaining, at a first frontend (FE) of a serially fed FE network, a first radio frequency (RF) signal and a second RF signal, wherein:

the first RF signal is coupled to a first signal path of the first FE;

the first RF signal comprises a first data beam;

the first RF signal is coupled to a second signal path of the first FE for the second RF signal by a cross-coupling between the first signal path of the first FE and the second signal path of the first FE, wherein the cross-coupling between the first signal path of the first FE and the second signal path of the first FE generates a coupling component;

the second RF signal is coupled to the second signal path of the first FE; and the second RF signal comprises a second data beam;

outputting, from the first FE, a first through path RF signal based on the first RF signal and a second through path RF signal based on the second RF signal;

obtaining, at a second FE of the serially fed FE network, the first through path RF signal and the second through path RF signal; and applying one or more phase shifts to the first RF signal, the second RF signal, the first through path RF signal, or the second through path RF signal to at least partially cancel the coupling component associated with the cross-coupling between the first signal path of the first FE and the second signal path of the first FE.

2. The method of claim 1, wherein:

the first RF signal is received by a first RF port of the first FE coupled to the first signal path of the first FE;

the second RF signal is received by a second RF port of the first FE coupled to the second signal path of the first FE;

the first FE transmits an antenna path component of the first RF signal and an antenna path component of the second RF signal to a first antenna element coupled to the first FE for transmission over-the-air (OTA);

the first through path RF signal is received by a first RF port of the second FE coupled to a first signal path of the second FE;

the second through path RF signal is received by a second RF port of the second FE coupled to a second signal path of the second FE; and the second FE transmits an antenna path component of the first through path RF signal and an antenna path component of the second through path RF signal to a second antenna element coupled to the second FE for transmission OTA.

3. The method of claim 2, wherein:

the second through path RF signal comprises the coupling component and the coupling component is at least partially cancelled by an additional coupling component between the first signal path of the second FE and the second signal path of the second FE, wherein a cross-coupling between the first signal path of the second FE and the second signal path of the second FE generates the additional coupling component.

4. The method of claim 3, wherein:

a phase shifter coupled to the second signal path of the first FE applies a phase shift to the second RF signal to generate the second through path RF signal, wherein the second through path RF signal comprises a phase shifted second data beam and a phase shifted coupling component;

the first through path RF signal comprises a through path first data beam component;

the additional coupling component comprises a coupling of the first through path RF signal to the second signal path of the second FE; and the additional coupling component destructively interferes with the phase shifted coupling component.

5. The method of claim 3, wherein:

the second RF signal comprises the second data beam and the coupling component, wherein the second through path RF signal comprises a through path second data beam component and a through path coupling component;

a phase shifter coupled to the first signal path of the first FE applies a phase shift to the first RF signal to generate the first through path RF signal, wherein the first through path RF signal comprises a phase shifted first data beam component;

the additional coupling component comprises a coupling of the first through path RF signal to the second signal path of the second FE; and the additional coupling component destructively interferes with the coupling component.

6. The method of claim 4, wherein destructive interference of the additional coupling component occurs within the second FE.

7. The method of claim 2, wherein:

the coupling component is generated between a first antenna signal path of the first FE corresponding to the first signal path and a second antenna signal path of the first FE corresponding to the second signal path;

the coupling component is transmitted by the first FE OTA;

a cross-coupling between a first antenna signal path of the second FE corresponding to the first signal path of the second FE and a second antenna path of the second FE corresponding to the second signal path of the second FE generates an additional coupling component;

the additional coupling component is transmitted by the second FE OTA; and the coupling component and the additional coupling component destructively interfere OTA in a beam steering direction of the second data beam.

8. The method of claim 7, wherein:

applying, by a phase shifter coupled to the second signal path of the first FE, a phase shift to the second RF signal to generate the second through path RF signal, wherein:

the second through path RF signal comprises a phase shifted second data beam;

the first through path RF signal comprises a through path first data beam component; and the phase shifted second data beam and the additional coupling component are phase shifted by an additional phase shifter of the second FE, wherein the additional phase shifter of the second FE applies a compensated phase shift configured to compensate for the phase shift applied to the second RF signal by the phase shifter of the first FE.

9. The method of claim 7, the method further comprising:

applying, by a phase shifter coupled to the first signal path of the first FE, a phase shift to the first RF signal to generate the first through path RF signal, wherein:

the first through path RF signal comprises a phase shifted first data beam component;

the second RF signal comprises the second data beam and the coupling component, wherein the second through path RF signal comprises a through path second data beam component and a through path coupling component; and the additional coupling component comprises a coupling of the first through path RF signal to the second antenna path of the second FE corresponding to the second signal path of the second FE.

10. The method of claim 1, wherein:

the first RF signal is generated by a first antenna path of the first FE coupled to an antenna port of the first FE and the first signal path of the first FE, wherein the first RF signal is generated based on receiving the first data beam OTA by a first antenna coupled to the antenna port of the first FE;

the second RF signal is generated by a second antenna path of the first FE coupled to the antenna port of the first FE and the second signal path of the first FE, wherein the second RF signal is generated based on receiving the second data beam OTA by the first antenna coupled to the antenna port of the first FE;

the first through path RF signal is received by a first RF through port of the second FE coupled to a first signal path of the second FE;

the second through path RF signal is received by a second RF through port of the second FE coupled to a second signal path of the second FE;

the second FE combines the first through path RF signal with a third RF signal generated by a first antenna path of the second FE coupled to an antenna port of the second FE, wherein the third RF signal is generated based on receiving the first data beam OTA by a second antenna coupled to the antenna port of the second FE; and the second FE combines the second through path RF signal with a fourth RF signal generated by a second antenna path of the second FE coupled to the antenna port of the second FE, wherein the fourth RF signal is generated based on receiving the second data beam OTA by the second antenna coupled to the antenna port of the second FE.

11. The method of claim 10, wherein:

the second through path RF signal comprises the coupling component and the coupling component is at least partially cancelled by an additional coupling component between the first signal path of the second FE and the second signal path of the second FE, wherein a cross-coupling between the first signal path of the second FE and the second signal path of the second FE generates the additional coupling component.

12. The method of claim 11, wherein:

a phase shifter of the first FE coupled to the second signal path of the first FE applies a phase shift to the second RF signal to generate the second through path RF signal, wherein the second through path RF signal comprises a phase shifted second data beam and a phase shifted coupling component;

the first through path RF signal comprises a through path first data beam component;

the additional coupling component comprises a coupling of the first through path RF signal to the second signal path of the second FE; and the additional coupling component destructively interferes with the phase shifted coupling component.

13. The method of claim 11, wherein:

the second RF signal comprises the second data beam and the coupling component, wherein the second through path RF signal comprises a through path second data beam component and a through path coupling component;

a phase shifter of the first FE coupled to the first signal path of the first FE applies a phase shift to the first RF signal to generate the first through path RF signal, wherein the first through path RF signal comprises a phase shifted first data beam component;

the additional coupling component comprises a coupling of the first through path RF signal to the second signal path of the second FE; and the additional coupling component destructively interferes with the coupling component.

14. The method of claim 12, wherein destructive interference of the additional coupling component the coupling component occurs within the second FE.

15. The method of claim 13, wherein:

the coupling component is generated between the first antenna path of the first FE and the second antenna path of the first FE;

a cross-coupling between the first antenna path of the second FE and the second antenna path of the second FE generates the additional coupling component; and the coupling component and the additional coupling component destructively interfere when combined in the second FE.

16. The method of claim 15, the method further comprising:

applying, by a phase shifter of the first FE coupled to the second signal path of the first FE, a phase shift to the second RF signal to generate the second through path RF signal, wherein the second through path RF signal comprises a phase shifted second data beam and a phase shifted coupling component; and applying, by a phase shifter of the second FE coupled to the second antenna path of the second FE, a compensated phase shift to the fourth RF signal to generate an additional phase shifted second data beam component, wherein:

the compensated phase shift is configured to compensate for the phase shift applied to the second RF signal by the phase shifter of the first FE;

the additional coupling component is coupled to the second antenna path of the second FE after the phase shifter of the second FE; and the phase shifted coupling component and the additional coupling component cancel destructively when combined by the second FE.

17. The method of claim 15, the method further comprising:

applying, by a phase shifter of the first FE coupled to the first signal path of the first FE, a phase shift to the first RF signal to generate the first through path RF signal, wherein the first through path RF signal comprises a phase shifted first data beam; and applying, by a phase shifter of the second FE coupled to the first antenna path of the second FE, a compensated phase shift to the third RF signal to generate an additional phase shifted first data beam component, wherein:

the compensated phase shift is configured to compensate for the phase shift applied to the first RF signal by the phase shifter of the first FE;

the additional coupling component is based on the additional phase shifted first data beam component and the additional coupling component is coupled to the second antenna path of the second FE after the phase shifter of the second FE; and the coupling component and the additional coupling component cancel destructively when combined by the second FE.

18. An apparatus for beam-to-beam (B2B) coupling cancellation, the apparatus comprising:

a first front end module (FEM) comprising:

a first radio frequency (RF) signal path associated with a first data beam, the first RF signal path comprising a first RF port and a first RF through port; and a second RF signal path associated with a second data beam, the second RF signal path comprising a second RF port and a second RF through port;

a second FEM comprising:

a third RF signal path associated with the first data beam, the third RF signal path comprising a third RF port configured to obtain the first data beam from the first RF through port; and a fourth RF signal path associated with the second data beam, the fourth RF signal path comprising a fourth RF port configured to obtain the second data beam from the second RF through port, wherein the first data beam is coupled to the second data beam by a cross-coupling between the first RF signal path and the second RF signal path, wherein the cross-coupling between the first RF signal path of the first FEM and the second RF signal path of the first FEM generates a coupling component; and a phase shifter configured to apply a phase shift to the second data beam to at least partially cancel the coupling component.

19. The apparatus of claim 18, wherein applying the phase shift comprises inverting the second data beam between the first RF port and the third RF port.

20. The apparatus of claim 18, wherein the first FEM comprises the phase shifter, and wherein the phase shifter is disposed between the second RF port and the second RF through port.

* * * * *